(12) United States Patent
Weng et al.

(10) Patent No.: US 7,265,193 B2
(45) Date of Patent: Sep. 4, 2007

(54) POLYMERIZATION PROCESS

(75) Inventors: Weiqing Weng, Houston, TX (US); Srivatsan Srinivas, Pearland, TX (US); Robert J. Wittenbrink, Kingwood, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 364 days.

(21) Appl. No.: 10/755,900

(22) Filed: Jan. 13, 2004

(65) Prior Publication Data

US 2004/0152851 A1    Aug. 5, 2004

Related U.S. Application Data

(63) Continuation-in-part of application No. 10/355,512, filed on Jan. 31, 2003, now abandoned.

(51) Int. Cl.
*C08F 210/06* (2006.01)
*C08F 210/02* (2006.01)
*C08F 210/08* (2006.01)
*C08F 210/14* (2006.01)
*C08F 4/6392* (2006.01)

(52) U.S. Cl. .................. 526/348.6; 526/160; 526/165; 526/348.2; 526/348.1

(58) Field of Classification Search ................ 526/160, 526/165, 348.6, 348.2, 348.1
See application file for complete search history.

(56) References Cited

U.S. PATENT DOCUMENTS

| | | | |
|---|---|---|---|
| 4,072,812 A | 2/1978 | McConnell et al. | 526/348.2 |
| 4,264,756 A | 4/1981 | Trotter et al. | 526/348.2 |
| 5,336,746 A | 8/1994 | Tsutsui et al. | 526/348.6 |
| 5,658,997 A | 8/1997 | Fukuoka et al. | 526/127 |
| 6,417,416 B1 | 7/2002 | Heilman et al. | 585/12 |
| 6,436,869 B1 | 8/2002 | Searle et al. | 502/214 |
| 2001/0000258 A1 | 4/2001 | McAlpin et al. | 526/348.2 |

FOREIGN PATENT DOCUMENTS

| | | |
|---|---|---|
| CA | 2125247 | 12/1994 |
| DE | 4333372 | 4/1994 |
| DE | 19927476 | 12/1999 |
| EP | 1 031 584 | 8/2000 |
| WO | WO97/19991 | 6/1997 |
| WO | WO99/19392 | 4/1999 |
| WO | WO99/67094 | 12/1999 |
| WO | WO99/67307 | 12/1999 |
| WO | WO 00/32657 | 6/2000 |
| WO | WO 01/18109 | 3/2001 |
| WO | WO 01/46278 | 6/2001 |
| WO | WO 01/60770 | 8/2001 |
| WO | WO 03/099884 | 12/2003 |

OTHER PUBLICATIONS

"Eigenschaftsmodifizierung Von Polypropylen Durch Copolymerization Mit Hoeheren Alpha-Olefinen", Arnold, M., et al, KGK Kautschuk Gummi Kunststoffe 54, Jahrangang, Nr. 6/2000, vol. 54, No. 6, Jun. 2000, pp. 300-302, 304-307.
JP2000178319 (Abstract), Jun. 27, 2000.
WO 01/107493 (Abstract), Feb. 1, 2001.
Derwent Abstract for ZA8207857 dated Jul. 8, 1983 (XP-002250725).
Abstract for "Modification of Polypropylene Properties by the Copolymerization of Propene with Higher α-Olefins", Arnold et al., pp. 300-302 & 304-307, Jun. 6, 2001 (XP-001058746).

*Primary Examiner*—Caixia Lu
(74) *Attorney, Agent, or Firm*—Michael Kerns

(57) ABSTRACT

This invention relates to a process to polymerize olefins comprising:
contacting:
(i) propylene and
(ii) a mixture comprising, optionally ethylene, and three or more different alpha olefins having 4 to 20 carbon atoms, wherein at least one alpha olefin is present at Z percent or more, based upon the weight of the mixture, where Z=Y+X, where X=(100 divided by the number of alpha olefins present in the mixture) and Y equals 1 to 75, where Z is not more than 95%, with
(iii) a metallocene catalyst system.

53 Claims, 2 Drawing Sheets

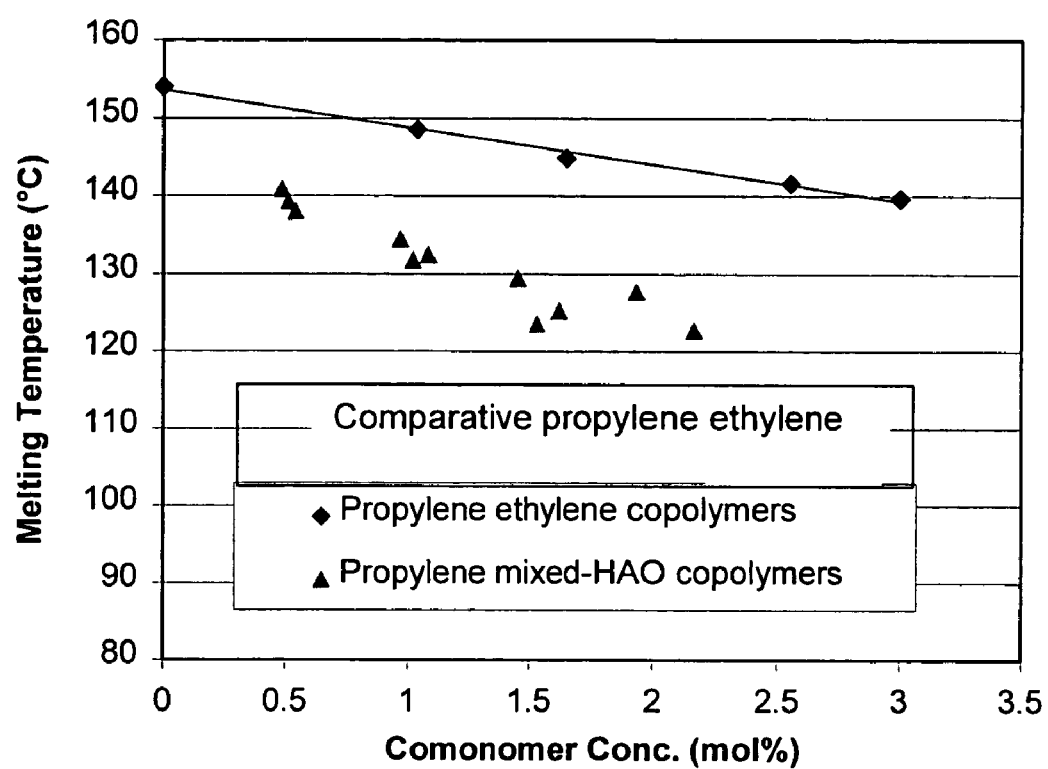

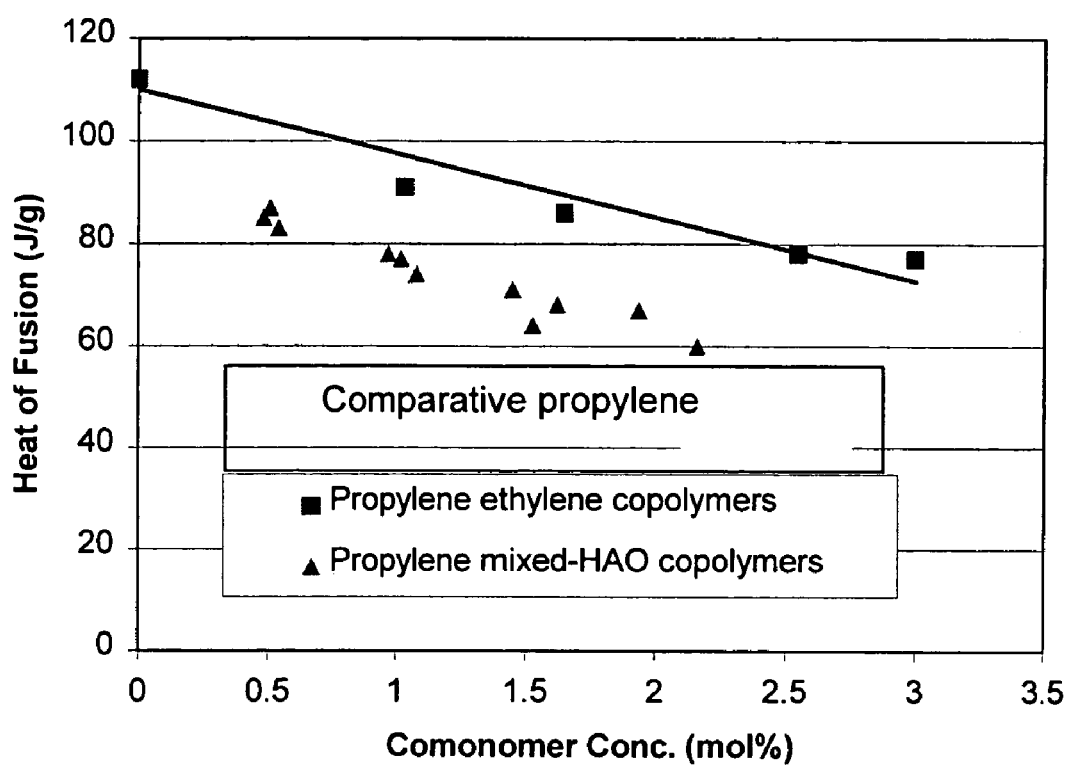
Figure 2. Comparison of Heat of Fusion ($\Delta H_f$)

POLYMERIZATION PROCESS

RELATED U.S. APPLICATION

The following is a Continuation in Part of U.S. application Ser. No. 10/355,512, filed Jan. 31, 2003, now abandoned.

FIELD OF THE INVENTION

This invention relates to a process to polymerize olefins using a feed stream comprising propylene and three or more linear alpha olefins.

BACKGROUND OF THE INVENTION

Polypropylene copolymers are widely used in applications where increased clarity, improved impact strength and lower heat seal temperatures are preferred. The typical comonomer used in most commercial polypropylene copolymers, also termed as Random Copolymers (RCP), is ethylene. There are many examples of other alpha olefins that have been used either instead of ethylene or in conjunction with ethylene to copolymerize with propylene. For example, WO 99/67307 discloses propylene terpolymers comprising propylene, ethylene or a C4 to C6 olefin, and a different C4 to C12 olefin. In particular, WO 99/67037 discloses examples of a propylene-butene-hexene terpolymer and a propylene-ethylene-butene terpolymer. Similarly WO 99/67094 discloses multi-layer films comprising similar polypropylene terpolymers. Examples of propylene-hexene and propylene-octene copolymers and articles made therefrom have been detailed in WO 97/19991. U.S. Pat. No. 5,658,997 describes the polymerization of propylene-ethylene, propylene-butene and propylene-octene copolymers using metallocene catalysts. Propylene-ethylene, propylene-butene and propylene-octene examples are shown. EP 1 031 584 describes a propylene copolymer comprising propylene, at least one α-olefin (2-20 carbon atoms) and a cyclic olefin. In all these cases, the polymerization involves the reaction between propylene and feeds of pure comonomer(s) that can be introduced into the reactor in controlled amounts. The purification of the desired comonomers to obtain only the desired alpha olefin is a large part of the cost of the comonomer. There is a need in the art for new, more efficient and more cost effective methods for polymerizing olefins. This invention describes the polymerization of propylene with a mixed olefin feed to yield polymers with useful properties. The use of a mixed feed reduces the cost of the comonomer feed stream without compromising any of the desirable properties of polypropylene copolymers.

Process to make polymers comprising multiple alpha-olefin monomers (ethylene, propylene and butene) have been disclosed in U.S. Pat. No. 6,417,416. Likewise WO 01/46278 discloses multiple monomer propylene based polymers produced using metallocene type catalysts. WO 99/67094 discloses polymers of propylene, butene and hexene made with metallocene type catalysts. WO 97/19991 discloses polymers of propylene and higher alpha-olefins (C5 and above), in particular WO 97/19991 discloses copolymers of propylene, a first alpha olefin (selected from pentene, 4-methyl-pentene-1, hexene or octene), and a second alpha-olefin (selected from ethylene, butene, 4-methyl-pentene-1, hexene or octene).

Other references of interest include: WO 99/67094; U.S. 2001/0000258 A1; CA 2,125,247; U.S. Pat. No. 5,658,997; WO 99/67307; U.S. Pat. No. 6,417,416; WO 99/19392; WO 99/67307; WO 01/07493; JP2000178319; EP 1 031 584; and WO 01/18109.

SUMMARY OF THE INVENTION

This invention relates to a process to polymerize olefins comprising:
  contacting:
  (i) propylene and
  (ii) a mixture comprising, optionally ethylene, and three or more different alpha olefins having 4 to 20 carbon atoms, wherein at least one alpha olefin is present at Z weight percent or more (based upon the weight of the mixture), where Z=Y+X, where X=(100 divided by the number of alpha olefins present in the mixture) and Y equals 1 to 75, where Z is not more than 95%, with
  (iii) a metallocene catalyst system.

BRIEF DESCRIPTION OF DRAWINGS

FIG. 1 is a graphical representation of data from Tables 1, 2, and 3 representing melting temperature (° C.) verses comonomer concentration (% mol) in examples of the present invention and in comparative propylene ethylene copolymers; and FIG. 2 is a graphical representation of data from Tables 1, 2, and 3 representing heat of fusion (Joules/g) verses comonomer concentration (% mol) in examples of the present invention and in comparative propylene ethylene copolymers.

DETAILED DESCRIPTION

In a preferred embodiment this invention relates to a process to polymerize olefins comprising:
  contacting:
  (i) propylene and
  (ii) 1 to 30 weight %, preferably 2 to 25 weight %, preferably 3 to 20 weight %, preferably 4 to 15 weight %, preferably 1 to 10 weight %, preferably 1 to 8 weight %, preferably 1 to 6 weight %, (based upon the weight of the propylene and the mixture) of a mixture comprising, optionally ethylene, and three or more different alpha olefins having 4 to 20 carbon atoms, wherein at least one alpha olefin is present at Z percent or more, based upon the weight of the mixture, where Z=Y+X, where X=(100 divided by the number of alpha olefins present in the mixture) and Y equals 1 to 75, preferably 5 to 65, more preferably 10 to 50, where Z is not more than 95%, with
  (iii) a metallocene catalyst system.

In a preferred embodiment the mixture comprises at least 4 or more linear alpha-olefins, at least 5 or more linear alpha olefins, at least 6 or more linear alpha-olefins, at least 7 or more linear alpha-olefins, at least 8 or more linear alpha-olefins, at least 9 or more linear alpha-olefins, at least 10 or more linear alpha-olefins, at least 11 or more linear alpha-olefins, at least 12 or more linear alpha-olefins, at least 13 or more linear alpha-olefins, at least 14 or more linear alpha-olefins, at least 15 or more linear alpha-olefins, at least 16 or more linear alpha-olefins, at least 17 or more linear alpha-olefins. In a preferred embodiment the mixture comprises between 8 and 17 alpha-olefins, preferably between 10 and 17 alpha olefins, preferably between 12 and 16.

In a preferred embodiment the mixture comprises less than 10 wt % of ethylene, based upon the weight of the mixture, preferably 6 weight % or less, more preferably 5 weight % or less, more preferably 4 weight % or less, more preferably 3 weight % or less, more preferably 2 weight % or less, more preferably 1 weight % or less.

In another embodiment Y equals 5 to 75, 10 to 75, 15 to 75, 20 to 75, 25 to 75, 30 to 75, 35 to 75, 40 to 75.

In another embodiment ethylene is added to the combination of the propylene and the mixture, regardless of whether ethylene is present in the mixture. In some embodiments up to 30 weight % (preferably up to 20 weight %, more preferably up to 10 weight %) of ethylene is added to the combination of the propylene and the mixture, based upon the weight of the ethylene, the propylene and the mixture.

In a preferred embodiment the mixture comprises three or more of butene, hexene, octene, decene, dodecene, butene, pentene, hexene, heptene, octene, decene, dodecene, tetradecene, hexadecene, octadecene, icosene, docosene, tetracosene, hexacosene, octacosene, triacontene, and the like.

In a preferred embodiment the mixture comprises three or more of butene, pentene, hexene, heptene, octene, nonene, decene, undecene, dodecene, tridecene, tetradecene, pentadecene, hexadecene, heptadecene, octadecene, nonadecene, icosene, heneicosene, docosene, tricosene, tetracosene, pentacosene, hexacosene, heptacosene, octacosene, nonacosene, and triacontene.

In a preferred embodiment the mixture comprises five or more of butene, pentene, hexene, heptene, octene, nonene, decene, undecene, dodecene, tridecene, tetradecene, pentadecene, hexadecene, heptadecene, octadecene, nonadecene, icosene, heneicosene, docosene, tricosene, tetracosene, pentacosene, hexacosene, heptacosene, octacosene, nonacosene, triacontene.

In a preferred embodiment, the mixture comprises at least three alpha olefins selected from the group consisting of linear $C_4$ to $C_{30}$ olefins capable of insertion polymerization. Preferred mixture of olefinic monomer feed comprises $C_4$ to $C_{20}$ linear α-olefins, more preferably $C_4$ to $C_8$ α-olefins.

Specifically, the feeds containing a mixture of α-olefins with various compositions and distributions may be obtained through established methods inexpensively. For example, in the Fischer-Tropsch synthesis, a mixture of linear α-olefins from $C_4$ to $C_{20}$ can be made from synthesis gas (CO and $H_2$). The mixture will have a normal distribution of α-olefins with both even and odd number carbon atoms. In some embodiments, the mixture will have at least 25 weight % of olefins having odd numbers of carbons, preferably greater than 30 weight %. Another example of methods to produce the mixture is through the coupling reaction of inexpensive butene and ethylene, resulting in the mixed alpha-olefin feed containing only even-numbered α-olefins ($C_6$, $C_8$, $C_{10}$, $C_{12}$ . . . ). These mixed α-olefins potentially would be a less expensive feed stock than any single higher α-olefin in making propylene-α-olefin copolymers.

In a preferred embodiment, the mixed feed of olefins can be obtained from Fischer-Tropsch synthesis from the conversion of carbon-monoxide using a Fischer-Tropsch catalyst. Fischer-Tropsch catalysts are formed by deposition of the catalytic metal, or metals, on a previously pilled, pelleted, beaded, extruded, spray dried, or sieved support material. In preparing the catalysts, the metals are deposited from solution on the support in preselected amounts to provide the desired absolute amounts and weight ratios of the metals being deposited. Catalysts constituted of cobalt and rhenium supported on titania, or a titania-containing support, silica, etc. with or without the addition of an additional metal, or metals, promoter or modifier, e.g., ruthenium, hafnium, zirconium, titanium, chromium, thoria, copper, etc., exhibit superior hydrocarbon synthesis characteristics and provide high selectivities in the conversion of synthesis gas to C5+hydrocarbon liquids. Suitably, the metals are co-deposited by contact and treatment of the support with a solution, suitably an aqueous solution, which contains the dispersing aid in addition to the compound or salt of the Iron Group metal, e.g., cobalt, or the compound or salt of the rhenium, or both the compound or salt of the Iron Group metal and the compound or salt of the rhenium.

The catalytic metal, or Iron Group metal, and the rhenium can be deposited from solution in sequence, or co-deposited from the same impregnating solution, and the dispersing aid can be deposited from solution in sequence with the Iron Group metal, and rhenium, or co-deposited with the Iron Group metal and the rhenium. The dispersing aid can thus be co-deposited with a catalytic metal, or metals, or it can be deposited from solution by a separate impregnation. Preferably however, the dispersing aid is co-deposited with the Iron Group metal and the rhenium. The volume of impregnating solution used in an impregnation usually ranges from about 1 to about 20 times the volume of the support, and is generally carried out at ambient or elevated temperature. Preferably, the impregnation is carried out at conditions of incipient wetness, and at essentially ambient temperature. In accordance with the incipient wetness technique, as is known, the volume of the impregnating solution and amount of metals is predetermined to correspond to the maximum volume which will just fill the internal pore volume of the support, with no liquid in excess on impregnation of the support. Various refractory inorganic oxide supports are useful in the formation of catalysts pursuant to the practice of this invention. Exemplary of such supports are titania, which is preferred, silica, silica-alumina, alumina, and the like.

Highly concentrated metal salt solutions are most desirable for preparing hydrocarbon synthesis catalysts because they generate the highest metal loading per impregnation, higher metal loadings leading in turn to higher catalytic activity. Common salts or compounds of the catalytic metals can generally be used. However, it has been found that the nitrate salt, especially in the case of cobalt is preferred because it is the most readily available and least expensive salt and, more importantly, it possesses the highest degree of solubility in water. Cobalt acetate is also suitable, although it is less water soluble. Cobalt chloride and sulfate are not suitable for making hydrocarbon synthesis catalysts, presumably because of poisoning by residual anions not removed in the calcination, regardless of the promotion of dispersion by the dispersing aids.

Solvents other than water may be used, e.g., alcohols, ketones and the like, but are generally not preferred because of lower metal salt solubility and added manufacturing cost. Suitable rhenium compounds are the common water soluble ones, especially perrhenic acid and ammonium perrhenate.

The catalytic metal, or Iron Group metal, preferably cobalt, is added to the support in amount sufficient to provide from about 2 percent to about 50 percent, preferably from about 5 percent to about 35 percent of the elemental metal, based on the total weight of the finished catalyst (dry basis). The maximum metal loading that can be obtained per impregnation will depend upon the support pore volume, which will in turn depend upon the support composition, and the metal concentration in the impregnating solution. Multiple impregnation/calcination steps may be used to obtain high final metal loadings. Other metals, e.g., thorium, cerium, hafnium, uranium and the like can be added if desired to modify or promote the activity of the finished catalyst. These metals when present are added in weight ratio to the catalytic or Iron Group metal ranging above about 0.01:1, preferably from about 0.025:1 to about 0.1:1. Rhenium is added to the support in concentration sufficient to provide a weight ratio of elemental rhenium:elemental Iron Group metal (e.g., Re/Co weight ratio) in the finished catalyst ranging from about 0.005:1 to about 0.2:1, preferably from about 0.01:1 to about 0.1:1 (dry basis). The dispersing aid is added to the support in concentration sufficient to disperse the Iron Group metal compound throughout the support, from about 2 percent to about 30 percent, preferably from about 6 percent to about 25 percent, of the dispersing aid generally being adequate to fully accomplish this objective; and it does this even more effectively than the rhenium. Preferably, the dispersing aid is added to metal salt impregnating solution such that the mole ratio of the compound characterizing the dispersing aid to metal is about 0.1:1 to about 0.6:1, preferably from about 0.2:1 to about 0.5:1. The catalyst, after impregnation, is dried by heating, suitably at temperatures ranging from about 30° C. to about 120° C., in an air, nitrogen or other gas stream or under vacuum. The metals are converted to an oxide form by calcination, suitably at temperature ranging from about 200° C. to about 550° C., preferably from about 250° C. to about 400° C., and the dispersing aid is burned, combusted, and removed from the catalyst. The catalyst is then activated by reduction, suitably by contact with hydrogen at temperature ranging from about 250° C. to about 550° C., preferably from about 275° C. to about 425° C., for periods ranging from about 0.5 hour to about 24 hours at pressures ranging from above ambient to about 40 atmospheres.

The catalysts described above are used in the conversion of synthesis gas to C5+hydrocarbons. The Fischer-Tropsch, F-T, or hydrocarbon synthesis process is carried out at temperatures of about 160° C. to about 325° C., preferably from about 190° C. to about 260° C., pressures of about 5 atm to about 100 atm, preferably about 10-40 atm and gas hourly space velocities of from about 300 V/Hr/V to about 20,000 V/Hr/V, preferably from about 500 V/Hr/V to about 15,000 V/Hr/V. The stoichiometric ratio of hydrogen to carbon monoxide in the synthesis gas is about 2.1:1 for the production of higher hydrocarbons. However, H2/CO ratios of 1:1 to about 4:1, preferably about 1.5:1 to about 2.5:1, more preferably about 1.8:1 to about 2.2:1 can be employed. These reaction conditions are well known and a particular set of reaction conditions can be readily determined by those skilled in the art. The reaction may be carried out in virtually any type reactor, e.g., fixed bed, moving bed, fluidized bed, slurry, bubbling bed, etc. The product from the F-T reactor, or reactor utilizing the catalyst made pursuant to the practice of this invention is an essentially non-sulfur, non-nitrogen, non-aromatics containing hydrocarbon. The mixed olefin feed can be obtained from the hydrocarbon product by separation.

In a preferred embodiment this invention relates to a process to polymerize olefins comprising:

a) converting synthesis gas (comprising CO and $H_2$) to a mixture comprising linear alpha olefins, where the mixture comprises, optionally ethylene, and three or more different linear alpha olefins having 4 to 20 carbon atoms, wherein at least one linear alpha olefin is present at Z percent or more, based upon the weight of the mixture, where Z=Y+X, where X=(100 divided by the number of alpha olefins present in the mixture) and Y equals 1 to 75, where Z is not more than 95%, b) contacting propylene and the mixture with a metallocene catalyst system.

In another preferred embodiment this invention relates to a process to polymerize olefins comprising:

a) converting methane to synthesis gas, comprising CO and $H_2$, b) converting the synthesis gas to a mixture comprising linear alpha olefins, where the mixture comprises, optionally ethylene, and three or more different linear alpha olefins having 4 to 20 carbon atoms, wherein at least one linear alpha olefin is present at Z percent or more, based upon the weight of the mixture, where Z=Y+X, where X=(100 divided by the number of alpha olefins present in the mixture) and Y equals 1 to 75, where Z is not more than 95%, c) contacting propylene and the mixture with a metallocene catalyst system.

As used herein, the new notation numbering scheme for the Periodic Table Groups is used as set out in CHEMICAL AND ENGINEERING NEWS, 63(5), 27 (1985).

When a polymer is referred to as comprising an olefin, the olefin present in the polymer is the polymerized form of the olefin. Likewise when catalyst components are described as comprising neutral stable forms of the components, it is well understood by one of ordinary skill in the art, that the ionic form of the component is the form that reacts with the monomers to produce polymers.

This invention further relates to the following embodiments:

1. A process to polymerize olefins comprising:
    contacting:
    (i) propylene and
    (ii) a mixture comprising, optionally ethylene, and three or more different alpha olefins having 4 to 20 carbon atoms, wherein at least one alpha olefin is present at Z percent or more, based upon the weight of the mixture, where Z=Y+X, where X=(100 divided by the number of alpha olefins present in the mixture) and Y equals 1 to 75, where Z is not more than 95%, with
    (iii) a metallocene catalyst system.

2. A process to polymerize olefins comprising:
    a) converting synthesis gas comprising CO and $H_2$ to a mixture comprising linear alpha olefins, where the mixture comprises, optionally ethylene, and three or more different linear alpha olefins having 4 to 20 carbon atoms, wherein at least one linear alpha olefin is present at Z percent or more, based upon the weight of the mixture, where Z=Y+X, where X=(100 divided by the number of alpha olefins present in the mixture) and Y equals 1 to 75, where Z is not more than 95%,
    b) contacting propylene and the liquid mixture with a metallocene catalyst system.

3. A process to polymerize olefins comprising:
    a) converting methane to synthesis gas comprising CO and $H_2$,
    b) converting the synthesis gas to a mixture comprising linear alpha olefins, where the mixture comprises, optionally ethylene, and three or more different linear alpha olefins having 4 to 20 carbon atoms, wherein at least one linear alpha olefin is present at Z percent or more, based upon the weight of the mixture, where Z=Y+X, where X=(100 divided by the number of alpha olefins present in the mixture) and Y equals 1 to 75, where Z is not more than 95%, c) contacting propylene and the mixture with a metallocene catalyst system.

4. A process to polymerize olefins comprising:
    contacting:
    (i) propylene, ethylene and
    (ii) a mixture comprising, up to 30 weight % optionally ethylene, and three or more different alpha olefins having 4 to 20 carbon atoms, wherein at least one alpha olefin is present at Z percent or more, based upon the weight of the mixture, where Z=Y+X, where X=(100 divided by the number of alpha olefins present in the mixture) and Y equals 1 to 75, where Z is not more than 95%, with
    (iii) a metallocene catalyst system.

5. A process to obtain polymer comprising obtaining a mixed olefin feedstream by combining a synthesis gas stream with a Fischer-Tropsch catalyst and thereafter contacting the mixed feedstream with a metallocene catalyst system.

6. The process of paragraph 5 wherein the mixed olefin feedstream comprises a mixture of C4 to C20 linear alpha-olefins.

7. The process of paragraph 5 wherein the mixed olefin feedstream comprises a mixture of C4 to C20 linear alpha-olefins, where at least 25% of the olefins have an odd number of carbon atoms 8. A process to polymerize olefins comprising:
    a) converting synthesis gas comprising carbon dioxide and hydrogen to a mixture comprising linear alpha olefins, where the mixture comprises, optionally ethylene, and four or more different linear alpha olefins having 4 to 20 carbon atoms, wherein at least one linear alpha olefin is present at Z percent or more, based upon the weight of the mixture, where Z=Y+X, where X=(100 divided by the number of alpha olefins present in the mixture) and Y equals 1 to 75, where Z is not more than 95%,
    b) contacting propylene and the mixture with a metallocene catalyst system.

9. A process to polymerize olefins comprising:
    a) converting methane to synthesis gas, comprising CO and $H_2$,
    b) converting the synthesis gas to a mixture comprising linear alpha olefins, where the mixture comprises, optionally ethylene, and four or more different linear alpha olefins having 4 to 20 carbon atoms, wherein at least one linear alpha olefin is present at Z percent or more, based upon the weight of the mixture, where Z=Y+X, where X=(100 divided by the number of alpha olefins present in the mixture) and Y equals 1 to 75, where Z is not more than 95%,
    c) contacting propylene and the mixture with a metallocene catalyst system.

10. A process to polymerize olefins comprising:
    a) converting synthesis gas comprising carbon dioxide and hydrogen to a mixture comprising linear alpha olefins, where the mixture comprises, optionally ethylene, and five or more different linear alpha olefins having 4 to 20 carbon atoms, wherein at least one linear alpha olefin is present at Z percent or more, based upon the weight of the mixture, where Z=Y+X, where X=(100 divided by the number of alpha olefins present in the mixture) and Y equals 1 to 75, where Z is not more than 95%,
    b) contacting propylene and the mixture with a metallocene catalyst system.

11. A process to polymerize olefins comprising:
    a) converting methane to synthesis gas, comprising CO and $H_2$,
    b) converting the synthesis gas to a mixture comprising linear alpha olefins, where the mixture comprises, optionally ethylene, and five or more different linear alpha olefins having 4 to 20 carbon atoms, wherein at least one linear alpha olefin is present at Z percent or more, based upon the weight of the mixture, where Z=Y+X, where X=(100 divided by the number of alpha olefins present in the mixture) and Y equals 1 to 75, where Z is not more than 95%,
    c) contacting propylene and the mixture with a metallocene catalyst system.

12. A process to polymerize olefins comprising:
    a) converting synthesis gas comprising carbon dioxide and hydrogen to a mixture comprising linear alpha olefins, where the mixture comprises, optionally ethylene, and six or more different linear alpha olefins having 4 to 20 carbon atoms, wherein at least one linear alpha olefin is present at Z percent or more, based upon the weight of the mixture, where Z=Y+X, where X=(100 divided by the number of alpha olefins present in the mixture) and Y equals 1 to 75, where Z is not more than 95%,
    b) contacting propylene and the mixture with a metallocene catalyst system.

13. A process to polymerize olefins comprising:
    a) converting methane to synthesis gas, comprising CO and $H_2$,
    b) converting the synthesis gas to a mixture comprising linear alpha olefins, where the mixture comprises, optionally ethylene, and six or more different linear alpha olefins having 4 to 20 carbon atoms, wherein at least one linear alpha olefin is present at Z percent or more, based upon the weight of the mixture, where Z=Y+X, where X=(100 divided by the number of alpha olefins present in the mixture) and Y equals 1 to 75, where Z is not more than 95%,
    c) contacting propylene and the mixture with a metallocene catalyst system.

14. A process to obtain polymer comprising obtaining a mixed olefin feedstream by combining carbon monoxide with a Fischer-Tropsch catalyst and thereafter contacting the mixed feedstream with propylene and a metallocene catalyst system.

15. A process to obtain polymer comprising obtaining a mixed olefin feedstream by coupling butene and ethylene and thereafter contacting the mixed feedstream with propylene and a metallocene catalyst system.

16. The process of any of paragraphs 1 to 4 or 8 to 15 wherein the mixed olefin feed stream consists essentially of alpha-olefins having even numbers of carbon atoms.

17. A process to polymerize olefins comprising:
    a) obtaining a mixed olefin stream by coupling ethylene and butene, where the mixture comprises, optionally ethylene, and four or more different linear alpha olefins having 4 to 20 carbon atoms, wherein at least one linear alpha olefin is present at Z percent or more, based upon the weight of the mixture, where Z=Y+X, where X=(100 divided by the number of alpha olefins present in the mixture) and Y equals 1 to 75, where Z is not more than 95%,
    b) contacting propylene and the mixture with a metallocene catalyst system.

18. A process to polymerize olefins comprising:
  a) obtaining a mixed olefin stream by coupling ethylene and butene, where the mixture comprises, optionally ethylene, and six or more different linear alpha olefins having 4 to 20 carbon atoms, wherein at least one linear alpha olefin is present at Z percent or more, based upon the weight of the mixture, where Z=Y+X, where X=(100 divided by the number of alpha olefins present in the mixture) and Y equals 1 to 75, where Z is not more than 95%,
  c) contacting propylene and the mixture with a metallocene catalyst system.

19. The process of any of paragraphs 1- 19 wherein the mixture comprises four or more different alpha olefins having 4 to 20 carbon atoms.

20. The process of any of paragraphs 1- 19 wherein the mixture comprises five or more different alpha olefins having 4 to 20 carbon atoms.

21. The process of paragraph of any of paragraphs 1-20 wherein the mixture comprises less than 10 wt % of ethylene, based upon the weight of the mixture.

22. The process of any of the above paragraphs wherein Y equals 5 to 65.

23. The process of any of the above paragraphs wherein the metallocene catalyst system comprises alumoxane.

24. The process of any of the above paragraphs wherein the metallocene catalyst system comprises methylalumoxane.

25. The process of any of the above paragraphs wherein the metallocene catalyst system comprises a non-coordinating anion.

26. The process of any of the above paragraphs wherein the metallocene catalyst system comprises one or more of any of the metallocene catalysts named below.

27. The process of any of the above paragraphs where the process further uses one or more scavengers selected from the group consisting of trimethylaluminum, triethylaluminum, triisobutylaluminum, tri-n-hexylaluminum, tri-n-octylaluminum, and combinations thereof.

28. The process of any of the above paragraphs wherein the metallocene catalyst system is supported.

29. The process of any of the above paragraphs wherein the support is silica.

30. The process of any of the above paragraphs where the catalyst, the propylene and the mixture are contacted in a hydrocarbon diluent.

31. The process of any of the above paragraphs, wherein the mixture is present at 1 to 30 weight %, based upon the weight of the propylene and the mixture.

Metallocene Catalyst System

The combination of propylene and the mixture described above is typically contacted with a metallocene catalyst system. By metallocene catalyst system is meant the combination of an activator with a transition metal compound comprising a transition metal, preferably a group 4 metal, bound to at least one cyclopentadienyl group (cyclopentadienyl group is defined to include substituted cyclopentadienyls, including flourenyls and indenyls (which themselves may be substituted)). By substituted is meant a group in which one or more hydrogen atom to any carbon of the group is replaced by another group such as a halogen, aryl, cycloalkyl, and combinations thereof. For example, "substituted cyclopentadienyl" refers to a cyclopentadienyl group in which one or more hydrogen atom to any carbon of the cyclopentadienyl is replaced by another group such as a halogen, aryl, substituted aryl, cycloalkyl, substituted cycloalkyl, and combinations thereof. Two or more transition metal compounds can be used in the metallocene catalyst systems described herein. In some embodiments the transitional metal compound comprises two cyclopentadienyl groups.

In general, the polymerization is conducted using a metallocene catalyst capable of producing polypropylene, preferably stereoregular polypropylene, activated with an alumoxane, such as methylalumoxane (MAO) or a non-coordinating anion (NCA) activator, and optionally a scavenging compound. Polymerization is conducted in bulk, solution, slurry or gas phase. The polymerization can be performed in a single reactor, series reactor or parallel reactor process. A slurry, bulk, or solution polymerization process can utilize sub- or superatmospheric pressures and temperatures in the range of from −25° C. to 150° C.

In a slurry polymerization, a suspension of solid, particulate polymer is formed in a liquid polymerization medium to which the monomers, catalyst and optionally hydrogen are added. In solution polymerization, the liquid medium serves as a solvent for the polymer. The liquid employed as the polymerization medium can be an alkane or a cycloalkane, such as butane, pentane, hexane, or cylclohexane, or an aromatic hydrocarbon, such as toluene, ethylbenzene or xylene. The medium employed should be liquid under the conditions of the polymerization and relatively inert. Preferably, hexane or toluene is employed for solution polymerization. For slurry polymerization, liquid monomer can also be used. Gas phase polymerization processes are described in U.S. Pat. Nos. 4,543,399, 4,588,790, 5,028,670. The catalyst may be supported on any suitable particulate material or porous carrier such as polymeric supports or inorganic oxides—for example silica, alumina or both. Methods of supporting metallocene catalysts are described in U.S. Pat. Nos. 4,808,561, 4,897,455, 4,937,301, 4,937,217, 4,912,075, 5,008,228, 5,086,025, 5,147,949, and 5,238,892.

Among the catalyst compounds which can be used in this invention, (also called stereospecific catalysts) are described in co-pending WO 99/29743 also published as U.S. Pat. No. 6,117,962. Typically used catalysts are stereorigid, chiral or asymmetric, bridged metallocenes. See, for example, U.S. Pat. No. 4,892,851, U.S. Pat. No. 5,017,714, U.S. Pat. No. 5,132,281, U.S. Pat. No. 5,155,080, U.S. Pat. No. 5,296,434, U.S. Pat. No. 5,278,264, U.S. Pat. No. 5,318,935, U.S. Pat. No. 6,376,409, U.S. Pat. No. 6,380,120, U.S. Pat. No. 6,376,412, WO-A-(PCT/US 92/10066), WO-A-93/19103, WO 01/48034, EP-A2-0 577 581, EP-A1-0 578 838, and academic literature "The Influence of Aromatic Substituents on the Polymerization Behavior of Bridged Zirconocene Catalysts", Spaleck, W., et al, *Organometallics* 1994, 13, 954-963, and "ansa-Zirconocene Polymerization Catalysts with Annelated Ring Ligands-Effects on Catalytic Activity and Polymer Chain Lengths", Brintzinger, H., et al, *Organometallics* 1994, 13, 964-970, and documents referred to therein. In a preferred embodiment, the stereospecific transition metal catalyst compound is a dimethylsiladiyl-bridged bis(indenyl)zirconocene or hafnocene. More preferably, the transition metal catalyst compound is dimethylsiladiyl(2-methyl-4-phenylindenyl)zirconium or hafnium dichloride or dimethyl. In another preferred embodiment, the transition metal catalyst is a dimethylsiladiyl-bridged bis(indenyl) hafnocene such as dimethylsiladiyl bis(indenyl)hafnium dimethyl or dichloride. Illustrative, but not limiting examples of preferred stereospecific metallocene catalysts are the racemic isomers of:

dimethylsiladiyl(2-methyl-4-phenylindenyl)₂metal dichloride;
dimethylsiladiyl(2-methyl-4-phenylindenyl)₂metal dimethyl;
dimethylsiladiyl(2-methyl indenyl)₂metal dichloride;
dimethylsiladiyl(2-methyl indenyl)₂metal dimethyl;
dimethylsiladiyl(indenyl)₂metal dichloride;
dimethylsiladiyl(indenyl)₂metal dimethyl;
dimethylsiladiyl(tetrahydroindenyl)₂metal dichloride;
dimethylsiladiyl(tetrahydroindenyl)₂metal dimethyl;
dimethylsiladiyl(indenyl)₂metal diethyl;
diphenylsiladiyl(indenyl)₂metal dimethyl;
dimethylsiladiyl(2-methyl,4-[3',5'-di-t-butylphenyl]indenyl)₂metal dichloride;
dimethylsiladiyl(2-methyl,4-[3',5'-di-t-butylphenyl]indenyl)₂metal dimethyl;
dimethylsiladiyl(2-ethyl,4-[3',5'-di-t-butylphenyl]indenyl)₂metal dichloride;
dimethylsiladiyl(2-ethyl,4-[3',5'-di-t-butylphenyl]indenyl)₂metal dimethyl;
dimethylsiladiyl(2-n-propyl,4-[3',5'-di-t-butylphenyl]indenyl)₂metal dichloride;
dimethylsiladiyl(2-n-propyl,4-[3',5'-di-t-butylphenyl]indenyl)₂metal dimethyl;
dimethylsiladiyl(2-iso-propyl,4-[3',5'-di-t-butylphenyl]indenyl)₂metal dichloride;
dimethylsiladiyl(2-iso-propyl,4-[3',5'-di-t-butylphenyl]indenyl)₂metal dimethyl;
dimethylsiladiyl(2-n-butyl,4-[3',5'-di-t-butylphenyl]indenyl)₂metal dichloride;
dimethylsiladiyl(2-n-butyl,4-[3', 5'-di-t-butylphenyl]indenyl)₂metal dimethyl;
dimethylsiladiyl(2-iso-butyl,4-[3',5'-di-t-butylphenyl]indenyl)₂metal dichloride;
dimethylsiladiyl(2-iso-butyl,4-[3',5'-di-t-butylphenyl]indenyl)₂metal dimethyl;
dimethylsiladiyl(2-sec-butyl,4-[3',5'-di-t-butylphenyl]indenyl)₂metal dichloride;
dimethylsiladiyl(2-sec-butyl,4-[3',5'-di-t-butylphenyl]indenyl)₂metal dimethyl;
dimethylsiladiyl(2-methyl,4-[3',5'-di-phenylphenyl t-butylphenyl]indenyl)₂metal dichloride;
dimethylsiladiyl(2-methyl,4-[3',5'-di-phenylphenyl]indenyl)₂metal dimethyl;
dimethylsiladiyl(2-ethyl,4-[3',5'-di-phenylphenyl]indenyl)₂metal dichloride;
dimethylsiladiyl(2-ethyl,4-[3',5'-di-phenylphenyl]indenyl)₂metal dimethyl;
dimethylsiladiyl(2-n-propyl,4-[3',5'-di-phenylphenyl]indenyl)₂metal dichloride;
dimethylsiladiyl(2-n-propyl,4-[3',5'-di-phenylphenyl]indenyl)₂metal dimethyl;
dimethylsiladiyl(2-iso-propyl,4-[3',5'-di-phenylphenyl]indenyl)₂metal dichloride;
dimethylsiladiyl(2-iso-propyl,4-[3',5'-di-phenylphenyl]indenyl)₂metal dimethyl;
dimethylsiladiyl(2-n-butyl,4-[3',5'-di-phenylphenyl]indenyl)₂metal dichloride;
dimethylsiladiyl(2-n-butyl,4-[3',5'-di-phenylphenyl]indenyl)₂metal dimethyl;
dimethylsiladiyl(2-iso-butyl,4-[3',5'-di-phenylphenyl]indenyl)₂metal dichloride;
dimethylsiladiyl(2-iso-butyl,4-[3',5'-di-phenylphenyl]indenyl)₂metal dimethyl;
dimethylsiladiyl(2-sec-butyl,4-[3',5'-di-phenylphenyl]indenyl)₂metal dichloride;
dimethylsiladiyl(2-sec-butyl,4-[3',5'-di-phenylphenyl]indenyl)₂metal dimethyl;
dimethylsiladiyl(2-tert-butyl,4-[3',5'-di-phenylphenyl]indenyl)₂metal dichloride;
dimethylsiladiyl(2-tert-butyl,4-[3',5'-di-phenylphenyl]indenyl)₂metal dimethyl;
9-silafluorendiyl(2-methyl,4-[3',5'-di-t-butylphenyl]indenyl)₂metal dichloride;
9-silafluorendiyl(2-methyl,4-[3',5'-di-t-butylphenyl]indenyl)₂metal dimethyl;
9-silafluorendiyl(2-ethyl,4-[3',5'-di-t-butylphenyl] indenyl)₂metal dichloride;
9-silafluorendiyl(2-ethyl,4-[3',5'-di-t-butylphenyl] indenyl)₂metal dimethyl;
9-silafluorendiyl(2-n-propyl,4-[3',5'-di-t-butylphenyl]indenyl)₂metal dichloride;
9-silafluorendiyl(2-n-propyl,4-[3',5'-di-t-butylphenyl]indenyl)₂metal dimethyl;
9-silafluorendiyl(2-iso-propyl,4-[3',5'-di-t-butylphenyl]indenyl)₂metal dichloride;
9-silafluorendiyl(2-iso-propyl,4-[3',5'-di-t-butylphenyl]indenyl)₂metal dimethyl;
9-silafluorendiyl(2-n-butyl,4-[3',5'-di-t-butylphenyl]indenyl)₂metal dichloride;
9-silafluorendiyl(2-n-butyl,4-[3',5'-di-t-butylphenyl]indenyl)₂metal dimethyl;
9-silafluorendiyl(2-iso-butyl,4-[3',5'-di-t-butylphenyl]indenyl)₂metal dichloride;
9-silafluorendiyl(2-iso-butyl,4-[3',5'-di-t-butylphenyl]indenyl)₂metal dimethyl;
9-silafluorendiyl(2-sec-butyl,4-[3',5'-di-t-butylphenyl]indenyl)₂metal dichloride;
9-silafluorendiyl(2-sec-butyl,4-[3',5'-di-t-butylphenyl]indenyl)₂metal dimethyl;
9-silafluorendiyl(2-tert-butyl,4-[3',5'-di-t-butylphenyl]indenyl)₂metal dichloride;
9-silafluorendiyl(2-tert-butyl,4-[3',5'-di-t-butylphenyl]indenyl)₂metal dimethyl;

wherein the metal can be chosen from Zr, Hf, or Ti, preferably Zr.

Illustrative, but not limiting examples of preferred non-stereospecific metallocene catalysts are:
[dimethylsilanediyl(tetramethylcyclopentadienyl)(cyclododecylamido)]metal dihalide;
[dimethylsilanediyl(tetramethylcyclopentadienyl)(t-butylamido)]metal dihalide; and
[dimethylsilanediyl(tetramethylcyclopentadienyl)(exo-2-norbornyl)]metal dichalide;

wherein the metal can chosen from Zr, Hf, or Ti, preferably Ti and the halide is preferably chlorine.

Particularly preferred compounds include:
dimethylsiladiyl(tetramethylcyclopentadienyl)(cyclododecylamido)titanium dichloride,
dimethylsiladiyl(tetramethylcyclopentadienyl)(cyclohexylamido)titanium dichloride,
dimethylsiladiyl(tetramethylcyclopentadienyl)(1-adamantylamido)titanium dichloride,
dimethylsiladiyl(tetramethylcyclopentadienyl)(t-butylamido)titanium dichloride,
dimethylsiladiyl(tetramethylcyclopentadienyl)(s-butylamido)titanium dichloride,
dimethylsiladiyl(tetramethylcyclopentadienyl)(n-butylamido)titanium dichloride, dimethylsiladiyl(tetramethylcyclopentadienyl)(exo-2-norbornylamido)titanium dichloride,
diethylsilyl(tetramethylcyclopentadienyl)(cyclododecylamido)titanium dichloride,
diethylsilyl(tetramethylcyclopentadienyl)(exo-2-norbornylamido)titanium dichloride,
diethylsilyl(tetramethylcyclopentadienyl)(cyclohexylamido)titanium dichloride,
diethylsilyl(tetramethylcyclopentadienyl)(1-adamantylamido)titanium dichloride,
methylene(tetramethylcyclopentadienyl)(cyclododecylamido)titanium dichloride,
methylene(tetramethylcyclopentadienyl)(exo-2-norbornylamido)titanium dichloride, methylene(tetramethylcyclopentadienyl)(cyclohexylamido)titanium dichloride,
methylene(tetramethylcyclopentadienyl)(1-adamantylamido)titanium dichloride, dimethylsiladiyl(tetramethylcyclopentadienyl)(cyclododecylamido)titanium dimethyl,
dimethylsiladiyl(tetramethylcyclopentadienyl)(exo-2-norbornylamido)titanium dimethyl,
dimethylsiladiyl(tetramethylcyclopentadienyl)(cyclohexylamido)titanium dimethyl,
dimethylsiladiyl(tetramethylcyclopentadienyl)(1-adamantylamido)titanium dimethyl,
dimethylsiladiyl(2,5-dimethylcyclopentadienyl)(cyclododecylamido)titanium dichloride,
dimethylsiladiyl(2,5-dimethylcyclopentadienyl)(exo-2-norbornylamido)titanium dichloride,
dimethylsiladiyl(2,5-dimethylcyclopentadienyl)(cyclohexylamido)titanium dichloride,
dimethylsiladiyl(2,5-dimethylcyclopentadienyl)(1-adamantylamido)titanium dichloride,
dimethylsiladiyl(3,4-dimethylcyclopentadienyl)(cyclododecylamido)titanium dichloride,
dimethylsiladiyl(3,4-dimethylcyclopentadienyl)(exo-2-norbornylamido)titanium dichloride,
dimethylsiladiyl(3,4-dimethylcyclopentadienyl)(cyclohexylamido)titanium dichloride,
dimethylsiladiyl(3,4-dimethylcyclopentadienyl)(1-adamantylamido)titanium dichloride,
dimethylsiladiyl(2-ethyl-5-methylcyclopentadienyl)(cyclododecylamido)titanium dichloride,
dimethylsiladiyl(2-ethyl-5-methylcyclopentadienyl)(exo-2-norbornylamido)titanium dichloride, dimethylsiladiyl(2-ethyl-5-methylcyclopentadienyl)(cyclohexylamido)titanium dichloride,
dimethylsiladiyl(2-ethyl-5-methylcyclopentadienyl)(1-adamantylamido)titanium dichloride,
dimethylsiladiyl(3-ethyl-4-methylcyclopentadienyl)(cyclododecylamido)titanium dichloride,
dimethylsiladiyl(3-ethyl-4-methylcyclopentadienyl)(exo-2-norbornylamido)titanium dichloride,
dimethylsiladiyl(3-ethyl-4-methylcyclopentadienyl)(cyclohexylamido)titanium dichloride,
dimethylsiladiyl(3-ethyl-4-methylcyclopentadienyl)(1-adamantylamido)titanium dichloride,
dimethylsiladiyl(2-ethyl-3-hexyl-5-methyl-4-octylcyclopentadienyl)(cyclododecylamido)titanium dichloride,
dimethylsiladiyl(2-ethyl-3-hexyl-5-methyl-4-octylcyclopentadienyl)(exo-2-norbornylamido)titanium dichloride,
dimethylsiladiyl(2-ethyl-3-hexyl-5-methyl-4-octylcyclopentadienyl)(cyclohexylamido)titanium dichloride,
dimethylsiladiyl(2-ethyl-3-hexyl-5-methyl-4-octylcyclopentadienyl)(1-adamantylamido)titanium dichloride,
dimethylsiladiyl(2-tetrahydroindenyl)(cyclododecylamido)titanium dichloride,
dimethylsiladiyl(2-tetrahydroindenyl)(cyclohexylamido)titanium dichloride,
dimethylsiladiyl(2-tetrahydroindenyl)(1-adamantylamido) titanium dichloride, and
dimethylsiladiyl(2-tetrahydroindenyl)(exo-2-norbornylamido)titanium dichloride.

In addition preferred species include the dialkyl versions (such as dimethylated versions) of the above compounds, i.e. titanium dimethyl instead of titanium dichloride.

Additional preferred compounds include:
dimethylsiladiyl(2-methyl,4-[3',5'-di-t-butylphenyl]indenyl)$_2$zirconium dichloride;
dimethylsiladiyl(2-ethyl,4-[3',5'-di-t-butylphenyl]indenyl)$_2$zirconium dichloride;
dimethylsiladiyl(2-n-propyl,4-[3',5'-di-t-butylphenyl]indenyl)$_2$zirconium dichloride;
dimethylsiladiyl(2-iso-propyl,4-[3',5'-di-t-butylphenyl]indenyl)$_2$zirconium dichloride;
dimethylsiladiyl(2-n-butyl,4-[3',5'-di-t-butylphenyl]indenyl)$_2$zirconium dichloride;
dimethylsiladiyl(2-iso-butyl,4-[3',5'-di-t-butylphenyl]indenyl)$_2$zirconium dichloride;
dimethylsiladiyl(2-sec-butyl,4-[3',5'-di-t-butylphenyl]indenyl)$_2$zirconium dichloride;
dimethylsiladiyl(2-tert-butyl,4-[3',5'-di-t-butylphenyl]indenyl)$_2$zirconium dichloride;
dimethylsiladiyl(2-methyl,4-[3',5'-di-t-butylphenyl]indenyl)$_2$hafnium dichloride;
dimethylsiladiyl(2-ethyl,4-[3',5'-di-t-butylphenyl]indenyl)$_2$hafnium dichloride;
dimethylsiladiyl(2-n-propyl,4-[3',5'-di-t-butylphenyl]indenyl)$_2$hafnium
dimethylsiladiyl(2-iso-propyl,4-[3',5'-di-t-butylphenyl]indenyl)$_2$hafnium dichloride;
dimethylsiladiyl(2-butyl,4-[3',5'-di-t-butylphenyl]indenyl)$_2$hafnium dichloride;
9-silafluorendiyl(2-methyl,4-[3',5'di-t-butylphenyl]indenyl)$_2$zirconium dichloride;
9-silafluorendiyl(2-ethyl,4-[3',5'-di-t-butylphenyl]indenyl)$_2$zirconium dichloride;
9-silafluorendiyl(2-n-propyl,4-[3',5'-di-t-butylphenyl]indenyl)$_2$zirconium dichloride;
9-silafluorendiyl(2-iso-propyl,4-[3',5'-di-t-butylphenyl]indenyl)$_2$zirconium dichloride;
9-silafluorendiyl(2-n-butyl,4-[3',5'-di-t-butylphenyl]indenyl)$_2$zirconium dichloride;
9-silafluorendiyl(2-iso-butyl,4-[3',5'-di-t-butylphenyl]indenyl)$_2$zirconium dichloride;
9-silafluorendiyl(2-sec-butyl,4-[3',5'-di-t-butylphenyl]indenyl)$_2$zirconium dichloride;
9-silafluorendiyl(2-tert-butyl,4-[3',5'-di-t-butylphenyl]indenyl)$_2$zirconium dichloride;
9-silafluorendiyl(2-methyl,4-[3',5'-di-t-butylphenyl]indenyl)$_2$hafnium dichloride;
9-silafluorendiyl(2-ethyl,4-[3',5'-di-t-butylphenyl]indenyl)$_2$hafnium dichloride;
9-silafluorendiyl(2-n-propyl,4-[3',5'-di-t-butylphenyl]indenyl)$_2$hafnium dichloride;
9-silafluorendiyl(2-iso-propyl,4-[3',5'-di-t-butylphenyl]indenyl)$_2$hafnium dichloride;
9-silafluorendiyl(2-n-butyl,4-[3',5'-di-t-butylphenyl]indenyl)$_2$hafnium dichloride;
9-silafluorendiyl(2-iso-butyl,4-[3',5'-di-t-butylphenyl]indenyl)$_2$hafnium dichloride;
9-silafluorendiyl(2-sec-butyl,4-[3',5'-di-t-butylphenyl]indenyl)$_2$hafnium dichloride;

9-silafluorendiyl(2-tert-butyl,4-[3',5'-di-t-butylphenyl]indenyl)₂hafnium dichloride;
dimethylsiladiyl(2-methyl,4-[3',5'-di-t-butylphenyl]indenyl)₂zirconium dimethyl;
dimethylsiladiyl(2-ethyl,4-[3',5'-di-t-butylphenyl]indenyl)₂zirconium dimethyl;
dimethylsiladiyl(2-n-propyl,4-[3',5'-di-t-butylphenyl]indenyl)₂zirconium dimethyl;
dimethylsiladiyl(2-iso-propyl,4-[3',5'-di-t-butylphenyl]indenyl)₂zirconium dimethyl;
dimethylsiladiyl(2-n-butyl,4-[3',5'-di-t-butylphenyl]indenyl)₂zirconium dimethyl;
dimethylsiladiyl(2-iso-butyl,4-[3',5'-di-t-butylphenyl]indenyl)₂zirconium dimethyl;
dimethylsiladiyl(2-sec-butyl,4-[3',5'-di-t-butylphenyl]indenyl)₂zirconium dimethyl;
dimethylsiladiyl(2-tert-butyl,4-[3',5'-di-t-butylphenyl-]indenyl)₂zirconium dimethyl;
dimethylsiladiyl(2-methyl,4-[3',5'-di-t-butylphenyl]indenyl)₂hafnium dimethyl;
dimethylsiladiyl(2-ethyl,4-[3',5'-di-t-butylphenyl]indenyl)₂hafnium dimethyl;
dimethylsiladiyl(2-n-propyl,4-[3',5'-di-t-butylphenyl]indenyl)₂hafnium dimethyl
dimethylsiladiyl(2-iso-propyl,4-[3',5'-di-t-butylphenyl]indenyl)₂hafnium dimethyl;
dimethylsiladiyl(2-n-butyl,4-[3',5'-di-t-butylphenyl]indenyl)₂hafnium dimethyl;
dimethylsiladiyl(2-iso-butyl,4-[3',5'-di-t-butylphenyl]indenyl)₂hafnium dimethyl;
dimethylsiladiyl(2-sec-butyl,4-[3',5'-di-t-butylphenyl]indenyl)₂hafnium dimethyl;
dimethylsiladiyl(2-tert-butyl,4-[3',5'-di-t-butylphenyl]indenyl)₂hafnium dimethyl;
9-silafluorendiyl(2-methyl,4-[3',5'-di-t-butylphenyl]indenyl)₂zirconium dimethyl;
9-silafluorendiyl(2-ethyl,4-[3',5'-di-t-butylphenyl]indenyl)₂zirconium dimethyl;
9-silafluorendiyl(2-n-propyl,4-[3',5'-di-t-butylphenyl]indenyl)₂zirconium dimethyl;
9-silafluorendiyl(2-iso-propyl,4-[3',5'-di-t-butylphenyl]indenyl)₂zirconium dimethyl;
9-silafluorendiyl(2-n-butyl,4-[3',5'-di-t-butylphenyl]indenyl)₂zirconium dimethyl;
9-silafluorendiyl(2-iso-butyl,4-[3',5'-di-t-butylphenyl]indenyl)2zirconium dimethyl;
9-silafluorendiyl(2-sec-butyl,4-[3',5'-di-t-butylphenyl]indenyl)₂zirconium dimethyl;
9-silafluorendiyl(2-tert-butyl,4-[3',5'-di-t-butylphenyl]indenyl)₂zirconium dimethyl;
9-silafluorendiyl(2-methyl,4-[3',5'-di-t-butylphenyl]indenyl)₂hafnium dimethyl;
9-silafluorendiyl(2-ethyl,4-[3',5'-di-t-butylphenyl]indenyl)₂hafnium dimethyl;
9-silafluorendiyl(2-n-propyl,4-[3',5'-di-t-butylphenyl]indenyl)₂hafnium dimethyl;
9-silafluorendiyl(2-iso-propyl,4-[3',5'-di-t-butylphenyl]indenyl)₂hafnium dimethyl;
9-silafluorendiyl(2-n-butyl,4-[3',5'-di-t-butylphenyl]indenyl)₂hafnium dimethyl;
9-silafluorendiyl(2-iso-butyl,4-[3',5'-di-t-butylphenyl]indenyl)₂hafnium dimethyl;
9-silafluorendiyl(2-sec-butyl,4-[3',5'-di-t-butylphenyl]indenyl)₂hafnium dimethyl;
9-silafluorendiyl(2-tert-butyl,4-[3',5'-di-t-butylphenyl-]indenyl)₂hafnium dimethyl;
dimethylsiladiyl(2-methyl,4-[3',5'-bis-trifluoromethylphenyl]indenyl)₂zirconium dichloride;
dimethylsiladiyl(2-ethyl,4-[3',5'-bis-trifluoromethylphenyl]indenyl)₂zirconium dichloride;
dimethylsiladiyl(2-n-propyl,4-[3',5'-bis-trifluoromethylphenyl]indenyl)₂zirconium dichloride;
dimethylsiladiyl(2-iso-propyl,4-[3',5'-bis-trifluoromethylphenyl]indenyl)₂zirconium dichloride;
dimethylsiladiyl(2-n-butyl,4-[3',5'-bis-trifluoromethylphenyl]indenyl)₂zirconium dichloride;
dimethylsiladiyl(2-iso-butyl,4-[3',5'-bis-trifluoromethylphenyl]indenyl)₂zirconium dichloride;
dimethylsiladiyl(2-sec-butyl,4-[3',5'-bis-trifluoromethylphenyl]indenyl)₂zirconium dichloride;
dimethylsiladiyl(2-tert-butyl,4-[3',5'-bis-trifluoromethylphenyl]indenyl)₂zirconium dichloride;
dimethylsiladiyl(2-methyl,4-[3',5'-bis-trifluoromethylphenyl]indenyl)₂hafnium dichloride;
dimethylsiladiyl(2-ethyl,4-[3',5'-bis-trifluoromethylphenyl]indenyl)₂hafnium dichloride;
dimethylsiladiyl(2-n-propyl,4-[3',5'-bis-trifluoromethylphenyl]indenyl)₂hafnium dichloride;
dimethylsiladiyl(2-iso-propyl,4-[3',5'-bis-trifluoromethylphenyl]indenyl)₂hafnium dichloride;
dimethylsiladiyl(2-n-butyl,4-[3',5'-bis-trifluoromethylphenyl]indenyl)₂hafnium dichloride;
dimethylsiladiyl(2-iso-butyl,4-[3',5'-bis-trifluoromethylphenyl]indenyl)₂hafnium dichloride;
dimethylsiladiyl(2-sec-butyl,4-[3',5'-bis-trifluoromethylphenyl]indenyl)₂hafnium dichloride;
dimethylsiladiyl(2-tert-butyl,4-[3',5'-bis-trifluoromethylphenyl]indenyl)₂hafnium dichloride;
9-silafluorendiyl(2-methyl,4-[3',5'-bis-trifluoromethylphenyl]indenyl)₂zirconium dichloride;
dimethylsiladiyl(2-ethyl,4-[3',5'-bis-trifluoromethylphenyl]indenyl)₂hafnium dichloride;
9-silafluorendiyl(2-n-propyl,4-[3',5'-bis-trifluoromethylphenyl]indenyl)₂zirconium dichloride;
9-silafluorendiyl(2-iso-propyl,4-[3',5'-bis-trifluoromethylphenyl]indenyl)₂zirconium dichloride;
9-silafluorendiyl(2-n-butyl,4-[3',5'-bis-trifluoromethylphenyl]indenyl)₂zirconium dichloride;
9-silafluorendiyl(2-iso-butyl,4-[3',5'-bis-trifluoromethylphenyl]indenyl)₂zirconium dichloride;
9-silafluorendiyl(2-sec-butyl,4-[3',5'-bis-trifluoromethylphenyl]indenyl)₂zirconium dichloride;
9-silafluorendiyl(2-tert-butyl,4-[3',5'-bis-trifluoromethylphenyl]indenyl)₂zirconium dichloride;
9-silafluorendiyl(2-methyl,4-[3',5'-bis-trifluoromethylphenyl]indenyl)₂hafnium dichloride;
9-silafluorendiyl(2-ethyl,4-[3',5'-bis-trifluoromethylphenyl]indenyl)₂hafnium dichloride;
9-silafluorendiyl(2-n-propyl,4-[3',5'-bis-trifluoromethylphenyl]indenyl)₂hafnium dichloride;
9-silafluorendiyl(2-iso-propyl,4-[3',5'-bis-trifluoromethylphenyl]indenyl)₂hafnium dichloride;
9-silafluorendiyl(2-n-butyl,4-[3',5'-bis-trifluoromethylphenyl]indenyl)₂hafnium dichloride;
9-silafluorendiyl(2-iso-butyl,4-[3',5'-bis-trifluoromethylphenyl]indenyl)₂hafnium dichloride;
9-silafluorendiyl(2-sec-butyl,4-[3',5'-bis-trifluoromethylphenyl]indenyl)₂hafnium dichloride;
9-silafluorendiyl(2-tert-butyl,4-[3',5'-bis-trifluoromethylphenyl]indenyl)₂hafnium dichloride;
dimethylsiladiyl(2-methyl,4-[3',5'-bis-trifluoromethylphenyl]indenyl)₂zirconium dimethyl;

dimethylsiladiyl(2-ethyl,4-[3',5'-bis-trifluoromethylphenyl]indenyl)$_2$zirconium dimethyl;
dimethylsiladiyl(2-n-propyl,4-[3',5'-bis-trifluoromethylphenyl]indenyl)$_2$zirconium dimethyl;
dimethylsiladiyl(2-iso-propyl,4-[3',5'-bis-trifluoromethylphenyl]indenyl)$_2$zirconium dimethyl;
dimethylsiladiyl(2-n-butyl,4-[3',5'-bis-trifluoromethylphenyl]indenyl)$_2$zirconium dimethyl;
dimethylsiladiyl(2-iso-butyl,4-[3',5'-bis-trifluoromethylphenyl]indenyl)$_2$zirconium dimethyl;
dimethylsiladiyl(2-sec-butyl,4-[3',5'-bis-trifluoromethylphenyl]indenyl)$_2$zirconium dimethyl;
dimethylsiladiyl(2-tert-butyl,4-[3',5'-bis-trifluoromethylphenyl]indenyl)$_2$zirconium dimethyl;
dimethylsiladiyl(2-methyl,4-[3',5'-bis-trifluoromethylphenyl]indenyl)$_2$hafnium dimethyl;
dimethylsiladiyl(2-ethyl,4-[3',5'-bis-trifluoromethylphenyl]indenyl)$_2$hafnium dimethyl;
dimethylsiladiyl(2-n-propyl,4-[3',5'-bis-trifluoromethylphenyl]indenyl)$_2$hafnium dimethyl;
dimethylsiladiyl(2-iso-propyl,4-[3',5'-bis-trifluoromethylphenyl]indenyl)$_2$hafnium dimethyl;
dimethylsiladiyl(2-n-butyl,4-[3',5'-bis-trifluoromethylphenyl]indenyl)$_2$hafnium dimethyl;
dimethylsiladiyl(2-iso-butyl,4-[3',5'-bis-trifluoromethylphenyl]indenyl)$_2$hafnium dimethyl;
dimethylsiladiyl(2-sec-butyl,4-[3',5'-bis-trifluoromethylphenyl]indenyl)$_2$hafnium dimethyl;
dimethylsiladiyl(2-tert-butyl,4-[3',5'-bis-trifluoromethylphenyl]indenyl)$_2$hafnium dimethyl;
9-silafluorendiyl(2-methyl,4-[3',5'-bis-trifluoromethylphenyl]indenyl)$_2$zirconium dimethyl;
dimethylsiladiyl(2-ethyl,4-[3',5'-bis-trifluoromethylphenyl]indenyl)$_2$hafnium dimethyl;
9-silafluorendiyl(2-n-propyl,4-[3',5'-bis-trifluoromethylphenyl]indenyl)$_2$zirconium dimethyl;
9-silafluorendiyl(2-iso-propyl,4-[3',5'-bis-trifluoromethylphenyl]indenyl)$_2$zirconium dimethyl;
9-silafluorendiyl(2-n-butyl,4-[3',5'-bis-trifluoromethylphenyl]indenyl)$_2$zirconium dimethyl;
9-silafluorendiyl(2-iso-butyl,4-[3',5'-bis-trifluoromethylphenyl]indenyl)$_2$zirconium dimethyl;
9-silafluorendiyl(2-sec-butyl,4-[3',5'-bis-trifluoromethylphenyl]indenyl)$_2$zirconium dimethyl;
9-silafluorendiyl(2-tert-butyl,4-[3',5'-bis-trifluoromethylphenyl]indenyl)$_2$zirconium dimethyl;
9-silafluorendiyl(2-methyl,4-[3',5'-bis-trifluoromethylphenyl]indenyl)$_2$hafnium dimethyl;
9-silafluorendiyl(2-ethyl,4-[3',5'-bis-trifluoromethylphenyl]indenyl)$_2$hafnium dimethyl;
9-silafluorendiyl(2-n-propyl,4-[3',5'-bis-trifluoromethylphenyl]indenyl)$_2$hafnium dimethyl;
9-silafluorendiyl(2-iso-propyl,4-[3',5'-bis-trifluoromethylphenyl]indenyl)$_2$hafnium dimethyl;
9-silafluorendiyl(2-n-butyl,4-[3',5'-bis-trifluoromethylphenyl]indenyl)$_2$hafnium dimethyl;
9-silafluorendiyl(2-iso-butyl,4-[3',5'-bis-trifluoromethylphenyl]indenyl)$_2$hafnium dimethyl;
9-silafluorendiyl(2-sec-butyl,4-[3',5'-bis-trifluoromethylphenyl]indenyl)$_2$hafnium dimethyl;
9-silafluorendiyl(2-tert-butyl,4-[3',5'-bis-trifluoromethylphenyl]indenyl)$_2$hafnium dimethyl;
dimethylsiladiyl(2-ethyl,4-[3',5'-di-iso-propylphenyl]indenyl)$_2$zirconium dichloride;
dimethylsiladiyl(2-n-propyl,4-[3',5'-di-iso-propylphenyl]indenyl)$_2$zirconium dichloride
dimethylsiladiyl(2-iso-propyl,4-[3',5'-di-iso-propylphenyl]indenyl)$_2$zirconium dichloride;
dimethylsiladiyl(2-n-butyl,4-[3',5'-di-iso-propylphenyl]indenyl)$_2$zirconium dichloride;
dimethylsiladiyl(2-iso-butyl,4-[3',5'-di-iso-propylphenyl]indenyl)$_2$zirconium dichloride;
dimethylsiladiyl(2-sec-butyl,4-[3',5'-di-iso-propylphenyl]indenyl)$_2$zirconium dichloride;
dimethylsiladiyl(2-tert-butyl,4-[3',5'-di-iso-propylphenyl]indenyl)$_2$zirconium dichloride;
dimethylsiladiyl(2-ethyl,4-[3',5'-di-iso-propylphenyl]indenyl)$_2$hafnium dichloride;
dimethylsiladiyl(2-n-propyl,4-[3',5'-di-iso-propylphenyl]indenyl)$_2$hafnium dichloride;
dimethylsiladiyl(2-iso-propyl,4-[3',5'-di-iso-propylphenyl]indenyl)$_2$hafnium dichloride;
dimethylsiladiyl(2-n-butyl,4-[3',5'-di-iso-propylphenyl]indenyl)$_2$hafnium dichloride;
dimethylsiladiyl(2-iso-butyl,4-[3',5'-di-iso-propylphenyl]indenyl)$_2$hafnium dichloride;
dimethylsiladiyl(2-sec-butyl,4-[3',5'-di-iso-propylphenyl]indenyl)$_2$hafnium dichloride;
dimethylsiladiyl(2-tert-butyl,4-[3',5'-di-iso-propylphenyl]indenyl)$_2$hafnium dichloride;
9-silafluorendiyl(2-ethyl,4-[3',5'-di-iso-propylphenyl]indenyl)$_2$zirconium dichloride;
9-silafluorendiyl(2-n-propyl,4-[3',5'-di-iso-propylphenyl]indenyl)$_2$zirconium dichloride;
9-silafluorendiyl(2-iso-propyl,4-[3',5'-di-iso-propylphenyl]indenyl)$_2$zirconium dichloride;
9-silafluorendiyl(2-n-butyl,4-[3',5'-di-iso-propylphenyl]indenyl)$_2$zirconium dichloride;
9-silafluorendiyl(2-iso-butyl,4-[3',5'-di-iso-propylphenyl]indenyl)$_2$zirconium dichloride;
9-silafluorendiyl(2-sec-butyl,4-[3',5'-di-iso-propylphenyl]indenyl)$_2$zirconium dichloride;
9-silafluorendiyl(2-tert-butyl,4-[3',5'-di-iso-propylphenyl]indenyl)$_2$zirconium dichloride;
9-silafluorendiyl(2-ethyl,4-[3',5'-di-iso-propylphenyl]indenyl)$_2$hafnium dichloride;
9-silafluorendiyl(2-n-propyl,4-[3',5'-di-iso-propylphenyl]indenyl)$_2$hafnium dichloride;
9-silafluorendiyl(2-iso-propyl,4-[3',5'-di-iso-propylphenyl]indenyl)$_2$hafnium dichloride;
9-silafluorendiyl(2-n-butyl,4-[3',5'-di-iso-propylphenyl]indenyl)$_2$hafnium dichloride;
9-silafluorendiyl(2-iso-butyl,4-[3',5'-di-iso-propylphenyl]indenyl)$_2$hafnium dichloride;
9-silafluorendiyl(2-sec-butyl,4-[3',5'-di-iso-propylphenyl]indenyl)$_2$hafnium dichloride;
9-silafluorendiyl(2-tert-butyl,4-[3',5'-di-iso-propylphenyl]indenyl)$_2$hafnium dichloride;
dimethylsiladiyl(2-ethyl,4-[3',5'-di-iso-propylphenyl]indenyl)$_2$zirconium dimethyl;
dimethylsiladiyl(2-n-propyl,4-[3',5'-di-iso-propylphenyl]indenyl)$_2$zirconium dimethyl
dimethylsiladiyl(2-iso-propyl,4-[3',5'-di-iso-propylphenyl]indenyl)$_2$zirconium dimethyl;
dimethylsiladiyl(2-n-butyl,4-[3',5'-di-iso-propylphenyl]indenyl)$_2$zirconium dimethyl;
dimethylsiladiyl(2-isobutyl,4-[3',5'-di-iso-propylphenyl]indenyl)$_2$zirconium dimethyl;
dimethylsiladiyl(2-sec-butyl,4-[3',5'-di-iso-propylphenyl]indenyl)$_2$zirconium dimethyl;
dimethylsiladiyl(2-tert-butyl,4-[3',5'-di-iso-propylphenyl]indenyl)$_2$zirconium dimethyl;

dimethylsiladiyl(2-ethyl,4-[3',5'-di-iso-propylphenyl]indenyl)₂hafnium dimethyl;
dimethylsiladiyl(2-n-propyl,4-[3',5'-di-iso-propylphenyl]indenyl)₂hafnium dimethyl;
dimethylsiladiyl(2-iso-propyl,4-[3',5'-di-iso-propylphenyl]indenyl)₂hafnium dimethyl;
dimethylsiladiyl(2-n-butyl,4-[3',5'-di-iso-propylphenyl]indenyl)₂hafnium dimethyl;
dimethylsiladiyl(2-iso-butyl,4-[3',5'-di-iso-propylphenyl]indenyl)₂zirconium dimethyl;
dimethylsiladiyl(2-sec-butyl,4-[3',5'-di-iso-propylphenyl]indenyl)₂zirconium dimethyl;
dimethylsiladiyl(2-tert-butyl,4-[3',5'-di-iso-propylphenyl]indenyl)₂zirconium dimethyl;
9-silafluorendiyl(2-ethyl,4-[3',5'-di-iso-propylphenyl]indenyl)₂zirconium dimethyl;
9-silafluorendiyl(2-n-propyl,4-[3',5'-di-iso-propylphenyl]indenyl)₂zirconium dimethyl;
9-silafluorendiyl(2-iso-propyl,4-[3',5'-di-iso-propylphenyl]indenyl)₂zirconium dimethyl;
9-silafluorendiyl(2-n-butyl,4-[3',5'-di-iso-propylphenyl]indenyl)₂zirconium dimethyl;
9-silafluorendiyl(2-iso-butyl,4-[3',5'-di-iso-propylphenyl]indenyl)₂zirconium dimethyl;
9-silafluorendiyl(2-sec-butyl,4-[3',5'-di-iso-propylphenyl]indenyl)₂zirconium dimethyl;
9-silafluorendiyl(2-tert-butyl,4-[3',5'-di-iso-propylphenyl]indenyl)₂zirconium dimethyl;
9-silafluorendiyl(2-ethyl,4-[3',5'-di-iso-propylphenyl]indenyl)₂hafnium dimethyl;
9-silafluorendiyl(2-n-propyl,4-[3',5'-di-iso-propylphenyl]indenyl)₂hafnium dimethyl;
9-silafluorendiyl(2-iso-propyl,4-[3',5'-di-iso-propylphenyl]indenyl)2hafnium dimethyl;
9-silafluorendiyl(2-n-butyl,4-[3',5'-di-iso-propylphenyl]indenyl)₂hafnium dimethyl;
9-silafluorendiyl(2-iso-butyl,4-[3',5'-di-iso-propylphenyl]indenyl)₂hafnium dimethyl;
9-silafluorendiyl(2-sec-butyl,4-[3',5'-di-iso-propylphenyl]indenyl)₂hafnium dimethyl;
9-silafluorendiyl(2-tert-butyl,4-[3',5'-di-iso-propylphenyl]indenyl)₂hafnium dimethyl;
dimethylsiladiyl(2-methyl,4-[3',5'-di-phenylphenyl]indenyl)₂zirconium dichloride;
dimethylsiladiyl(2-ethyl,4-[3',5'-di-phenylphenyl]indenyl)₂zirconium dichloride;
dimethylsiladiyl(2-n-propyl,4-[3',5'-di-phenylphenyl]indenyl)₂zirconium dichloride;
dimethylsiladiyl(2-iso-propyl,4-[3',5'-di-phenylphenyl]indenyl)₂zirconium dichloride;
dimethylsiladiyl(2-n-butyl,4-[3',5'-di-phenylphenyl]indenyl)₂zirconium dichloride;
dimethylsiladiyl(2-iso-butyl,4-[3',5'-di-phenylphenyl]indenyl)₂zirconium dichloride;
dimethylsiladiyl(2-sec-butyl,4-[3',5'-di-phenylphenyl]indenyl)₂zirconium dichloride;
dimethylsiladiyl(2-tert-butyl,4-[3',5'-di-phenylphenyl]indenyl)₂zirconium dichloride;
dimethylsiladiyl(2-methyl,4-[3',5'-di-phenylphenyl]indenyl)₂hafnium dichloride;
dimethylsiladiyl(2-ethyl,4-[3',5'-di-phenylphenyl]indenyl)₂hafnium dichloride;
dimethylsiladiyl(2-n-propyl,4-[3',5'-di-phenylphenyl]indenyl)₂hafnium dichloride;
dimethylsiladiyl(2-iso-propyl,4-[3',5'-di-phenylphenyl]indenyl)₂hafnium dichloride;
dimethylsiladiyl(2-n-butyl,4-[3',5'-di-phenylphenyl]indenyl)₂hafnium dichloride;
dimethylsiladiyl(2-iso-butyl,4-[3',5'-di-phenylphenyl]indenyl)₂hafnium dichloride;
dimethylsiladiyl(2-sec-butyl,4-[3',5'-di-phenylphenyl]indenyl)₂hafnium dichloride;
dimethylsiladiyl(2-tert-butyl,4-[3',5'-di-phenylphenyl]indenyl)₂hafnium dichloride;
9-silafluorendiyl(2-methyl,4-[3',5'-di-phenylphenyl]indenyl)₂zirconium dichloride;
9-silafluorendiyl(2-ethyl,4-[3',5'-di-phenylphenyl]indenyl)₂zirconium dichloride;
9-silafluorendiyl(2-n-propyl,4-[3',5'-di-phenylphenyl]indenyl)₂zirconium dichloride;
9-silafluorendiyl(2-iso-propyl,4-[3',5'-di-phenylphenyl]indenyl)₂zirconium dichloride;
9-silafluorendiyl(2-n-butyl,4-[3',5'-di-phenylphenyl]indenyl)₂zirconium dichloride;
9-silafluorendiyl(2-iso-butyl,4-[3',5'-di-phenylphenyl]indenyl)₂zirconium dichloride;
9-silafluorendiyl(2-sec-butyl,4-[3',5'-di-phenylphenyl]indenyl)₂zirconium dichloride;
9-silafluorendiyl(2-tert-butyl,4-[3',5'-di-phenylphenyl]indenyl)₂zirconium dichloride;
9-silafluorendiyl(2-methyl,4-[3',5'-di-phenylphenyl]indenyl)₂hafnium dichloride;
9-silafluorendiyl(2-ethyl,4-[3',5'-di-phenylphenyl]indenyl)₂hafnium dichloride;
9-silafluorendiyl(2-n-propyl,4-[3',5'-di-phenylphenyl]indenyl)₂hafnium dichloride;
9-silafluorendiyl(2-iso-propyl,4-[3',5'-di-phenylphenyl]indenyl)₂hafnium dichloride;
9-silafluorendiyl(2-n-butyl,4-[3',5'-di-phenylphenyl]indenyl)₂hafnium dichloride;
9-silafluorendiyl(2-iso-butyl,4-[3',5'-di-phenylphenyl]indenyl)₂hafnium dichloride;
9-silafluorendiyl(2-sec-butyl,4-[3',5'-di-phenylphenyl]indenyl)₂hafnium dichloride;
9-silafluorendiyl(2-tert-butyl,4-[3',5'-di-phenylphenyl]indenyl)₂hafnium dichloride;
dimethylsiladiyl(2-methyl,4-[3',5'-di-phenylphenyl]indenyl)₂zirconium dimethyl;
dimethylsiladiyl(2-ethyl,4-[3',5'-di-phenylphenyl]indenyl)₂zirconium dimethyl;
dimethylsiladiyl(2-n-propyl,4-[3',5'-di-phenylphenyl]indenyl)₂zirconium dimethyl;
dimethylsiladiyl(2-iso-propyl,4-[3',5'-di-phenylphenyl]indenyl)₂zirconium dimethyl;
dimethylsiladiyl(2-n-butyl,4-[3',5'-di-phenylphenyl]indenyl)₂zirconium dimethyl;
dimethylsiladiyl(2-iso-butyl,4-[3',5'-di-phenylphenyl]indenyl)₂zirconium dimethyl;
dimethylsiladiyl(2-sec-butyl,4-[3',5'-di-phenylphenyl]indenyl)₂zirconium dimethyl;
dimethylsiladiyl(2-tert-butyl,4-[3',5'-di-phenylphenyl]indenyl)₂zirconium dimethyl;
dimethylsiladiyl(2-methyl,4-[3',5'-di-phenylphenyl]indenyl)₂hafnium dimethyl;
dimethylsiladiyl(2-ethyl,4-[3',5'-di-phenylphenyl]indenyl)₂hafnium dimethyl;
dimethylsiladiyl(2-n-propyl,4-[3',5'-di-phenylphenyl]indenyl)₂hafnium dimethyl;
dimethylsiladiyl(2-iso-propyl,4-[3',5'-di-phenylphenyl]indenyl)₂hafnium dimethyl;
dimethylsiladiyl(2-n-butyl,4-[3',5'-di-phenylphenyl]indenyl)₂hafnium dimethyl;

dimethylsiladiyl(2-iso-butyl,4-[3',5'-di-phenylphenyl]indenyl)₂hafnium dimethyl;
dimethylsiladiyl(2-sec-butyl,4-[3',5'-di-phenylphenyl]indenyl)₂hafnium dimethyl;
dimethylsiladiyl(2-tert-butyl,4-[3',5'-di-phenylphenyl]indenyl)₂hafnium dimethyl;
9-silafluorendiyl(2-methyl,4-[3',5'-di-phenylphenyl]indenyl)₂zirconium dimethyl;
9-silafluorendiyl(2-ethyl,4-[3',5'-di-phenylphenyl]indenyl)₂zirconium dimethyl;
9-silafluorendiyl(2-n-propyl,4-[3',5'-di-phenylphenyl]indenyl)₂zirconium dimethyl;
9-silafluorendiyl(2-iso-propyl,4-[3',5'-di-phenylphenyl]indenyl)₂zirconium dimethyl;
9-silafluorendiyl(2-n-butyl,4-[3',5'-di-phenylphenyl]indenyl)₂zirconium dimethyl;
9-silafluorendiyl(2-iso-butyl,4-[3',5'-di-phenylphenyl]indenyl)2zirconium dimethyl;
9-silafluorendiyl(2-sec-butyl,4-[3',5'-di-phenylphenyl]indenyl)₂zirconium dimethyl;
9-silafluorendiyl(2-tert-butyl,4-[3',5'-di-phenylphenyl]indenyl)₂zirconium dimethyl;
9-silafluorendiyl(2-methyl,4-[3',5'-di-phenylphenyl]indenyl)₂hafnium dimethyl;
9-silafluorendiyl(2-ethyl,4-[3',5'-di-phenylphenyl]indenyl)₂hafnium dichloride;
9-silafluorendiyl(2-n-propyl,4-[3',5'-di-phenylphenyl]indenyl)₂hafnium dimethyl;
9-silafluorendiyl(2-iso-propyl,4-[3',5'-di-phenylphenyl]indenyl)₂hafnium dimethyl;
9-silafluorendiyl(2-n-butyl,4-[3',5'-di-phenylphenyl]indenyl)₂hafnium dimethyl;
9-silafluorendiyl(2-iso-butyl,4-[3',5'-di-phenylphenyl]indenyl)₂hafnium dimethyl;
9-silafluorendiyl(2-sec-butyl,4-[3',5'-di-phenylphenyl]indenyl)₂hafnium dimethyl;
9-silafluorendiyl(2-tert-butyl,4-[3',5'-di-phenylphenyl]indenyl)₂hafnium dimethyl;
dimethylamidoborane(2-methyl,4-[3',5'-di-t-butylphenyl]indenyl)₂zirconium dichloride;
dimethylamidoborane(2-ethyl,4-[3',5'-di-t-butylphenyl]indenyl)₂zirconium dichloride;
dimethylamidoborane(2-n-propyl,4-[3',5'-di-t-butylphenyl]indenyl)₂zirconium dichloride;
dimethylamidoborane(2-iso-propyl,4-[3',5'-di-t-butylphenyl]indenyl)2zirconium dichloride;
dimethylamidoborane(2-n-butyl,4-[3',5'-di-t-butylphenyl]indenyl)₂zirconium dichloride;
dimethylamidoborane(2-iso-butyl,4-[3',5'-di-t-butylphenyl]indenyl)₂zirconium dichloride;
dimethylamidoborane(2-sec-butyl,4-[3',5'-di-t-butylphenyl]indenyl)₂zirconium dichloride;
dimethylamidoborane(2-tert-butyl,4-[3',5'-di-t-butylphenyl]indenyl)₂zirconium dichloride;
dimethylamidoborane(2-ethyl,4-[3',5'-bis-trifluoromethylphenyl]indenyl)₂zirconium dichloride;
dimethylamidoborane(2-n-propyl,4-[3',5'-bis-trifluoromethylphenyl]indenyl)₂zirconium dichloride;
dimethylamidoborane(2-iso-propyl,4-[3',5'-bis-trifluoromethylphenyl]indenyl)₂zirconium dichloride;
dimethylamidoborane(2-n-butyl,4-[3',5'-bis-trifluoromethylphenyl]indenyl)₂zirconium dichloride;
dimethylamidoborane(2-iso-butyl,4-[3',5'-bis-trifluoromethylphenyl]indenyl)₂zirconium dichloride;
dimethylamidoborane(2-sec-butyl,4-[3',5'-bis-trifluoromethylphenyl]indenyl)₂zirconium dichloride;
dimethylamidoborane(2-tert-butyl,4-[3',5'-bis-trifluoromethylphenyl]indenyl)₂zirconium dichloride;
dimethylamidoborane(2-ethyl,4-[3',5'-di-iso-propylphenyl]indenyl)₂zirconium dichloride;
dimethylamidoborane(2-n-propyl,4-[3',5'-di-iso-propylphenyl]indenyl)₂zirconium dichloride
dimethylamidoborane(2-iso-propyl,4-[3',5'-di-iso-propylphenyl]indenyl)₂zirconium dichloride;
dimethylamidoborane(2-n-butyl,4-[3',5'-di-iso-propylphenyl]indenyl)₂zirconium dichloride;
dimethylamidoborane(2-iso-butyl,4-[3',5'-di-iso-propylphenyl]indenyl)₂zirconium dichloride;
dimethylamidoborane(2-sec-butyl,4-[3',5'-di-iso-propylphenyl]indenyl)₂zirconium dichloride;
dimethylamidoborane(2-tert-butyl,4-[3',5'-di-iso-propylphenyl]indenyl)₂zirconium dichloride;
dimethylamidoborane(2-methyl,4-[3',5'-di-phenylphenyl]indenyl)₂zirconium dichloride;
dimethylamidoborane(2-ethyl,4-[3',5'-di-phenylphenyl]indenyl)₂zirconium dichloride;
dimethylamidoborane(2-n-propyl,4-[3',5'-di-phenylphenyl]indenyl)₂zirconium dichloride;
dimethylamidoborane(2-iso-propyl,4-[3',5'-di-phenylphenyl]indenyl)₂zirconium dichloride;
dimethylamidoborane(2-n-butyl,4-[3',5'-di-phenylphenyl]indenyl)₂zirconium dichloride;
dimethylamidoborane(2-iso-butyl,4-[3',5'-di-phenylphenyl]indenyl)₂zirconium dichloride;
dimethylamidoborane(2-sec-butyl,4-[3',5'-di-phenylphenyl]indenyl)₂zirconium dichloride;
dimethylamidoborane(2-tert-butyl,4-[3',5'-di-phenylphenyl]indenyl)₂zirconium dichloride;
dimethylamidoborane(2-methyl,4-[3',5'-di-t-butylphenyl]indenyl)₂ zirconium dimethyl;
dimethylamidoborane(2-ethyl,4-[3',5'-di-t-butylphenyl]indenyl)₂zirconium dimethyl;
dimethylamidoborane(2-n-propyl,4-[3',5'-di-t-butylphenyl]indenyl)₂zirconium dimethyl;
dimethylamidoborane(2-iso-propyl,4-[3',5'-di-t-butylphenyl]indenyl)₂zirconium dimethyl;
dimethylamidoborane(2-n-butyl,4-[3',5'-di-t-butylphenyl]indenyl)₂zirconium dimethyl;
dimethylamidoborane(2-iso-butyl,4-[3',5'-di-t-butylphenyl]indenyl)₂zirconium dimethyl;
dimethylamidoborane(2-sec-butyl,4-[3',5'-di-t-butylphenyl]indenyl)₂zirconium dimethyl;
dimethylamidoborane(2-tert-butyl,4-[3',5'-di-t-butylphenyl]indenyl)₂zirconium dimethyl;
dimethylamidoborane(2-ethyl,4-[3',5'-bis-trifluoromethylphenyl]indenyl)₂zirconium dimethyl;
dimethylamidoborane(2-n-propyl,4-[3',5'-bis-trifluoromethylphenyl]indenyl)₂zirconium dimethyl;
dimethylamidoborane(2-iso-propyl,4-[3',5'-bis-trifluoromethylphenyl]indenyl)₂zirconium dimethyl;
dimethylamidoborane(2-n-butyl,4-[3',5'-bis-trifluoromethylphenyl]indenyl)₂zirconium dimethyl;
dimethylamidoborane(2-iso-butyl,4-[3',5'-bis-trifluoromethylphenyl]indenyl)₂zirconium dimethyl;
dimethylamidoborane(2-sec-butyl,4-[3',5'-bis-trifluoromethylphenyl]indenyl)₂zirconium dimethyl;
dimethylamidoborane(2-tert-butyl,4-[3',5'-bis-trifluoromethylphenyl]indenyl)₂zirconium dimethyl;
dimethylamidoborane(2-ethyl,4-[3',5'-di-iso-propylphenyl]indenyl)₂zirconium dimethyl;
dimethylamidoborane(2-n-propyl,4-[3',5'-di-iso-propylphenyl]indenyl)₂zirconium dimethyl dimethylamidoborane(2-iso-propyl,4-[3',5'-di-iso-propylphenyl]indenyl)₂zirconium dimethyl;
dimethylamidoborane(2-n-butyl,4-[3',5'-di-iso-propylphenyl]indenyl)₂zirconium dimethyl;
dimethylamidoborane(2-iso-butyl,4-[3',5'-di-iso-propylphenyl]indenyl)₂zirconium dimethyl;
dimethylamidoborane(2-sec-butyl,4-[3',5'-di-iso-propylphenyl]indenyl)₂zirconium dimethyl;
dimethylamidoborane(2-tert-butyl,4-[3',5'-di-iso-propylphenyl]indenyl)₂zirconium dimethyl;
dimethylamidoborane(2-methyl,4-[3',5'-di-phenylphenyl]indenyl)₂zirconium dimethyl;
dimethylamidoborane(2-ethyl,4-[3',5'-di-phenylphenyl]indenyl)₂zirconium dimethyl;
dimethylamidoborane(2-n-propyl,4-[3',5'-di-phenylphenyl]indenyl)₂zirconium dimethyl;
dimethylamidoborane(2-iso-propyl,4-[3',5'-di-phenylphenyl]indenyl)₂zirconium dimethyl;
dimethylamidoborane(2-n-butyl,4-[3',5'-di-phenylphenyl]indenyl)₂zirconium dimethyl;
dimethylamidoborane(2-iso-butyl,4-[3',5'-di-phenylphenyl]indenyl)₂zirconium dimethyl;
dimethylamidoborane(2-sec-butyl,4-[3',5'-di-phenylphenyl]indenyl)₂zirconium dimethyl;
dimethylamidoborane(2-tert-butyl,4-[3',5'-di-phenylphenyl]indenyl)₂zirconium dimethyl;
diisopropylamidoborane(2-methyl,4-[3',5'-di-t-butylphenyl]indenyl)₂zirconium dichloride;
diisopropylamidoborane(2-ethyl,4-[3',5'-di-t-butylphenyl]indenyl)₂zirconium dichloride;
diisopropylamidoborane(2-n-propyl,4-[3',5'-di-t-butylphenyl]indenyl)₂zirconium dichloride;
diisopropylamidoborane(2-iso-propyl,4-[3',5'-di-t-butylphenyl]indenyl)₂zirconium dichloride;
diisopropylamidoborane(2-n-butyl,4-[3',5'-di-t-butylphenyl]indenyl)₂zirconium dichloride;
diisopropylamidoborane(2-iso-butyl,4-[3',5'-di-t-butylphenyl-]indenyl)₂zirconium dichloride;
diisopropylamidoborane(2-sec-butyl,4-[3',5'-di-t-butylphenyl]indenyl)₂zirconium dichloride;
diisopropylamidoborane(2-tert-butyl,4-[3',5'-di-t-butylphenyl]indenyl)₂zirconium dichloride;
diisopropylamidoborane(2-ethyl,4-[3',5'-bis-trifluoromethylphenyl]indenyl)₂zirconium dichloride;
diisopropylamidoborane(2-n-propyl,4-[3',5'-bis-trifluoromethylphenyl]indenyl)₂zirconium dichloride;
diisopropylamidoborane(2-iso-propyl,4-[3',5'-bis-trifluoromethylphenyl]indenyl)₂zirconium dichloride;
diisopropylamidoborane(2-n-butyl,4-[3',5'-bis-trifluoromethylphenyl]indenyl)₂zirconium dichloride;
diisopropylamidoborane(2-iso-butyl,4-[3',5'-bis-trifluoromethylphenyl]indenyl)₂zirconium dichloride;
diisopropylamidoborane(2-sec-butyl,4-[3',5'-bis-trifluoromethylphenyl]indenyl)₂zirconium dichloride;
diisopropylamidoborane(2-tert-butyl,4-[3',5'-bis-trifluoromethylphenyl]indenyl)₂zirconium dichloride;
diisopropylamidoborane(2-ethyl,4-[3',5'-di-iso-propylphenyl]indenyl)₂zirconium dichloride;
diisopropylamidoborane(2-n-propyl,4-[3',5'-di-iso-propylphenyl]indenyl)₂zirconium dichloride
diisopropylamidoborane(2-iso-propyl,4-[3',5'-di-iso-propylphenyl]indenyl)₂zirconium dichloride;
diisopropylamidoborane(2-n-butyl,4-[3',5'-di-iso-propylphenyl]indenyl)₂zirconium dichloride;
diisopropylamidoborane(2-iso-butyl,4-[3',5'-di-iso-propylphenyl]indenyl)₂zirconium dichloride;
diisopropylamidoborane(2-sec-butyl,4-[3',5'-di-iso-propylphenyl]indenyl)₂zirconium dichloride;
diisopropylamidoborane(2-tert-butyl,4-[3',5'-di-iso-propylphenyl]indenyl)₂zirconium dichloride;
diisopropylamidoborane(2-methyl,4-[3',5'-di-phenylphenyl]indenyl)₂zirconium dichloride;
diisopropylamidoborane(2-ethyl,4-[3',5'-di-phenylphenyl]indenyl)₂zirconium dichloride;
diisopropylamidoborane(2-n-propyl,4-[3',5'-di-phenylphenyl]indenyl)₂zirconium dichloride;
diisopropylamidoborane(2-iso-propyl,4-[3',5'-di-phenylphenyl]indenyl)₂zirconium dichloride;
diisopropylamidoborane(2-n-butyl,4-[3',5'-di-phenylphenyl]indenyl)₂zirconium dichloride;
diisopropylamidoborane(2-iso-butyl,4-[3',5'-di-phenylphenyl]indenyl)₂zirconium dichloride;
diisopropylamidoborane(2-sec-butyl,4-[3',5'-di-phenylphenyl]indenyl)₂zirconium dichloride;
diisopropylamidoborane(2-tert-butyl,4-[3',5'-di-phenylphenyl]indenyl)₂zirconium dichloride;
diisopropylamidoborane(2-methyl,4-[3',5'-di-t-butylphenyl]indenyl)₂zirconium dimethyl;
diisopropylamidoborane(2-ethyl,4-[3',5'-di-t-butylphenyl]indenyl)₂zirconium dimethyl;
diisopropylamidoborane(2-n-propyl,4-[3',5'-di-t-butylphenyl]indenyl)₂zirconium dimethyl;
diisopropylamidoborane(2-iso-propyl,4-[3',5'-di-t-butylphenyl]indenyl)₂zirconium dimethyl;
diisopropylamidoborane(2-n-butyl,4-[3',5'-di-t-butylphenyl]indenyl)₂zirconium dimethyl;
diisopropylamidoborane(2-iso-butyl,4-[3',5'-di-t-butylphenyl]indenyl)₂zirconium dimethyl;
diisopropylamidoborane(2-sec-butyl,4-[3',5'-di-t-butylphenyl]indenyl)₂zirconium dimethyl;
diisopropylamidoborane(2-tert-butyl,4-[3',5'-di-t-butylphenyl]indenyl)₂zirconium dimethyl;
diisopropylamidoborane(2-ethyl,4-[3',5'-bis-trifluoromethylphenyl]indenyl)₂zirconium dimethyl;
diisopropylamidoborane(2-n-propyl,4-[3',5'-bis-trifluoromethylphenyl]indenyl)₂zirconium dimethyl;
diisopropylamidoborane(2-iso-propyl,4-[3',5'-bis-trifluoromethylphenyl]indenyl)₂zirconium dimethyl;
diisopropylamidoborane(2-n-butyl,4-[3',5'-bis-trifluoromethylphenyl]indenyl)₂zirconium dimethyl;
diisopropylamidoborane(2-iso-butyl,4-[3',5'-bis-trifluoromethylphenyl]indenyl)₂zirconium dimethyl;
diisopropylamidoborane(2-sec-butyl,4-[3',5'-bis-trifluoromethylphenyl]indenyl)₂zirconium dimethyl;
diisopropylamidoborane(2-tert-butyl,4-[3',5'-bis-trifluoromethylphenyl]indenyl)₂zirconium dimethyl;
diisopropylamidoborane(2-ethyl,4-[3',5'-di-iso-propylphenyl]indenyl)₂zirconium dimethyl;
diisopropylamidoborane(2-n-propyl,4-[3',5'-di-iso-propylphenyl]indenyl)₂zirconium dimethyl
diisopropylamidoborane(2-iso-propyl,4-[3',5'-di-iso-propylphenyl]indenyl)₂zirconium dimethyl;
diisopropylamidoborane(2-n-butyl,4-[3',5'-di-iso-propylphenyl]indenyl)₂zirconium dimethyl;
diisopropylamidoborane(2-iso-butyl,4-[3',5'-di-iso-propylphenyl]indenyl)₂zirconium dimethyl;
diisopropylamidoborane(2-sec-butyl,4-[3',5'-di-iso-propylphenyl]indenyl)₂zirconium dimethyl;
diisopropylamidoborane(2-tert-butyl,4-[3',5'-di-iso-propylphenyl]indenyl)₂zirconium dimethyl;
diisopropylamidoborane(2-methyl,4-[3',5'-di-phenylphenyl]indenyl)₂zirconium dimethyl;

diisopropylamidoborane(2-ethyl,4-[3',5'-di-phenylphenyl]indenyl)$_2$zirconium dimethyl;
diisopropylamidoborane(2-n-propyl,4-[3',5'-di-phenylphenyl]indenyl)$_2$zirconium dimethyl;
diisopropylamidoborane(2-iso-propyl,4-[3',5'-di-phenylphenyl]indenyl)$_2$zirconium dimethyl;
diisopropylamidoborane(2-n-butyl,4-[3',5'-di-phenylphenyl]indenyl)$_2$zirconium dimethyl;
diisopropylamidoborane(2-iso-butyl,4-[3',5'-di-phenylphenyl]indenyl)$_2$zirconium dimethyl;
diisopropylamidoborane(2-sec-butyl,4-[3',5'-di-phenylphenyl]indenyl)$_2$zirconium dimethyl;
diisopropylamidoborane(2-tert-butyl,4-[3',5'-di-phenylphenyl]indenyl)$_2$zirconium dimethyl;
bis(trimethylsilyl)amidoborane(2-methyl,4-[3',5'-di-t-butylphenyl]indenyl)$_2$zirconium dichloride;
bis(trimethylsilyl)amidoborane(2-ethyl,4-[3',5'-di-t-butylphenyl]indenyl)$_2$zirconium dichloride;
bis(trimethylsilyl)amidoborane(2-n-propyl,4-[3',5'-di-t-butylphenyl]indenyl)$_2$zirconium dichloride;
bis(trimethylsilyl)amidoborane(2-iso-propyl,4-[3',5'-di-t-butylphenyl]indenyl)$_2$zirconium dichloride;
bis(trimethylsilyl)amidoborane(2-n-butyl,4-[3',5'-di-t-butylphenyl]indenyl)$_2$zirconium dichloride;
bis(trimethylsilyl)amidoborane(2-iso-butyl,4-[3',5'-di-t-butylphenyl]indenyl)$_2$zirconium dichloride;
bis(trimethylsilyl)amidoborane(2-sec-butyl,4-[3',5'-di-t-butylphenyl]indenyl)$_2$zirconium dichloride;
bis(trimethylsilyl)amidoborane(2-tert-butyl,4-[3',5'-di-t-butylphenyl]indenyl)$_2$zirconium dichloride;
bis(trimethylsilyl)amidoborane(2-ethyl,4-[3',5'-bis-trifluoromethylphenyl]indenyl)$_2$zirconium dichloride;
bis(trimethylsilyl)amidoborane(2-n-propyl,4-[3',5'-bis-trifluoromethylphenyl]indenyl)$_2$zirconium dichloride;
bis(trimethylsilyl)amidoborane(2-iso-propyl,4-[3',5'-bis-trifluoromethylphenyl]indenyl)$_2$zirconium dichloride;
bis(trimethylsilyl)amidoborane(2-n-butyl,4-[3',5'-bis-trifluoromethylphenyl]indenyl)$_2$zirconium dichloride;
bis(trimethylsilyl)amidoborane(2-iso-butyl,4-[3',5'-bis-trifluoromethylphenyl]indenyl)$_2$zirconium dichloride;
bis(trimethylsilyl)amidoborane(2-sec-butyl,4-[3',5'-bis-trifluoromethylphenyl]indenyl)$_2$zirconium dichloride;
bis(trimethylsilyl)amidoborane(2-tert-butyl,4-[3',5'-bis-trifluoromethylphenyl]indenyl)$_2$zirconium dichloride;
bis(trimethylsilyl)amidoborane(2-ethyl,4-[3',5'-di-iso-propylphenyl]indenyl)$_2$zirconium dichloride;
bis(trimethylsilyl)amidoborane(2-n-propyl,4-[3',5'-di-iso-propylphenyl]indenyl)$_2$zirconium dichloride
bis(trimethylsilyl)amidoborane(2-iso-propyl,4-[3',5'-di-iso-propylphenyl]indenyl)$_2$zirconium dichloride;
bis(trimethylsilyl)amidoborane(2-n-butyl,4-[3',5'-di-iso-propylphenyl]indenyl)$_2$zirconium dichloride;
bis(trimethylsilyl)amidoborane(2-iso-butyl,4-[3',5'-di-iso-propylphenyl]indenyl)$_2$zirconium dichloride;
bis(trimethylsilyl)amidoborane(2-sec-butyl,4-[3',5'-di-iso-propylphenyl]indenyl)$_2$zirconium dichloride;
bis(trimethylsilyl)amidoborane(2-tert-butyl,4-[3',5'-di-iso-propylphenyl]indenyl)$_2$zirconium dichloride;
bis(trimethylsilyl)amidoborane(2-methyl,4-[3',5'-di-phenylphenyl]indenyl)$_2$zirconium dichloride;
bis(trimethylsilyl)amidoborane(2-ethyl,4-[3',5'-di-phenylphenyl]indenyl)$_2$zirconium dichloride;
bis(trimethylsilyl)amidoborane(2-n-propyl,4-[3',5'-di-phenylphenyl]indenyl)$_2$zirconium dichloride;
bis(trimethylsilyl)amidoborane(2-iso-propyl,4-[3',5'-di-phenylphenyl]indenyl)$_2$zirconium dichloride;
bis(trimethylsilyl)amidoborane(2-n-butyl,4-[3',5'-di-phenylphenyl]indenyl)$_2$zirconium dichloride;
bis(trimethylsilyl)amidoborane(2-iso-butyl,4-[3',5'-di-phenylphenyl]indenyl)$_2$zirconium dichloride;
bis(trimethylsilyl)amidoborane(2-sec-butyl,4-[3',5'-di-phenylphenyl]indenyl)$_2$zirconium dichloride;
bis(trimethylsilyl)amidoborane(2-tert-butyl,4-[3',5'-di-phenylphenyl]indenyl)$_2$zirconium dichloride;
bis(trimethylsilyl)amidoborane(2-methyl,4-[3',5'-di-t-butylphenyl]indenyl)$_2$zirconium dimethyl;
bis(trimethylsilyl)amidoborane(2-ethyl,4-[3',5'-di-t-butylphenyl]indenyl)$_2$zirconium dimethyl;
bis(trimethylsilyl)amidoborane(2-n-propyl,4-[3',5'-di-t-butylphenyl]indenyl)$_2$zirconium dimethyl;
bis(trimethylsilyl)amidoborane(2-iso-propyl,4-[3',5'-di-t-butylphenyl]indenyl)$_2$zirconium dimethyl;
bis(trimethylsilyl)amidoborane(2-n-butyl,4-[3',5'-di-t-butylphenyl]indenyl)$_2$zirconium dimethyl;
bis(trimethylsilyl)amidoborane(2-iso-butyl,4-[3',5'-di-t-butylphenyl]indenyl)$_2$zirconium dimethyl;
bis(trimethylsilyl)amidoborane(2-sec-butyl,4-[3',5'-di-t-butylphenyl]indenyl)$_2$zirconium dimethyl;
bis(trimethylsilyl)amidoborane(2-tert-butyl,4-[3',5'-di-t-butylphenyl]indenyl)$_2$zirconium dimethyl;
bis(trimethylsilyl)amidoborane(2-ethyl,4-[3',5'-bis-trifluoromethylphenyl]indenyl)$_2$zirconium dimethyl;
bis(trimethylsilyl)amidoborane(2-n-propyl,4-[3',5'-bis-trifluoromethylphenyl]indenyl)$_2$zirconium dimethyl;
bis(trimethylsilyl)amidoborane(2-iso-propyl,4-[3',5'-bis-trifluoromethylphenyl]indenyl)$_2$zirconium dimethyl;
bis(trimethylsilyl)amidoborane(2-n-butyl,4-[3',5'-bis-trifluoromethylphenyl]indenyl)$_2$zirconium dimethyl;
bis(trimethylsilyl)amidoborane(2-iso-butyl,4-[3',5'-bis-trifluoromethylphenyl]indenyl)$_2$zirconium dimethyl;
bis(trimethylsilyl)amidoborane(2-sec-butyl,4-[3',5'-bis-trifluoromethylphenyl]indenyl)$_2$zirconium dimethyl;
bis(trimethylsilyl)amidoborane(2-tert-butyl,4-[3',5'-bis-trifluoromethylphenyl]indenyl)$_2$zirconium dimethyl;
bis(trimethylsilyl)amidoborane(2-ethyl,4-[3',5'-di-iso-propylphenyl]indenyl)$_2$zirconium dimethyl;
bis(trimethylsilyl)amidoborane(2-n-propyl,4-[3',5'-di-iso-propylphenyl]indenyl)$_2$zirconium dimethyl
bis(trimethylsilyl)amidoborane(2-iso-propyl,4-[3',5'-di-iso-propylphenyl]indenyl)$_2$zirconium dimethyl;
bis(trimethylsilyl)amidoborane(2-n-butyl,4-[3',5'-di-iso-propylphenyl]indenyl)$_2$zirconium dimethyl;
bis(trimethylsilyl)amidoborane(2-iso-butyl,4-[3',5'-di-iso-propylphenyl]indenyl)$_2$zirconium dimethyl;
bis(trimethylsilyl)amidoborane(2-sec-butyl,4-[3',5'-di-iso-propylphenyl]indenyl)$_2$zirconium dimethyl;
bis(trimethylsilyl)amidoborane(2-tert-butyl,4-[3',5'-di-iso-propylphenyl]indenyl)$_2$zirconium dimethyl;
bis(trimethylsilyl)amidoborane(2-methyl,4-[3',5'-di-phenylphenyl]indenyl)$_2$zirconium dimethyl;
bis(trimethylsilyl)amidoborane(2-ethyl,4-[3',5'-di-phenylphenyl]indenyl)$_2$zirconium dimethyl;
bis(trimethylsilyl)amidoborane(2-n-propyl,4-[3',5'-di-phenylphenyl]indenyl)$_2$zirconium dimethyl;
bis(trimethylsilyl)amidoborane(2-iso-propyl,4-[3',5'-di-phenylphenyl]indenyl)$_2$zirconium dimethyl;
bis(trimethylsilyl)amidoborane(2-n-butyl,4-[3',5'-di-phenylphenyl]indenyl)$_2$zirconium dimethyl;
bis(trimethylsilyl)amidoborane(2-iso-butyl,4-[3',5'-di-phenylphenyl]indenyl)$_2$zirconium dimethyl;
bis(trimethylsilyl)amidoborane(2-sec-butyl,4-[3',5'-di-phenylphenyl]indenyl)$_2$zirconium dimethyl; and bis(trimethylsilyl)amidoborane(2-tert-butyl,4-[3',5'-di-phenylphenyl]indenyl)$_2$zirconium dimethyl.

Activator and Activation Methods

The metal compounds described above are preferably combined with one or more activators to form an olefin polymerization catalyst system. The terms "cocatalyst" and "activator" are used herein interchangeably and are defined to be any compound or component or method which can activate any of the catalyst compounds of the invention as described above. Non-limiting examples of activators may include a Lewis acid or a non-coordinating ionic activator or ionizing activator or any other compound including Lewis bases, aluminum alkyls, conventional-type cocatalysts and combinations thereof, that can convert a neutral catalyst compound to a catalytically active cation. It is within the scope of this invention to use alumoxane or modified alumoxane as an activator, and/or to also use ionizing activators, neutral or ionic, such as tri(n-butyl)ammonium tetrakis(pentafluorophenyl)boron, a trisperfluorophenyl boron metalloid precursor or a trisperfluoronaphtyl boron metalloid precursor, polyhalogenated heteroborane anions (WO 98/43983) or combination thereof, that would ionize the catalyst metal compound.

In one embodiment, an activation method using ionizing ionic compounds not containing an active proton but capable of producing a catalyst cation and their non-coordinating anion are also contemplated, and are described in EP-A-0 426 637, EP-A-0 573 403 and U.S. Pat. No. 5,387,568.

Descriptions of ionic catalysts for coordination polymerization comprised of metallocene cations activated by non-coordinating anions appear in the early work in EP-A-0 277 003, EP-A-0 277 004 and U.S. Pat. No. 5,198,401 and WO-A-92/00333. These teach a preferred method of preparation wherein metallocenes (bisCp and monoCp) are protonated by an anion precursor such that an alkyl/hydride group is abstracted from a transition metal to make it both cationic and charge-balanced by the non-coordinating anion. The term "noncoordinating anion" means an anion which either does not coordinate to said cation or which is only weakly coordinated to said cation thereby remaining sufficiently labile to be displaced by a neutral Lewis base. "Compatible" noncoordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion. Noncoordinating anions useful in accordance with this invention are those which are compatible, stabilize the metallocene cation in the sense of balancing its ionic charge, yet retain sufficient lability to permit displacement by an ethylenically or acetylenically unsaturated monomer during polymerization.

The use of ionizing ionic compounds not containing an active proton but capable of producing both the active metallocene cation and an noncoordinating anion is also known. See, EP-A-0 426 637 and EP-A-0 573 403. An additional method of making the ionic catalysts uses ionizing anion pre-cursors which are initially neutral Lewis acids but form the cation and anion upon ionizing reaction with the metallocene compounds, for example, the use of tris (pentafluorophenyl) boron. See EP-A-0 520 732. Ionic catalysts for addition polymerization can also be prepared by oxidation of the metal centers of transition metal compounds by anion pre-cursors containing metallic oxidizing groups along with the anion groups, see EP-A-0 495 375.

Where the metal ligands include halogen moieties (for example, biscyclopentadienyl zirconium dichloride) which are not capable of ionizing abstraction under standard conditions, they can be converted via known alkylation reactions with organometallic compounds such as lithium or aluminum hydrides or alkyls, alkylalumoxanes, Grignard reagents, etc. See EP-A-0 500 944 and EP-A1-0 570 982 for in situ processes describing the reaction of alkyl aluminum compounds with dihalo-substituted metallocene compounds prior to or with the addition of activating anionic compounds.

Preferred activators include those described in European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198,401, 5,066,741, 5,206,197, 5,241,025, 5,384,299 and 5,502,124.

Other activators include those described in PCT publication WO 98/07515 such as tris(2,2',2"- nonafluorobiphenyl) fluoroaluminate.

Combinations of activators are also contemplated by the invention, for example, alumoxanes and ionizing activators in combinations, see for example, EP-B1 0 573 120, PCT publications WO 94/07928 and WO 95/14044 and U.S. Pat. Nos. 5,153,157 and 5,453,410.

WO 98/09996 describes activating metallocene catalyst compounds with perchlorates, periodates and iodates including their hydrates. WO 98/30602 and WO 98/30603 describe the use of lithium(2,2'-bisphenyl-ditrimethylsilicate)·4THF as an activator for a bulky ligand metallocene catalyst compound. WO 99/18135 describes the use of organoboron-aluminum activators. EP-B1-0 781 299 describes using a silylium salt in combination with a non-coordinating compatible anion. Also, methods of activation such as using radiation (see EP-B1-0 615 981), electro-chemical oxidation, and the like are also contemplated as activating methods for the purposes of rendering the neutral metallocene catalyst compound or precursor to a metallocene-type cation capable of polymerizing olefins. Other activators or methods for activating a metallocene catalyst compound are described in for example, U.S. Pat. Nos. 5,849,852, 5,859, 653 and 5,869,723 and WO 98/32775, WO 99/42467 (dioctadecylmethylammonium-bis(tris(pentafluorophenyl)borane)benzimidazolide).

There are a variety of methods for preparing alumoxane and modified alumoxanes, non-limiting examples of which are described in U.S. Pat. No. 4,665,208, 4,952,540, 5,091, 352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451, 5,744,656, 5,847,177, 5,854,166, 5,856,256 and 5,939,346 and European publications EP-A-0 561 476, EP-B1-0 279 586, EP-A-0 594-218 and EP-B1-0 586 665, and PCT publication WO 94/10180. It may be preferable to use a visually clear methylalumoxane. A cloudy or gelled alumoxane can be filtered to produce a clear solution or clear alumoxane can be decanted from the cloudy solution.

Organoaluminum compounds useful as activators (or scavengers) include trimethylaluminum, triethylaluminum, triisobutylaluminum, tri-n-hexylaluminum, tri-n-octylaluminum and the like.

In general the combined metal compounds and the activator are combined in ratios of about 1000:1 to about 0.5:1. In a preferred embodiment, the metal compounds and the activator are combined in a ratio of about 300:1 to about 1:1, preferably about 150:1 to about 1:1. For boranes, borates, aluminates, etc. the ratio is preferably about 1:1 to about 10:1 and for alkyl aluminum compounds (such as diethylaluminum chloride combined with water) the ratio is preferably about 0.5:1 to about 10:1.

Polymerization Processes

The catalysts and catalyst systems described above are suitable for use in a solution, gas or slurry polymerization process or a combination thereof.

In one embodiment, this invention is directed toward the solution, slurry or gas phase polymerization reactions involving the polymerization of propylene with a mixed feed comprising at least three monomers having from 2 to 30 carbon atoms, preferably 2-20 carbon atoms, and more preferably 2 to 18 carbon atoms. In another embodiment, both a homopolymer of propylene and a copolymer of propylene and the mixed monomer feed listed above are produced.

Gas Phase Polymerization

Typically in a gas phase polymerization process, a continuous cycle is employed wherein one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See for example U.S. Pat. Nos. 4,543,399, 4,588,790, 5,028,670, 5,317,036, 5,352,749, 5,405,922, 5,436,304, 5,453,471, 5,462,999, 5,616,661 and 5,668,228.)

The reactor pressure in a gas phase process may vary from about 10 psig (69 kPa) to about 500 psig (3448 kPa), preferably from about 100 psig (690 kPa) to about 500 psig (3448 kPa), preferably in the range of from about 200 psig (1379 kPa) to about 400 psig (2759 kPa), more preferably in the range of from about 250 psig (1724 kPa) to about 350 psig (2414 kPa).

The reactor temperature in the gas phase process may vary from about 30° C. to about 120° C., preferably from about 60° C. to about 115° C., more preferably in the range of from about 70° C. to 110° C., and most preferably in the range of from about 70° C. to about 95° C.

In a preferred embodiment, the reactor utilized in the present invention is capable and the process of the invention is producing greater than 500 lbs of polymer per hour (227 Kg/hr) to about 200,000 lbs/hr (90,900 Kg/hr) or higher of polymer, preferably greater than 1000 lbs/hr (455 Kg/hr), more preferably greater than 10,000 lbs/hr (4540 Kg/hr), even more preferably greater than 25,000 lbs/hr (11,300 Kg/hr), still more preferably greater than 35,000 lbs/hr (15,900 Kg/hr), still even more preferably greater than 50,000 lbs/hr (22,700 Kg/hr) and preferably greater than 65,000 lbs/hr (29,000 Kg/hr) to greater than 100,000 lbs/hr (45,500 Kg/hr), and most preferably over 100,000 lbs/hr (45,500 Kg/hr).

Other gas phase processes contemplated by the process of the invention include those described in U.S. Pat. Nos. 5,627,242, 5,665,818 and 5,677,375, and European publications EP-A-0 794 200, EP-A-0 802 202 and EP-B-634 421.

In another preferred embodiment, the catalyst system in is liquid form and is introduced into the gas phase reactor into a resin particle lean zone. For information on how to introduce a liquid catalyst system into a fluidized bed polymerization into a particle lean zone, please see U.S. Pat. No. 5,693,727.

Slurry Phase Polymerization

A slurry polymerization process generally uses pressures in the range of from about 1 to about 50 atmospheres (15 psi to 735 psi, 103 kPa to 5068 kPa) and even greater and temperatures in the range of 0° C. to about 120° C. In a slurry polymerization, a suspension of solid, particulate polymer is formed in a liquid polymerization diluent medium to which propylene and comonomers along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexane or an isobutane medium is employed. In a preferred embodiment, liquid propylene is used as the polymerization medium.

In one embodiment, a preferred polymerization technique of the invention is referred to as a particle form polymerization, or a slurry process where the temperature is kept below the temperature at which the polymer goes into solution. Such technique is well known in the art, and described in for instance U.S. Pat. No. 3,248,179. The preferred temperature in the particle form process is within the range of about 185° F. (85° C.) to about 230° F. (110° C.). Two preferred polymerization methods for the slurry process are those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484.

In another embodiment, the slurry process is carried out continuously in a loop reactor. The catalyst as a slurry in isobutane or as a dry free flowing powder is injected regularly to the reactor loop, which is itself filled with circulating slurry of growing polymer particles in a diluent of isobutane containing monomer and comonomer. Hydrogen, optionally, may be added as a molecular weight control. The reactor is maintained at a pressure of about 525 psig to 625 psig (3620 kPa to 4309 kPa) and at a temperature in the range of about 140° F. to about 220° F. (about 60° C. to about 104° C.). Reaction heat is removed through the loop wall since much of the reactor is in the form of a double-jacketed pipe. The slurry is allowed to exit the reactor at regular intervals or continuously to a heated low pressure flash vessel, rotary dryer and a nitrogen purge column in sequence for removal of the isobutane diluent and all unreacted monomer and comonomers. The resulting hydrocarbon free powder is then compounded for use in various applications.

In another embodiment, the reactor used in the slurry process of the invention is capable of and the process of the invention is producing greater than 2000 lbs of polymer per hour (907 Kg/hr), more preferably greater than 5000 lbs/hr (2268 Kg/hr), and most preferably greater than 10,000 lbs/hr (4540 Kg/hr). In another embodiment the slurry reactor used in the process of the invention is producing greater than 15,000 lbs of polymer per hour (6804 Kg/hr), preferably greater than 25,000 lbs/hr (11,340 Kg/hr) to about 100,000 lbs/hr (45,500 Kg/hr).

In another embodiment in the slurry process of the invention the total reactor pressure is in the range of from 400 psig (2758 kPa) to 800 psig (5516 kPa), preferably 450 psig (3103 kPa) to about 700 psig (4827 kPa), more preferably 500 psig (3448 kPa) to about 650 psig (4482 kPa), most preferably from about 525 psig (3620 kPa) to 625 psig (4309 kPa).

In yet another embodiment in the slurry process of the invention, the concentration of predominant monomer in the reactor liquid medium is in the range of from about 1 to 10 weight percent, preferably from about 2 to about 7 weight percent, more preferably from about 2.5 to about 6 weight percent, most preferably from about 3 to about 6 weight percent.

Another process of the invention is where the process, preferably a slurry or gas phase process is operated in the absence of or essentially free of any scavengers, such as triethylaluminum, trimethylaluminum, tri-isobutylaluminum and tri-n-hexylaluminum and diethyl aluminum chloride, dibutyl zinc and the like. This process is described in PCT publication WO 96/08520 and U.S. Pat. No. 5,712,352.

In another embodiment the process is run with scavengers. Typical scavengers include trimethyl aluminum, tri-isobutyl aluminum and an excess of alumoxane or modified alumoxane.

Homogeneous or Solution Phase Polymerization

The catalysts described herein may be used advantageously in homogeneous solution processes. Generally this involves polymerization in a continuous reactor in which the polymer formed and the starting monomer and comonomers, and catalyst materials supplied, are agitated to reduce or avoid concentration gradients. Suitable processes included, are performed above the melting point of the polymers at high pressure at from 10 to 3000 bar (100-30,000 MPa).

Each of these processes may also be employed in single, parallel or series reactors. The liquid processes comprise contacting olefin monomer and comonomers with the above described catalyst system in a suitable diluent or solvent and allowing said monomers to react for a sufficient time to produce the desired polymers. Hydrocarbyl solvents are suitable, both aliphatic and aromatic, alkanes, such as hexane, are preferred.

Generally speaking, the polymerization reaction temperature can vary from 40° C. to 250° C. Preferably the polymerization reaction temperature will be from 60° C. to 220°. The pressure can vary from about 1 mm Hg to 2500 bar (25,000 MPa), preferably from 0.1 bar to 1600 bar (1-16,000 MPa), most preferably from 1.0 bar to 500 bar (10-5000 MPa).

The process can be carried out in a continuous stirred tank reactor, or more than one reactor operated in series or parallel. These reactors may have or may not have internal cooling and the monomer feed may or may not be refrigerated. See the general disclosure of U.S. Pat. No. 5,001,205 for general process conditions. See also, international application WO 96/33227 and WO 97/22639. All documents are incorporated by reference for description of polymerization processes, metallocene selection and useful scavenging compounds.

Formulations of the Polymers

The polymer compositions of this invention may be used in any application where polypropylene is used, such as molded or extruded articles, such as films, fibers, injection-molded articles, blow-molded articles, thermoformed articles, adhesive formulations, wovens, non-wovens, blends with other polymers for impact modification etc.

Of course, it should be understood that a wide range of changes and modifications can be made to the embodiments described above. It is therefore intended that the foregoing description illustrates rather than limits this invention, and that it is the following claims, including all equivalents, which define this invention. For example, one skilled in the art would be familiar with the use of additives to enhance a specific property or may be present as a result of processing of the individual components. Additives which may be incorporated include, for example, fire retardants, antioxidants, plasticizers, pigments, vulcanizing or curative agents, vulcanizing or curative accelerators, cure retarders, processing aids, flame retardants, tackifying resins, dyes, waxes, heat stabilizers, light stabilizers, anti-block agents, processing aids, and any combinations thereof. These compounds may include fillers and/or reinforcing materials (including granular, fibrous, or powder-like). These include carbon black, clay, talc, calcium carbonate, mica, silica, silicate, titanium dioxide, barium sulfate, sand, glass beads, mineral aggregates, and combinations thereof, and the like. Other additives which may be employed to enhance properties include antiblocking agents, coloring agent. Lubricants, mold release agents, and nucleating agents may also be employed. The list described herein is not intended to be inclusive of all types of additives which may be employed with the present invention. Upon reading this disclosure, those of skill in the art will appreciate other additives may be employed to enhance properties of the composition.

Tackifying resins that may be blended with the copolymer described above are those typically used in the art. Examples include, but are not limited to, aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, and hydrogenated rosin esters. In some embodiments the tackifier is hydrogenated. In other embodiments the tackifier is non-polar. (Non-polar meaning that the tackifier is substantially free of monomers having polar groups. Preferably the polar groups are not present, however if they are, preferably they are not present at more that 5 weight %, preferably not more that 2 weight %, even more preferably no more than 0.5 weight %.) In some embodiments the tackifier has a softening point (Ring and Ball, as measured by ASTM E-28) of 80° C. to 150° C., preferably 100° C. to 130° C.

Other optional components that may be combined with the polymer product of this invention are plasticizers or another additives such as oils, surfactants, fillers, color masterbatches, and the like. Preferred plasticizers include mineral oils, polybutenes, phthalates and the like. Particularly preferred plasticizers include phthalates such as diisoundecyl phthalate (DIUP), diisononylphthalate (DINP), dioctylphthalates (DOP) and the like. Other optional components that may be combined with the polymer product of this invention are low molecular weight products such as wax, oil or low Mn polymer, (low meaning below Mn of 5000, preferably below 4000, more preferably below 3000, even more preferably below 2500).

In another embodiment the polymer composition produced by this invention may be blended with elastomeric polymers. In a preferred embodiment, elastomers are blended with the polymer composition produced by this invention to form rubber toughened compositions. In a particularly preferred embodiment the rubber toughened composition is a two (or more) phase system where the rubber is a discontinuous phase and the polymer composition is a continuous phase. Examples of some elastomers include one or more of the following: ethylene propylene rubber, ethylene propylene diene monomer rubber, neoprene rubber, styrenic block copolymer rubbers (including SI, SIS, SB, SBS and the like), ethylene based plastomers etc. This blend may be combined with the tackifiers and other additives as described above.

EXAMPLES

General

Polymerization was conducted in a two-liter autoclave reactor. Monomer feed and catalyst preparations were similar. Polymerization grade propylene was purified by passing first through basic alumina activated at 600° C., followed by molecular sieves activated at 600° C. 1,9-decadiene (96%) was purchased from Aldrich-Sigma Bulk Chemicals and used as received.

Test Methods

Melt flow rate (MFR) of the polymers was measured using ASTM D-1238 at 230° C. and 2.16 kg load.

Molecular weight of the polymers was analyzed by GPC using Waters 150C high temperature system with a DRI detector and Showdex AT-806 MS column.

The tensile properties were measured using ASTM-D1708 microtensile testing procedure. The notched Izod impact testing was performed using ASTM-D256.

Melting point (Tm), glass transition temperature (Tg), heat of fusion (ΔHf), multiple melting peaks, and any measurements related to detection of crystalline melting or crystallization are measured by Differential Scanning Calorimetry (DSC). DSC was performed by a modified version of ASTM method D-3417. Preferably, about 6 mg to about 10 mg of a sheet of the preferred polymer pressed at approximately 200° C. to 230° C. is removed with a punch die and is aged at room temperature for at least 24 hours. At the end of this period, the sample is placed in a Differential Scanning Calorimeter and heated at about 10-20° C./minute to attain a final temperature of about 200° C. to about 220° C. The thermal output is recorded as the area under the melting peak, or peaks, of the sample which is typically at a maximum peak at about 30° C. to about 150° C. and occurs between the temperatures of about 0° C. and about 180° C. After 3 to 5 minutes at the final temperature, the sample is cooled to 30° C. at 10-20° C./minute, following which the sample is again reheated to 200-220° C. at 10-20° C./minute. The thermal output is measured in Joules as a measure of the heat of melting or heat of crystallization. The melting point is recorded as the temperature of the greatest heat absorption within the range of melting temperature of the sample, and the crystallization temperature is recorded as the temperature of greatest heat evolution within the range of crystallization of the sample.

Catalyst "A" Preparation

All catalyst preparations were performed in an inert atmosphere with <1.5 ppm H2O content. The metallocenes were obtained from internal sources. The silica support, "Davison 952", was purchased from Grace Davison Inc., and calcined at 600° C. under a dry nitrogen flow for 8-24 hours to achieve a hydroxyl content of 0.8 to 1.2 mmol/g silica.

In a nitrogen purged dry glove box, the calcined silica (500 g) was charged to vessel that equipped an overhead stirrer. A solution of tris(perfluorophenyl)boron (30 g, 0.059 mole) in hexane (2 L) was added to silica followed by addition of N,N-diethylaniline (9.6 ml, 0.061 mole). The mixture was stirred at −50° C. for 1 hour. In a separate container, dimethylsilylbis(2-methyl-4-phenyl indenyl)zirconium dimethyl (4.5 g, 0.0077 mole), hexane (820 mL), triethylaluminium (187 mL, 25 wt % in heptane), and 1,9-decadiene (10 mL) was mixed to form a slurry. The slurry was then transfered to the silica-containing vessel, and the mixture was stirred at 49° C. for additional 1 hour. The solvent was removed by purging with nitrogen for 14 hours, and a free flowing solid catalyst was obtained. Metallocene loading was 0.015 mmol of transition metal per gram of catalyst.

Mixed Alpha Olefins Preparation

Mixed alpha olefin feeds (Mixed HAO) were prepared by mixing of 1-hexene, 1-octene, and 1-decene in the following ratios (v/v):

| | |
|---|---|
| Mixed HAO-I: | 50% of 1-hexene, 25% of 1-octene, and 25% of 1-decene. |
| Mixed HAO-II: | 25% of 1-hexene, 50% of 1-octene, and 25% of 1-decene |
| Mixed HAO-III: | 25% of 1-hexene, 25% of 1-octene, and 50% of 1-decene |

Example 1

Polymerization was conducted in a 2-liter autoclave reactor. The reactor was charged with triethylaluminium (TEAL, 1.0 mL of 1M solution in hexane), mixed HAO feed (5 mL of mixed HAO-I), and hydrogen (6.6 mmole). Then, liquid propylene (400 mL) was added to the reactor, and the catalyst A (70 mg in mineral oil) was injected with another 100 cc of propylene. The reactor was heated to the 70° C. with stirring. After 1 hour, the reactor was cooled to 25° C. and vented. The polymer was collected, and dried in air for 8 hours (yield: 60 g).

Example 2

In this example, the polymer was made with same mixed HAO composition as that in example 1, but different comonomer level. The polymerization was conducted similarly as in example 1, and 10 mL of mixed HAO-I feed was used. Yield: 96 g.

Example 3

In this example, the polymer was made with same mixed HAO composition as that in example 1, but different comonomer level. The polymerization was conducted similarly as in example 1, and 15 mL of mixed HAO-I feed was used. Yield: 41 g.

Example 4

In this example, the polymer was made with same mixed HAO composition as that in example 1, but different comonomer level. The polymerization was conducted similarly as in example 1, and 20 mL of mixed HAO-I feed was used. Yield: 70 g.

Example 5

In this example, the polymer was made with the mixed HAO feed having different composition from that in example 1. The polymerization was conducted similarly as in example 1, but the mixed HAO-II feed (5 mL) was used. Yield: 62 g.

Example 6

In this example, the polymer was made with same mixed HAO composition as that in example 5, but different comonomer level. The polymerization was conducted similarly as in example 1, and 10 mL of mixed HAO-II feed was used. Yield: 60 g.

Example 7

In this example, the polymer was made with same mixed HAO composition as that in example 5, but different comonomer level. The polymerization was conducted similarly as in example 1, and 15 mL of mixed HAO-II feed was used. Yield: 68 g.

Example 8

In this example, the polymer was made with the mixed HAO feed having different composition from that in examples 1 and 5. The polymerization was conducted similarly as in example 1, but the mixed HAO-III feed (5 mL) was used. Yield: 62 g.

Example 9

In this example, the polymer was made with same mixed HAO composition as that in example 8, but different comonomer level. The polymerization was conducted similarly as in example 1, and 10 mL of mixed HAO-III feed was used. Yield: 87 g.

Example 10

In this example, the polymer was made with same mixed HAO composition as that in example 5, but different comonomer level. The polymerization was conducted similarly as in example 1, and 15 mL of mixed HAO-III feed was used. Yield: 99 g.

Comparative Example 11

Polymerization was conducted in a 2-liter autoclave reactor. The reactor was charged with triethylaminium (TEAL, 1.0 mL of 1M solution in hexane), 1-hexene (5 mL), and hydrogen (6.6 mmole). Then, liquid propylene (400 mL) was added to the reactor, and the catalyst A (70 mg in mineral oil) was injected with another 100 cc of propylene. The reactor was heated to the 70° C. with stirring. After 1 hour, the reactor was cooled to 25° C. and vented. The polymer was collected, and dried in air for 8 hours (yield: 100 g).

Comparative Example 12

In this example, the polymer was made with 1-hexene as that in comparative example 11, but at different comonomer level. The polymerization was conducted similarly as in comparative example 11, and 10 mL of 1-hexene was used. Yield: 80 g.

Comparative Example 13

In this example, the polymer was made with 1-hexene as that in comparative example 11, but at different comonomer level. The polymerization was conducted similarly as in comparative example 11, and 15 mL of 1-hexene was used. Yield: 89 g.

Comparative Example 14

In this example, the polymer was made with 1-octene. The polymerization was conducted similarly as in comparative example 11, and 5 mL of 1- octene was used. Yield: 77 g.

Comparative Example 15

In this example, the polymer was made with 1-octene as that in comparative example 14, but at different comonomer level. The polymerization was conducted similarly as in comparative example 11, and 10 ML of 1-octene was used. Yield: 59 g.

Comparative Example 16

In this example, the polymer was made with 1-octene as that in comparative example 14, but at different comonomer level. The polymerization was conducted similarly as in comparative example 11, and 15 mL of 1-octene was used. Yield: 74 g.

Comparative Example 17

In this example, the polymer was made with 1-octadecene. The polymerization was conducted similarly as in comparative example 11, and 5 mL of 1- octadecene was used. Yield: 76 g.

Comparative Example 18

In this example, the polymer was made with 1-octadecene as that in comparative example 17, but at different comonomer level. The polymerization was conducted similarly as in comparative example 11, and 10 mL of 1-octadecene was used. Yield: 79 g.

Comparative Example 19

In this example, the polymer was made with 1-octadecene as that in comparative example 17, but at different comonomer level. The polymerization was conducted similarly as in comparative example 11, and 15 mL of 1-octadecene was used. Yield: 62 g.

Comparative Example 20

Polymerization was conducted in a 2-liter autoclave reactor. The reactor was charged with triethylaminium (TEAL, 1.0 mL of 1M solution in hexane) and hydrogen (6.6 mmole). Then, liquid propylene (800 mL) was added to the reactor. The reactor was heated to the 65° C. with stirring. Ethylene was added to the reactor to give a partial pressure of 12 psi. Catalyst A (100 mg in mineral oil) was injected with another 200 cc of propylene. Polymerization was kept at 65° C. for 1 hour. Then, the reactor was cooled to 25° C. and vented. The polymer was collected, and dried in air for 8 hours (yield: 57.5 g).

Comparative Example 21

In this example, the propylene ethylene copolymer was made as that in comparative example 20, but at a different comonomer level. The polymerization was conducted similarly as in comparative example 11. The partial pressure of ethylene was kept at 16 psi. Yield: 61.5 g.

Comparative Example 22

In this example, the propylene ethylene copolymer was made as that in comparative example 20, but at a different comonomer level. The polymerization was conducted similarly as in comparative example 11. The partial pressure of ethylene was kept at 25 psi. Yield: 99.8 g.

Comparative Example 23

In this example, the propylene ethylene copolymer was made as that in comparative example 20, but at a different comonomer level. The polymerization was conducted similarly as in comparative example 11. The polymerization temperature was 60° C., and the partial pressure of ethylene was kept at 16 psi. Yield: 109 g.

Comparison of Propylene Mixed-HAO Polymers and Propylene Ethylene Copolymers

The melting temperature (Tm) and heat of fusion ($\Delta Hf$) of propylene mixed-HAO polymers are compared to that of propylene ethylene copolymers in FIG. 1 and 2. Apparently, the propylene mixed-HAO polymers show more effective melting temperature depression and have lower heat of fusion as compared to the conventional propylene ethylene random copolymers (RCP) at similar comonomer contents. These property enhancements are useful in many RCP application areas since they would provide materials with softness, lower sealing temperature, better optical property, and better stiffness/toughness balance.

TABLE 1

Polymerization Parameters and Characterization Data of the Polymers in Examples

| | Example | | | | | | | | | |
|---|---|---|---|---|---|---|---|---|---|---|
| | 1 | 2 | 3 | 4 | 5 | 6 | 7 | 8 | 9 | 10 |
| Propylene (mL) | 500 | 500 | 500 | 500 | 500 | 500 | 500 | 500 | 500 | 500 |
| Co-monomer | M. HAO-I | M. HAO-I | M. HAO-I | M. HAO-I | M. HAO-II | M. HAO-II | M. HAO-II | M. HAO-III | M. HAO-III | M. HAO-III |
| Amt. Co-monomer (mL) | 5 mL | 10 mL | 15 mL | 20 mL | 5 mL | 10 mL | 15 mL | 5 mL | 10 mL | 15 mL |
| H2 (mmol) | 6.6 | 6.6 | 6.6 | 6.6 | 6.6 | 6.6 | 6.6 | 6.6 | 6.6 | 6.6 |
| Catalyst (mg) | 70 | 70 | 70 | 70 | 70 | 70 | 70 | 70 | 70 | 70 |
| TEAL (mL) | 1 | 1 | 1 | 1 | 1 | 1 | 1 | 1 | 1 | 1 |
| Temp (° C.) | 70 | 70 | 70 | 70 | 70 | 70 | 70 | 70 | 70 | 70 |
| Run time (min) | 60 | 60 | 60 | 60 | 60 | 60 | 60 | 60 | 60 | 60 |
| Yield (g) | 60 | 96 | 70 | 41 | 62 | 60 | 68 | 62 | 87 | 99 |
| GPC | | | | | | | | | | |
| Mn | 89,304 | 87,701 | 74,532 | 78,066 | 93,898 | 70,197 | 68,502 | 86,527 | 75,703 | 76,706 |
| Mw | 166,694 | 161,083 | 134,658 | 137,559 | 179,857 | 134,769 | 126,669 | 159,050 | 138,201 | 133,597 |
| Mw/Mn | 1.87 | 1.84 | 1.81 | 1.76 | 1.92 | 1.92 | 1.85 | 1.84 | 1.83 | 1.74 |
| DSC | | | | | | | | | | |
| Melt (° C.) | 138 | 132.4 | 125.2 | 122.7 | 139.3 | 131.7 | 123.5 | 140.9 | 134.4 | 129.4 |
| $\Delta H_f$ | 83 | 74 | 68 | 60 | 87 | 77 | 64 | 85 | 78 | 71 |
| Recrystal. (° C.) | 100.2 | 94.1 | 87.5 | 91.1 | 102.9 | 93.5 | 84 | 103 | 95.9 | 90.3 |
| Instron | | | | | | | | | | |
| Modulus (psi) | 124500 | 113600 | 85230 | 83950 | 142700 | 103625 | 80420 | 136500 | 108575 | 94380 |
| Yield Stress (psi) | 3912 | 3669 | 2916 | 2951 | 4378 | 3468 | 2779 | 4166 | 3605 | 3324 |
| Yield Strain (%) | 9 | 10 | 11 | 11 | 9 | 10 | 11 | 9 | 10 | 10 |
| Break Strain (%) | 644 | 641 | 635 | 618 | 644 | 624 | 620 | 621 | 627 | 637 |
| Impact | | | | | | | | | | |
| RTNI (ftlb/in) | 0.427 | 0.544 | 0.658 | 0.943 | 0.396 | 0.518 | 0.692 | 0.361 | 0.465 | 0.542 |

TABLE 2

Polymerization Parameters and Characterization Data of the Polymers in Comparative Examples

| | Comparative example | | | | | | | | |
|---|---|---|---|---|---|---|---|---|---|
| | 11 | 12 | 13 | 14 | 15 | 16 | 17 | 18 | 19 |
| Propylene (mL) | 500 | 500 | 500 | 500 | 500 | 500 | 500 | 500 | 500 |
| Comonomer | Hexene | Hexene | Hexene | Octene | Octene | Octene | Octadecene | Octadecene | Octadecene |
| Amt. Comonomer (mL) | 5 | 10 | 15 | 5 | 10 | 15 | 5 | 10 | 15 |
| H2 (mmol) | 6.6 | 6.6 | 6.6 | 6.6 | 6.6 | 6.6 | 6.6 | 6.6 | 6.6 |
| Catalyst (mg) | 70 | 70 | 70 | 70 | 70 | 70 | 70 | 70 | 70 |
| TEAL (mL) | 1 | 1 | 1 | 1 | 1 | 1 | 1 | 1 | 1 |
| Temp(° C.) | 70 | 70 | 70 | 70 | 70 | 70 | 70 | 70 | 70 |
| Run time(min) | 60 | 60 | 60 | 60 | 60 | 60 | 60 | 60 | 60 |
| Yield (g) | 100 | 80 | 89 | 77 | 59 | 74 | 76 | 79 | 62 |
| GPC | | | | | | | | | |
| Mn | 114,878 | 82,076 | 76,590 | 123,073 | 67,132 | 93,965 | 103,912 | 83,257 | 119,937 |
| Mw | 221,211 | 153,651 | 138,958 | 226,676 | 128,527 | 166,394 | 218,486 | 159,474 | 211,932 |
| Mw/Mn | 1.93 | 1.87 | 1.81 | 1.84 | 1.91 | 1.77 | 2.10 | 1.92 | 1.77 |
| DSC | | | | | | | | | |
| Melt (° C.) | 142.1 | 132.2 | 128.3 | 142.5 | 131.3 | 128.7 | 149.2 | 143.5 | 141.5 |
| $\Delta H_f$ | 79 | 70 | 65 | 78 | 66 | 64 | 84 | 75 | 74 |
| Recrystal.(° C.) | 104.2 | 94.3 | 90.4 | 104.6 | 92.2 | 90.6 | 111 | 104.2 | 103.9 |
| Instron | | | | | | | | | |
| Modulus (psi) | 133550 | 118600 | 108850 | 130800 | 112675 | 100300 | 143600 | 126800 | 102930 |
| Yield Stress (psi) | 4415 | 3764 | 3492 | 4292 | 3681 | 3366 | 4810 | 4381 | 3886 |
| Yield Strain (%) | 9 | 9 | 10 | 9 | 10 | 10 | 10 | 10 | 11 |
| Break Strain (%) | 643 | 659 | 622 | 659 | 624 | 608 | 660 | 647 | 664 |
| Impact | | | | | | | | | |
| RTNI (ftlb/in) | 0.478 | 0.607 | 0.623 | 0.491 | 0.449 | 0.677 | 0.563 | 0.418 | 0.71 |

TABLE 3

| | Comparative example | | | |
|---|---|---|---|---|
| | 20 | 21 | 22 | 23 |
| Propylene (mL) | 1000 | 1000 | 1000 | 1000 |
| Comonomer | Ethylene | Ethylene | Ethylene | Ethylene |
| Amt. Comonomer (psi) | 12 | 16 | 25 | 30 |
| C2 Content (mol %) | 1.04 | 1.65 | 2.55 | 3.00 |
| H2 (mmol) | 6.6 | 6.6 | 6.6 | 6.6 |
| Catalyst (mg) | 100 | 100 | 100 | 100 |
| TEAL (mL) | 1 | 1 | 1 | 1 |
| Temp(° C.) | 65 | 65 | 65 | 60 |
| Run time(min) | 60 | 60 | 60 | 60 |
| Yield (g) | 57.5 | 61.5 | 99.8 | 109 |
| GPC | | | | |
| Mn | 29,840 | 38,038 | 42,410 | 39,667 |
| Mw | 109,547 | 124,557 | 125,474 | 108,725 |
| Mw/Mn | 3.67 | 3.27 | 2.96 | 2.74 |
| DSC | | | | |
| Melt (° C.) | 148.5 | 144.8 | 141.6 | 139.6 |
| $\Delta^{Hf}$ | 91 | 86 | 78 | 77 |
| Recrystal. (° C.) | 110.5 | 106.3 | 103.3 | 101 |
| Instron | | | | |
| Modulus (psi) | 177700 | 160457 | 151533 | 147700 |
| Break Strain (%) | 6.5 | 8.6 | 9 | 30 |

All documents described herein are incorporated by reference herein, including any priority documents and/or testing procedures. U.S. application Ser. No. 10/355,512, filed Jan. 31, 2003 is incorporated by reference herein. As is apparent from the foregoing general description and the specific embodiments, while forms of the invention have been illustrated and described, various modifications can be made without departing from the spirit and scope of the invention. Accordingly, it is not intended that the invention be limited thereby.

We claim:

1. A process to polymerize olefins comprising:
    obtaining a mixed olefin stream comprising eight or more different alpha olefins each having 4 to 20 carbon atoms wherein the mixed olefin stream will have at least 25 weight % of olefins having odd numbers of carbons wherein the mixed olefin stream has a normal distribution of α-olefins with both even and odd number carbon atoms; and contacting:
    (i) propylene and
    (ii) the mixed olefin stream with
    (iii) a metallocene catalyst system.

2. The process of claim 1 wherein the mixed olefin stream further comprises ethylene, wherein the mixed olefin stream comprises less than 10 wt % of ethylene, based upon the weight of the mixed olefin stream.

3. The process of claim 2 wherein the mixed olefin stream comprises less than 6 wt % of ethylene, based upon the weight of the mixed olefin stream.

4. The process of claim 2 the mixed olefin stream comprises less than 3 wt % of ethylene, based upon the weight of the mixed olefin stream.

5. The process of claim 1 wherein up to 30 weight % of ethylene is added to the combination of the propylene and the mixed olefin stream, based upon the weight of the ethylene, the propylene and the mixed olefin stream.

6. The process of claim 1, wherein the metallocene catalyst system comprises one or more group 4 transition metal metallocene compounds.

7. The process of claim 1 wherein the metallocene catalyst system comprises a metallocene having two cyclopentadienyl groups.

8. The process of claim 1 wherein the metallocene catalyst system comprises alumoxane.

9. The process of claim 1 wherein the metallocene catalyst system comprises methylalumoxane.

10. The process of claim 1 wherein the metallocene catalyst system comprises a non-coordinating anion.

11. The process of claim 1 wherein the metallocene catalyst system comprises one or more of:
dimethylsiladiyl(2-methyl-4-phenylindenyl)$_2$metal dichloride;
dimethylsiladiyl(2-methyl-4-phenylindenyl)$_2$metal dimethyl;
dimethylsiladiyl(2-methyl indenyl)$_2$metal dichloride;
dimethylsiladiyl(2-methyl indenyl)$_2$metal dimethyl;
dimethylsiladiyl(indenyl)$_2$metal dichloride;
dimethylsiladiyl(indenyl)$_2$metal dimethyl;
dimethylsiladiyl(tetrahydroindenyl)$_2$metal dichloride;
dimethylsiladiyl(tetrahydroindenyl)$_2$metal dimethyl;
dimethylsiladiyl(indenyl)$_2$metal diethyl;
diphenylsiladiyl(indenyl)$_2$metal dimethyl;
dimethylsiladiyl(2-methyl,4-[3',5'-di-t-butylphenyl]indenyl)$_2$metal dichloride;
dimethylsiladiyl(2-methyl,4-[3',5'-di-t-butylphenyl]indenyl)$_2$metal dimethyl;
dimethylsiladiyl(2-ethyl,4-[3',5'-di-t-butylphenyl]indenyl)$_2$metal dichloride;
dimethylsiladiyl(2-ethyl,4-[3',5'-di-t-butylphenyl]indenyl)$_2$metal dimethyl;
dimethylsiladiyl(2-n-propyl,4-[3',5'-di-t-butylphenyl]indenyl)$_2$metal dichloride;
dimethylsiladiyl(2-n-propyl,4-[3',5'-di-t-butylphenyl]indenyl)$_2$metal dimethyl;
dimethylsiladiyl(2-iso-propyl,4-[3',5'-di-t-butylphenyl]indenyl)$_2$metal dichloride;
dimethylsiladiyl(2-iso-propyl,4-[3',5'-di-t-butylphenyl]indenyl)$_2$metal dimethyl;
dimethylsiladiyl(2-n-butyl,4-[3',5'-di-t-butylphenyl]indenyl)$_2$metal dichloride;
dimethylsiladiyl(2-n-butyl,4-[3',5'-di-t-butylphenyl]indenyl)$_2$metal dimethyl;
dimethylsiladiyl(2-iso-butyl,4-[3',5'-di-t-butylphenyl]indenyl)$_2$metal dichloride;
dimethylsiladiyl(2-iso-butyl,4-[3',5'-di-t-butylphenyl]indenyl)$_2$metal dimethyl;
dimethylsiladiyl(2-sec-butyl,4-[3',5'-di-t-butylphenyl]indenyl)$_2$metal dichloride;
dimethylsiladiyl(2-sec-butyl,4-[3',5'-di-t-butylphenyl]indenyl)$_2$metal dimethyl;
dimethylsiladiyl(2-methyl,4-[3',5'-di-phenylphenyl]indenyl)$_2$metal dichloride;
dimethylsiladiyl(2-methyl,4-[3',5'-di-phenylphenyl]indenyl)$_2$metal dimethyl;
dimethylsiladiyl(2-ethyl,4-[3',5'-di-phenylphenyl]indenyl)$_2$metal dichloride;
dimethylsiladiyl(2-ethyl,4-[3',5'-di-phenylphenyl]indenyl)$_2$metal dimethyl;
dimethylsiladiyl(2-n-propyl,4-[3',5'-di-phenylphenyl]indenyl)$_2$metal dichloride;
dimethylsiladiyl(2-n-propyl,4-[3',5'-di-phenylphenyl]indenyl)$_2$metal dimethyl;
dimethylsiladiyl(2-iso-propyl,4-[3',5'-di-phenylphenyl]indenyl)$_2$metal dichloride;
dimethylsiladiyl(2-iso-propyl,4-[3',5'-di-phenylphenyl]indenyl)$_2$metal dimethyl;
dimethylsiladiyl(2-n-butyl,4-[3',5'-di-phenylphenyl]indenyl)$_2$metal dichloride;
dimethylsiladiyl(2-n-butyl,4-[3',5'-di-phenylphenyl]indenyl)$_2$metal dimethyl;
dimethylsiladiyl(2-iso-butyl,4-[3',5'-di-phenylphenyl]indenyl)$_2$metal dichloride;
dimethylsiladiyl(2-iso-butyl,4-[3',5'-di-phenylphenyl]indenyl)$_2$metal dimethyl;
dimethylsiladiyl(2-sec-butyl,4-[3',5'-di-phenylphenyl]indenyl)$_2$metal dichloride;
dimethylsiladiyl(2-sec-butyl,4-[3',5'-di-phenylphenyl]indenyl)$_2$metal dimethyl;
dimethylsiladiyl(2-tert-butyl,4-[3',5'-di-phenylphenyl]indenyl)$_2$metal dichloride;
dimethylsiladiyl(2-tert-butyl,4-[3',5'-di-phenylphenyl]indenyl)$_2$metal dimethyl;
9-silafluorendiyl(2-methyl,4-[3',5'-di-t-butylphenyl]indenyl)$_2$metal dichloride;
9-silafluorendiyl(2-methyl,4-[3',5'-di-t-butylphenyl]indenyl)$_2$metal dimethyl;
9-silafluorendiyl(2-ethyl,4-[3',5'-di-t-butylphenyl]indenyl)$_2$metal dichloride;
9-silafluorendiyl(2-ethyl,4-[3',5'-di-t-butylphenyl]indenyl)$_2$metal dimethyl;
9-silafluorendiyl(2-n-propyl,4-[3',5'-di-t-butylphenyl]indenyl)$_2$metal dichloride;
9-silafluorendiyl(2-n-propyl,4-[3',5'-di-t-butylphenyl]indenyl)$_2$metal dimethyl;
9-silafluorendiyl(2-iso-propyl,4-[3',5'-di-t-butylphenyl]indenyl)$_2$metal dichloride;
9-silafluorendiyl(2-iso-propyl,4-[3',5'-di-t-butylphenyl]indenyl)$_2$metal dimethyl;
9-silafluorendiyl(2-n-butyl,4-[3',5'-di-t-butylphenyl]indenyl)$_2$metal dichloride;
9-silafluorendiyl(2-n-butyl,4-[3',5'-di-t-butylphenyl]indenyl)$_2$metal dimethyl;
9-silafluorendiyl(2-iso-butyl,4-[3',5'-di-t-butylphenyl]indenyl)$_2$metal dichloride;
9-silafluorendiyl(2-iso-butyl,4-[3',5'-di-t-butylphenyl]indenyl)$_2$metal dimethyl;
9-silafluorendiyl(2-sec-butyl,4-[3',5'-di-t-butylphenyl]indenyl)$_2$metal dichloride;
9-silafluorendiyl(2-sec-butyl,4-[3',5'-di-t-butylphenyl]indenyl)$_2$metal dimethyl;
9-silafluorendiyl(2-tert-butyl,4-[3',5'-di-t-butylphenyl]indenyl)$_2$metal dichloride;
9-silafluorendiyl(2-tert-butyl,4-[3',5'-di-t-butylphenyl]indenyl)$_2$metal dimethyl;
wherein the metal is Zr, Hf, or Ti.

12. The process of claim 1 wherein the metallocene catalyst system comprises one or more of:
dimethylsiladiyl(tetramethylcyclopentadienyl)(cyclododecylamido)titanium dichloride,
dimethylsiladiyl(tetramethylcyclopentadienyl)(cyclohexyl-amido)titanium dichloride,
dimethylsiladiyl(tetramethylcyclopentadienyl)(1-adamantylamido)titanium dichloride,
dimethylsiladiyl(tetramethylcyclopentadienyl)(t-butylamido)titanium dichloride,
dimethylsiladiyl(tetramethylcyclopentadienyl)(s-butylamido)titanium dichloride,
dimethylsiladiyl(tetramethylcyclopentadienyl)(n-butylamido)titanium dichloride, dimethylsiladiyl(tetramethylcyclopentadienyl)(exo-2-norbornylamido)titanium dichloride,
diethylsilyl(tetramethylcyclopentadienyl)(cyclododecylamido)titanium dichloride,
diethylsilyl(tetramethylcyclopentadienyl)(exo-2-norbornylamido)titanium dichloride,
diethylsilyl(tetramethylcyclopentadienyl)(cyclohexylamido)titanium dichloride,
diethylsilyl(tetramethylcyclopentadienyl)(1-adamantylamido)titanium dichloride,
methylene(tetramethylcyclopentadienyl)(cyclododecylamido)titanium dichloride,
methylene(tetramethylcyclopentadienyl)(exo-2-norbornylamido)titanium dichloride,
methylene(tetramethylcyclopentadienyl)(cyclohexylamido)titanium dichloride,
methylene(tetramethylcyclopentadienyl)(1-adamantylamido)titanium dichloride,
dimethylsiladiyl(tetramethylcyclopentadienyl)(cyclododecylamido)titanium dimethyl,
dimethylsiladiyl(tetramethylcyclopentadienyl)(exo-2-norbornylamido)titanium dimethyl,
dimethylsiladiyl(tetramethylcyclopentadienyl)(cyclohexyl-amido)titanium dimethyl,
dimethylsiladiyl(tetramethylcyclopentadienyl)(1-adamantylamido)titanium dimethyl,
dimethylsiladiyl(2,5-dimethylcyclopentadienyl)(cyclododecylamido)titanium dichloride,
dimethylsiladiyl(2,5-dimethylcyclopentadienyl)(exo-2-norbornylamido)titanium dichloride,
dimethylsiladiyl(2,5-dimethylcyclopentadienyl)(cyclohexylamido)titanium dichloride,
dimethylsiladiyl(2,5-dimethylcyclopentadienyl)(1-adamantylamido)titanium dichloride,
dimethylsiladiyl(3,4-dimethylcyclopentadienyl)(cyclododecylamido)titanium dichloride,
dimethylsiladiyl(3,4-dimethylcyclopentadienyl)(exo-2-norbornylamido)titanium dichloride,
dimethylsiladiyl(3,4-dimethylcyclopentadienyl)(cyclohexylamido)titanium dichloride,
dimethylsiladiyl(3,4-dimethylcyclopentadienyl)(1-adamantylamido)titanium dichloride,
dimethylsiladiyl(2-ethyl-5-methylcyclopentadienyl)(cyclododecylamido)titanium dichloride,
dimethylsiladiyl(2-ethyl-5-methylcyclopentadienyl)(exo-2-norbornylamido)titanium dichloride,
dimethylsiladiyl(2-ethyl-5-methylcyclopentadienyl)(cyclohexylamido)titanium dichloride,
dimethylsiladiyl(2-ethyl-5-methylcyclopentadienyl)(1-adamantylamido)titanium dichloride,
dimethylsiladiyl(3-ethyl-4-methylcyclopentadienyl)(cyclododecylamido)titanium dichloride,
dimethylsiladiyl(3-ethyl-4-methylcyclopentadienyl)(exo-2-norbornylamido)titanium dichloride,
dimethylsiladiyl(3-ethyl-4-methylcyclopentadienyl)(cyclohexylamido)titanium dichloride,
dimethylsiladiyl(3-ethyl-4-methylcyclopentadienyl)(1-adamantylamido)titanium dichloride,
dimethylsiladiyl(2-ethyl-3-hexyl-5-methyl-4-octylcyclopentadienyl)(cyclododecylamido)titanium dichloride,
dimethylsiladiyl(2-ethyl-3-hexyl-5-methyl-4-octylcyclopentadienyl)(exo-2-norbornylamido)titanium dichloride,
dimethylsiladiyl(2-ethyl-3-hexyl-5-methyl-4-octylcyclopentadienyl)(cyclohexylamido)titanium dichloride,
dimethylsiladiyl(2-ethyl-3-hexyl-5-methyl-4-octylcyclopentadienyl)(1-adamantylamido)titanium dichloride,
dimethylsiladiyl(2-tetrahydroindenyl)(cyclododecylamido)titanium dichloride,
dimethylsiladiyl(2-tetrahydroindenyl)(cyclohexylamido)titanium dichloride,
dimethylsiladiyl(2-tetrahydroindenyl)(1-adamantylamido)titanium dichloride,
dimethylsiladiyl(2-tetrahydroindenyl)(exo-2-norbornylamido)titanium dichloride,
dimethylsiladiyl(tetramethylcyclopentadienyl)(cyclododecylamido)titanium dimethyl,
dimethylsiladiyl(tetramethylcyclopentadienyl)(cyclohexyl-amido)titanium dimethyl,
dimethylsiladiyl(tetramethylcyclopentadienyl)(1-adamantylamido)titanium dimethyl,
dimethylsiladiyl(tetramethylcyclopentadienyl)(t-butylamido)titanium dimethyl,
dimethylsiladiyl(tetramethylcyclopentadienyl)(s-butylamido)titanium dimethyl,
dimethylsiladiyl(tetramethylcyclopentadienyl)(n-butylamido)titanium dimethyl,
dimethylsiladiyl(tetramethylcyclopentadienyl)(exo-2-norbornylamido)titanium dimethyl,
diethylsilyl(tetramethylcyclopentadienyl)(cyclododecylamido)titanium dimethyl,
diethylsilyl(tetramethylcyclopentadienyl)(exo-2-norbornylamido)titanium dimethyl,
diethylsilyl(tetramethylcyclopentadienyl)(cyclohexylamido)titanium dimethyl,
diethylsilyl(tetramethylcyclopentadienyl)(1-adamantylamido)titanium dimethyl,
methylene(tetramethylcyclopentadienyl)(cyclododecylamido)titanium dimethyl,
methylene(tetramethylcyclopentadienyl)(exo-2-norbornylamido)titanium dimethyl, methylene(tetramethylcyclopentadienyl)(cyclohexylamido)titanium dimethyl,
methylene(tetramethylcyclopentadienyl)(1-adamantylamido)titanium dimethyl,
dimethylsiladiyl(tetramethylcyclopentadienyl)(cyclododecylamido)titanium dimethyl,
dimethylsiladiyl(tetramethylcyclopentadienyl)(exo-2-norbornylamido)titanium dimethyl,
dimethylsiladiyl(tetramethylcyclopentadienyl)(cyclohexyl-amido)titanium dimethyl,
dimethylsiladiyl(tetramethylcyclopentadienyl)(1-adamantylamido)titanium dimethyl,
dimethylsiladiyl(2,5-dimethylcyclopentadienyl)(cyclododecylamido)titanium dimethyl,
dimethylsiladiyl(2,5-dimethylcyclopentadienyl)(exo-2-norbornylamido)titanium dimethyl,
dimethylsiladiyl(2,5-dimethylcyclopentadienyl)(cyclohexylamido)titanium dimethyl,
dimethylsiladiyl(2,5-dimethylcyclopentadienyl)(1-adamantylamido)titanium dimethyl,
dimethylsiladiyl(3,4-dimethylcyclopentadienyl)(cyclododecylamido)titanium dimethyl,
dimethylsiladiyl(3,4-dimethylcyclopentadienyl)(exo-2-norbornylamido)titanium dimethyl,
dimethylsiladiyl(3,4-dimethylcyclopentadienyl)(cyclohexylamido)titanium dimethyl,
dimethylsiladiyl(3,4-dimethylcyclopentadienyl)(1-adamantylamido)titanium dimethyl,
dimethylsiladiyl(2-ethyl-5-methylcyclopentadienyl)(cyclododecylamido)titanium dimethyl,
dimethylsiladiyl(2-ethyl-5-methylcyclopentadienyl)(exo-2-norbornylamido)titanium dimethyl, dimethylsiladiyl(2-ethyl-5-methylcyclopentadienyl)(cyclohexylamido)titanium dimethyl,
dimethylsiladiyl(2-ethyl-5-methylcyclopentadienyl)(1-adamantylamido)titanium dimethyl,
dimethylsiladiyl(3-ethyl-4-methylcyclopentadienyl)(cyclododecylamido)titanium dimethyl,
dimethylsiladiyl(3-ethyl-4-methylcyclopentadienyl)(exo-2-norbornylamido) titanium dimethyl,
dimethylsiladiyl(3-ethyl-4-methylcyclopentadienyl)(cyclohexylamido)titanium dimethyl,
dimethylsiladiyl(3-ethyl-4-methylcyclopentadienyl)(1-adamantylamido)titanium dimethyl,
dimethylsiladiyl(2-ethyl-3-hexyl-5-methyl-4-octylcyclopentadienyl)(cyclododecylamido)titanium dimethyl,
dimethylsiladiyl(2-ethyl-3-hexyl-5-methyl-4-octylcyclopentadienyl)(exo-2-norbornylamido)titanium dimethyl,
dimethylsiladiyl(2-ethyl-3-hexyl-5-methyl-4-octylcyclopentadienyl)(cyclohexylamido)titanium dimethyl,
dimethylsiladiyl(2-ethyl-3-hexyl-5-methyl-4-octylcyclopentadienyl)(1-adamantylamido)titanium dimethyl,
dimethylsiladiyl(2-tetrahydroindenyl)(cyclododecylamido)titanium dimethyl,
dimethylsiladiyl(2-tetrahydroindenyl)(cyclohexylamido) titanium dimethyl,
dimethylsiladiyl(2-tetrahydroindenyl)(1-adamantylamido)titanium dimethyl, and
dimethylsiladiyl(2-tetrahydroindenyl)(exo-2-norbornylamido)titanium dimethyl.

13. The process of claim 1 where the process further uses one or more scavengers selected from the group consisting of trimethylaluminum, triethylaluminum, triisobutylaluminum, tri-n-hexylaluminum, tri-n-octylaluminum, and combinations thereof.

14. The process of claim 1 wherein the metallocene catalyst system is supported.

15. The process of claim 14 wherein the support is silica.

16. The process of claim 1 where the catalyst system, the propylene and the mixed olefin stream are contacted in the solution phase.

17. The process of claim 1 where the catalyst, the propylene and the mixed olefin stream are contacted in the slurry phase.

18. The process of claim 1 where the catalyst, the propylene and the mixed olefin stream are contacted in a high pressure polymerization process.

19. The process of claim 1 where the catalyst, the propylene and the mixed olefin stream are contacted in a hydrocarbon diluent.

20. The process of claim 1, wherein the mixture is present at 1 to 30 weight %, based upon the weight of the propylene and the mixed olefin stream.

21. The process of claim 1, wherein the mixed olefin stream is present at 2 to 25 weight %, based upon the weight of the propylene and the mixed olefin stream.

22. The process of claim 1, wherein the mixed olefin stream is present at 3 to 20 weight %, based upon the weight of the propylene and the mixed olefin stream.

23. The process of claim 1, wherein the mixed olefin stream is present at 4 to 15 weight %, based upon the weight of the propylene and the mixed olefin stream.

24. The process of claim 1, wherein the mixed olefin stream is present at 1 to 10 weight %, based upon the weight of the propylene and the mixed olefin stream.

25. The process of claim 1, wherein the mixed olefin stream is present at 1 to 8 weight %, based upon the weight of the propylene and the mixed olefin stream.

26. The process of claim 1, wherein the mixed olefin stream is present at 1 to 6 weight %, based upon the weight of the propylene and the mixed olefin stream.

27. The process of claim 1, wherein the mixed olefin stream is present at 1 to 5 weight %, based upon the weight of the propylene and the mixed olefin stream.

28. The process of claim 1, wherein the mixed olefin stream is obtained by converting synthesis gas comprising CO and $H_2$ to the mixed olefin stream.

29. The process of claim 1, wherein the mixed olefin strewn is obtained by a) converting methane to synthesis gas comprising CO and $H_2$, b) converting the synthesis gas to the mixed olefin stream.

30. The process of claim 1 wherein the mixed olefin stream is obtained by combining carbon monoxide with a Fischer-Tropsch catalyst.

31. The process of claim 1, wherein the mixed olefin stream is obtained by converting synthesis gas comprising carbon dioxide and hydrogen to the mixed olefin stream.

32. The process of claim 1, wherein the mixed olefin stream is obtained by combining a synthesis gas stream with a Fischer-Tropsch catalyst.

33. The process of claim 1 wherein the metallocene catalyst system comprises one or more of:
dimethylsiladiyl(2-methyl,4-[3',5'-di-t-butylphenyl]indenyl)$_2$zirconium dichloride;
dimethylsiladiyl(2-ethyl,4-[3',5'-di-t-butylphenyl]indenyl)$_2$zirconium dichloride;
dimethylsiladiyl(2-n-propyl,4-[3',5'-di-t-butylphenyl]indenyl)$_2$zirconium dichloride;
dimethylsiladiyl(2-iso-propyl,4-[3',5'-di-t-butylphenyl] indenyl)$_2$zirconium dichloride;
dimethylsiladiyl(2-n-butyl,4-[3',5'-di-t-butylphenyl]indenyl)$_2$zirconium dichloride;
dimethylsiladiyl(2-iso-butyl,4-[3',5'-di-t-butylphenyl]indenyl)$_2$zirconium dichloride;
dimethylsiladiyl(2-sec-butyl,4-[3',5'-di-t-butylphenyl]indenyl)$_2$zirconium dichloride;
dimethylsiladiyl(2-tert-butyl,4-[3',5'-di-t-butylphenyl]indenyl)$_2$zirconium dichloride;
dimethylsiladiyl(2-methyl,4-[3',5'-di-t-butylphenyl]indenyl)$_2$hafnium dichloride;
dimethylsiladiyl(2-ethyl,4-[3',5'-di-t-butylphenyl]indenyl)$_2$hafnium dichloride;
dimethylsiladiyl(2-n-propyl,4-[3',5'-di-t-butylphenyl]indenyl)$_2$hafnium
dimethylsiladiyl(2-iso-propyl,4-[3',5'-di-t-butylphenyl] indenyl)$_2$hafnium dichloride;
dimethylsiladiyl(2-butyl,4-[3',5'-di-t-butylphenyl]indenyl)$_2$hafnium dichloride;
9-silafluorendiyl(2-methyl,4-[3',5'-di-t-butylphenyl]indenyl)$_2$zirconium dichloride;
9-silafluorendiyl(2-ethyl,4-[3',5'-di-t-butylphenyl]indenyl)$_2$zirconium dichloride;
9-silafluorendiyl(2-n-propyl,4-[3',5'-di-t-butylphenyl]indenyl)$_2$zirconium dichloride;
9-silafluorendiyl(2-iso-propyl,4-[3',5'-di-t-butylphenyl] indenyl)$_2$zirconium dichloride;
9-silafluorendiyl(2-n-butyl,4-[3',5'-di-t-butylphenyl]indenyl)$_2$zirconium dichloride;
9-silafluorendiyl(2-iso-butyl,4-[3',5'-di-t-butylphenyl]indenyl)$_2$zirconium dichloride;
9-silafluorendiyl(2-sec-butyl,4-[3',5'-di-t-butylphenyl]indenyl)$_2$zirconium dichloride;
9-silafluorendiyl(2-tert-butyl,4-[3',5'-di-t-butylphenyl]indenyl)$_2$zirconium dichloride;

9-silafluorendiyl(2-methyl,4-[3',5'-di-t-butylphenyl]indenyl)₂hafnium dichloride;
9-silafluorendiyl(2-ethyl,4-[3',5'-di-t-butylphenyl]indenyl)₂hafnium dichloride;
9-silafluorendiyl(2-n-propyl,4-[3',5'-di-t-butylphenyl]indenyl)₂hafnium dichloride;
9-silafluorendiyl(2-iso-propyl,4-[3',5'-di-t-butylphenyl]indenyl)₂hafnium dichloride;
9-silafluorendiyl(2-n-butyl,4-[3',5'-di-t-butylphenyl]indenyl)₂hafnium dichloride;
9-silafluorendiyl(2-iso-butyl,4-[3',5'-di-t-butylphenyl]indenyl)₂hafnium dichloride;
9-silafluorendiyl(2-sec-butyl,4-[3',5'-di-t-butylphenyl]indenyl)₂hafnium dichloride;
9-silafluorendiyl(2-tert-butyl,4-[3',5'-di-t-butylphenyl]indenyl)₂hafnium dichloride;
dimethylsiladiyl(2-methyl,4-[3',5'-di-t-butylphenyl]indenyl)₂zirconium dimethyl;
dimethylsiladiyl(2-ethyl,4-[3',5'-di-t-butylphenyl]indenyl)₂zirconium dimethyl;
dimethylsiladiyl(2-n-propyl,4-[3',5'-di-t-butylphenyl]indenyl)₂zirconium dimethyl;
dimethylsiladiyl(2-iso-propyl,4-[3',5'-di-t-butylphenyl]indenyl)₂zirconium dimethyl;
dimethylsiladiyl(2-n-butyl,4-[3',5'-di-t-butylphenyl]indenyl)₂zirconium dimethyl;
dimethylsiladiyl(2-iso-butyl,4-[3',5'-di-t-butylphenyl]indenyl)₂zirconium dimethyl;
dimethylsiladiyl(2-sec-butyl,4-[3',5'-di-t-butylphenyl]indenyl)₂zirconium dimethyl;
dimethylsiladiyl(2-tert-butyl,4-[3',5'-di-t-butylphenyl]indenyl)₂zirconium dimethyl;
dimethylsiladiyl(2-methyl,4-[3',5'-di-t-butylphenyl]indenyl)₂hafnium dimethyl;
dimethylsiladiyl(2-ethyl,4-[3',5'-di-t-butylphenyl]indenyl)₂hafnium dimethyl;
dimethylsiladiyl(2-n-propyl,4-[3',5'-di-t-butylphenyl]indenyl)₂hafnium dimethyl
dimethylsiladiyl(2-iso-propyl,4-[3',5'-di-t-butylphenyl]indenyl)₂hafnium dimethyl;
dimethylsiladiyl(2-n-butyl,4-[3',5'-di-t-butylphenyl]indenyl)₂hafnium dimethyl;
dimethylsiladiyl(2-iso-butyl,4-[3',5'-di-t-butylphenyl]indenyl)₂hafnium dimethyl;
dimethylsiladiyl(2-sec-butyl,4-[3',5'-di-t-butylphenyl]indenyl)₂hafnium dimethyl;
dimethylsiladiyl(2-tert-butyl,4-[3',5'-di-t-butylphenyl]indenyl)₂hafnium dimethyl;
9-silafluorendiyl(2-methyl,4-[3',5'-di-t-butylphenyl]indenyl)₂zirconium dimethyl;
9-silafluorendiyl(2-ethyl,4-[3',5'-di-t-butylphenyl]indenyl)₂zirconium dimethyl;
9-silafluorendiyl(2-n-propyl,4-[3',5'-di-t-butylphenyl]indenyl)₂zirconium dimethyl;
9-silafluorendiyl(2-iso-propyl,4-[3',5'-di-t-butylphenyl]indenyl)₂zirconium dimethyl;
9-silafluorendiyl(2-n-butyl,4-[3',5'-di-t-butylphenyl]indenyl)₂zirconium dimethyl;
9-silafluorendiyl(2-iso-butyl,4-[3',5'-di-t-butylphenyl]indenyl)₂zirconium dimethyl;
9-silafluorendiyl(2-sec-butyl,4-[3',5'-di-t-butylphenyl]indenyl)₂zirconium dimethyl;
9-silafluorendiyl(2-tert-butyl,4-[3',5'-di-t-butylphenyl]indenyl)₂zirconium dimethyl;
9-silafluorendiyl(2-methyl,4-[3',5'-di-t-butylphenyl]indenyl)₂hafnium dimethyl;
9-silafluorendiyl(2-ethyl,4-[3',5'-di-t-butylphenyl]indenyl)₂hafnium dimethyl;
9-silafluorendiyl(2-n-propyl,4-[3',5'-di-t-butylphenyl]indenyl)₂hafnium dimethyl;
9-silafluorendiyl(2-iso-propyl,4-[3',5'-di-t-butylphenyl]indenyl)₂hafnium dimethyl;
9-silafluorendiyl(2-n-butyl,4-[3',5'-di-t-butylphenyl]indenyl)₂hafnium dimethyl;
9-silafluorendiyl(2-iso-butyl,4-[3',5'-di-t-butylphenyl]indenyl)2hafnium dimethyl;
9-silafluorendiyl(2-sec-butyl,4-[3',5'-di-t-butylphenyl]indenyl)2hafnium dimethyl;
9-silafluorendiyl(2-tert-butyl,4-[3',5'-di-t-butylphenyl]indenyl)₂hafnium dimethyl;
dimethylsiladiyl(2-methyl,4-[3',5'-bis-trifluoromethylphenyl]indenyl)₂zirconium dichloride;
dimethylsiladiyl(2-ethyl,4-[3',5'-bis-trifluoromethylphenyl]indenyl)₂zirconium dichloride;
dimethylsiladiyl(2-n-propyl,4-[3',5'-bis-trifluoromethylphenyl]indenyl)₂zirconium dichloride;
dimethylsiladiyl(2-iso-propyl,4-[3',5'-bis-trifluoromethylphenyl]indenyl)₂zirconium dichloride;
dimethylsiladiyl(2-n-butyl,4-[3',5'-bis-trifluoromethylphenyl]indenyl)₂zirconium dichloride;
dimethylsiladiyl(2-iso-butyl,4-[3',5'-bis-trifluoromethylphenyl]indenyl)₂zirconium dichloride;
dimethylsiladiyl(2-sec-butyl,4-[3',5'-bis-trifluoromethylphenyl]indenyl)₂zirconium dichloride;
dimethylsiladiyl(2-tert-butyl,4-[3',5'-bis-trifluoromethylphenyl]indenyl)₂zirconium dichloride;
dimethylsiladiyl(2-methyl,4-[3',5'-bis-trifluoromethylphenyl]indenyl)₂hafnium dichloride;
dimethylsiladiyl(2-ethyl,4-[3',5'-bis-trifluoromethylphenyl]indenyl)₂hafnium dichloride;
dimethylsiladiyl(2-n-propyl,4-[3',5'-bis-trifluoromethylphenyl]indenyl)₂hafnium dichloride;
dimethylsiladiyl(2-iso-propyl,4-[3',5'-bis-trifluoromethylphenyl]indenyl)₂hafnium dichloride;
dimethylsiladiyl(2-n-butyl,4-[3',5'-bis-trifluoromethylphenyl]indenyl)₂hafnium dichloride;
dimethylsiladiyl(2-iso-butyl,4-[3',5'-bis-trifluoromethylphenyl]indenyl)₂hafnium dichloride;
dimethylsiladiyl(2-sec-butyl,4-[3',5'-bis-trifluoromethylphenyl]indenyl)₂hafnium dichloride;
dimethylsiladiyl(2-tert-butyl,4-[3',5'-bis-trifluoromethylphenyl]indenyl)₂hafnium dichloride;
9-silafluorendiyl(2-methyl,4-[3',5'-bis-trifluoromethylphenyl]indenyl)₂zirconium dichloride;
dimethylsiladiyl(2-ethyl,4-[3',5'-bis-trifluoromethylphenyl]indenyl)₂hafnium dichloride;
9-silafluorendiyl(2-n-propyl,4-[3',5'-bis-trifluoromethylphenyl]indenyl)₂zirconium dichloride;
9-silafluorendiyl(2-iso-propyl,4-[3',5'-bis-trifluoromethylphenyl]indenyl)₂zirconium dichloride;
9-silafluorendiyl(2-n-butyl,4-[3',5'-bis-trifluoromethylphenyl]indenyl)₂zirconium dichloride;
9-silafluorendiyl(2-iso-butyl,4-[3',5'-bis-trifluoromethylphenyl]indenyl)₂zirconium dichloride;
9-silafluorendiyl(2-sec-butyl,4-[3',5'-bis-trifluoromethylphenyl]indenyl)₂zirconium dichloride;
9-silafluorendiyl(2-tert-butyl,4-[3',5'-bis-trifluoromethylphenyl]indenyl)₂zirconium dichloride;
9-silafluorendiyl(2-methyl,4-[3',5'-bis-trifluoromethylphenyl]indenyl)₂hafnium dichloride;
9-silafluorendiyl(2-ethyl,4-[3',5'-bis-trifluoromethylphenyl]indenyl)₂hafnium dichloride;

9-silafluorendiyl(2-n-propyl,4-[3',5'-bis-trifluoromethylphenyl]indenyl)₂hafnium dichloride;
9-silafluorendiyl(2-iso-propyl,4-[3',5'-bis-trifluoromethylphenyl]indenyl)₂hafnium dichloride;
9-silafluorendiyl(2-n-butyl,4-[3',5'-bis-trifluoromethylphenyl]indenyl)₂hafnium dichloride;
9-silafluorendiyl(2-iso-butyl,4-[3',5'-bis-trifluoromethylphenyl]indenyl)₂hafnium dichloride;
9-silafluorendiyl(2-sec-butyl,4-[3',5'-bis-trifluoromethylphenyl]indenyl)₂hafnium dichloride;
9-silafluorendiyl(2-tert-butyl,4-[3',5'-bis-trifluoromethylphenyl]indenyl)₂hafnium dichloride;
dimethylsiladiyl(2-methyl,4-[3',5'-bis-trifluoromethylphenyl]indenyl)₂zirconium dimethyl;
dimethylsiladiyl(2-ethyl,4-[3',5'-bis-trifluoromethylphenyl]indenyl)₂zirconium dimethyl;
dimethylsiladiyl(2-n-propyl,4-[3',5'-bis-trifluoromethylphenyl]indenyl)₂zirconium dimethyl;
dimethylsiladiyl(2-iso-propyl,4-[3',5'-bis-trifluoromethylphenyl]indenyl)₂zirconium dimethyl;
dimethylsiladiyl(2-n-butyl,4-[3',5'-bis-trifluoromethylphenyl]indenyl)₂zirconium dimethyl;
dimethylsiladiyl(2-iso-butyl,4-[3',5'-bis-trifluoromethylphenyl]indenyl)₂zirconium dimethyl;
dimethylsiladiyl(2-sec-butyl,4-[3',5'-bis-trifluoromethylphenyl]indenyl)₂zirconium dimethyl;
dimethylsiladiyl(2-tert-butyl,4-[3',5'-bis-trifluoromethylphenyl]indenyl)₂zirconium dimethyl;
dimethylsiladiyl(2-methyl,4-[3',5'-bis-trifluoromethylphenyl]indenyl)₂hafnium dimethyl;
dimethylsiladiyl(2-ethyl,4-[3',5'-bis-trifluoromethylphenyl]indenyl)₂hafnium dimethyl;
dimethylsiladiyl(2-n-propyl,4-[3',5'-bis-trifluoromethylphenyl]indenyl)₂hafnium dimethyl;
dimethylsiladiyl(2-iso-propyl,4-[3',5'-bis-trifluoromethylphenyl]indenyl)₂hafnium dimethyl;
dimethylsiladiyl(2-n-butyl,4-[3',5'-bis-trifluoromethylphenyl]indenyl)₂hafnium dimethyl;
dimethylsiladiyl(2-iso-butyl,4-[3',5'-bis-trifluoromethylphenyl]indenyl)₂hafnium dimethyl;
dimethylsiladiyl(2-sec-butyl,4-[3',5'-bis-trifluoromethylphenyl]indenyl)₂hafnium dimethyl;
dimethylsiladiyl(2-tert-butyl,4-[3',5'-bis-trifluoromethylphenyl]indenyl)₂hafnium dimethyl;
9-silafluorendiyl(2-methyl,4-[3',5'-bis-trifluoromethylphenyl]indenyl)₂zirconium dimethyl;
dimethylsiladiyl(2-ethyl,4-[3',5'-bis-trifluoromethylphenyl]indenyl)₂hafnium dimethyl;
9-silafluorendiyl(2-n-propyl,4-[3',5'-bis-trifluoromethylphenyl]indenyl)₂zirconium dimethyl;
9-silafluorendiyl(2-iso-propyl,4-[3',5'-bis-trifluoromethylphenyl]indenyl)₂zirconium dimethyl;
9-silafluorendiyl(2-n-butyl,4-[3',5'-bis-trifluoromethylphenyl]indenyl)₂zirconium dimethyl;
9-silafluorendiyl(2-iso-butyl,4-[3',5'-bis-trifluoromethylphenyl]indenyl)₂zirconium dimethyl;
9-silafluorendiyl(2-sec-butyl,4-[3',5'-bis-trifluoromethylphenyl]indenyl)₂zirconium dimethyl;
9-silafluorendiyl(2-tert-butyl,4-[3',5'-bis-trifluoromethylphenyl]indenyl)₂zirconium dimethyl;
9-silafluorendiyl(2-methyl,4-[3',5'-bis-trifluoromethylphenyl]indenyl)₂hafnium dimethyl;
9-silafluorendiyl(2-ethyl,4-[3',5'-bis-trifluoromethylphenyl]indenyl)₂hafnium dimethyl;
9-silafluorendiyl(2-n-propyl,4-[3',5'-bis-trifluoromethylphenyl]indenyl)₂hafnium dimethyl;
9-silafluorendiyl(2-iso-propyl,4-[3',5'-bis-trifluoromethylphenyl]indenyl)₂hafnium dimethyl;
9-silafluorendiyl(2-n-butyl,4-[3',5'-bis-trifluoromethylphenyl]indenyl)2hafnium dimethyl;
9-silafluorendiyl(2-iso-butyl,4-[3',5'-bis-trifluoromethylphenyl]indenyl)₂hafnium dimethyl;
9-silafluorendiyl(2-sec-butyl,4-[3',5'-bis-trifluoromethylphenyl]indenyl)₂hafnium dimethyl;
9-silafluorendiyl(2-tert-butyl,4-[3',5'-bis-trifluoromethylphenyl]indenyl)₂hafnium dimethyl;
dimethylsiladiyl(2-ethyl,4-[3',5'-di-iso-propylphenyl]indenyl)₂zirconium dichloride;
dimethylsiladiyl(2-n-propyl,4-[3',5'-di-iso-propylphenyl]indenyl)₂zirconium dichloride
dimethylsiladiyl(2-iso-propyl,4-[3',5'-di-iso-propylphenyl]indenyl)₂zirconium dichloride;
dimethylsiladiyl(2-n-butyl,4-[3',5'-di-iso-propylphenyl]indenyl)₂zirconium dichloride;
dimethylsiladiyl(2-iso-butyl,4-[3',5'-di-iso-propylphenyl]indenyl)₂zirconium dichloride;
dimethylsiladiyl(2-sec-butyl,4-[3',5'-di-iso-propylphenyl]indenyl)₂zirconium dichloride;
dimethylsiladiyl(2-tert-butyl,4-[3',5'-di-iso-propylphenyl]indenyl)₂zirconium dichloride;
dimethylsiladiyl(2-ethyl,4-[3',5'-di-iso-propylphenyl]indenyl)₂hafnium dichloride;
dimethylsiladiyl(2-n-propyl,4-[3',5'-di-iso-propylphenyl]indenyl)₂hafnium dichloride;
dimethylsiladiyl(2-iso-propyl,4-[3',5'-di-iso-propylphenyl]indenyl)₂hafnium dichloride;
dimethylsiladiyl(2-n-butyl,4-[3',5'-di-iso-propylphenyl]indenyl)₂hafnium dichloride;
dimethylsiladiyl(2-iso-butyl,4-[3',5'-di-iso-propylphenyl]indenyl)₂hafnium dichloride;
dimethylsiladiyl(2-sec-butyl,4-[3',5'-di-iso-propylphenyl]indenyl)₂hafnium dichloride;
dimethylsiladiyl(2-tert-butyl,4-[3',5'-di-iso-propylphenyl]indenyl)₂hafnium dichloride;
9-silafluorendiyl(2-ethyl,4-[3',5'-di-iso-propylphenyl]indenyl)₂zirconium dichloride;
9-silafluorendiyl(2-n-propyl,4-[3',5'-di-iso-propylphenyl]indenyl)₂zirconium dichloride;
9-silafluorendiyl(2-iso-propyl,4-[3',5'-di-iso-propylphenyl]indenyl)₂zirconium dichloride;
9-silafluorendiyl(2-n-butyl,4-[3',5'-di-iso-propylphenyl]indenyl)₂zirconium dichloride;
9-silafluorendiyl(2-iso-butyl,4-[3',5'-di-iso-propylphenyl]indenyl)₂zirconium dichloride;
9-silafluorendiyl(2-sec-butyl,4-[3',5'-di-iso-propylphenyl]indenyl)₂zirconium dichloride;
9-silafluorendiyl(2-tert-butyl,4-[3',5'-di-iso-propylphenyl]indenyl)₂zirconium dichloride;
9-silafluorendiyl(2-ethyl,4-[3',5'-di-iso-propylphenyl]indenyl)₂hafnium dichloride;
9-silafluorendiyl(2-n-propyl,4-[3',5'-di-iso-propylphenyl]indenyl)₂hafnium dichloride;
9-silafluorendiyl(2-iso-propyl,4-[3',5'-di-iso-propylphenyl]indenyl)₂hafnium dichloride;
9-silafluorendiyl(2-n-butyl,4-[3',5'-di-iso-propylphenyl]indenyl)₂hafnium dichloride;
9-silafluorendiyl(2-iso-butyl,4-[3',5'-di-iso-propylphenyl]indenyl)₂hafnium dichloride;
9-silafluorendiyl(2-sec-butyl,4-[3',5'-di-iso-propylphenyl]indenyl)₂hafnium dichloride;
9-silafluorendiyl(2-tert-butyl,4-[3',5'-di-iso-propylphenyl]indenyl)₂hafnium dichloride;

dimethylsiladiyl(2-ethyl,4-[3',5'-di-iso-propylphenyl]indenyl)₂zirconium dimethyl;
dimethylsiladiyl(2-n-propyl,4-[3',5'-di-iso-propylphenyl]indenyl)₂zirconium dimethyl
dimethylsiladiyl(2-iso-propyl,4-[3',5'-di-iso-propylphenyl]indenyl)₂zirconium dimethyl;
dimethylsiladiyl(2-n-butyl,4-[3',5'-di-iso-propylphenyl]indenyl)₂zirconium dimethyl;
dimethylsiladiyl(2-isobutyl,4-[3',5'-di-iso-propylphenyl]indenyl)₂zirconium dimethyl;
dimethylsiladiyl(2-sec-butyl,4-[3',5'-di-iso-propylphenyl]indenyl)₂zirconium dimethyl;
dimethylsiladiyl(2-tert-butyl,4-[3',5'-di-iso-propylphenyl]indenyl)₂zirconium dimethyl;
dimethylsiladiyl(2-ethyl,4-[3',5'-di-iso-propylphenyl]indenyl)₂hafnium dimethyl;
dimethylsiladiyl(2-n-propyl,4-[3',5'-di-iso-propylphenyl]indenyl)₂hafnium dimethyl;
dimethylsiladiyl(2-iso-propyl,4-[3',5'-di-iso-propylphenyl]indenyl)₂hafnium dimethyl;
dimethylsiladiyl(2-n-butyl,4-[3',5'-di-iso-propylphenyl]indenyl)₂hafnium dimethyl;
dimethylsiladiyl(2-iso-butyl,4-[3',5'-di-iso-propylphenyl]indenyl)₂zirconium dimethyl;
dimethylsiladiyl(2-sec-butyl,4-[3',5'-di-iso-propylphenyl]indenyl)₂zirconium dimethyl;
dimethylsiladiyl(2-tert-butyl,4-[3',5'-di-iso-propylphenyl]indenyl)₂zirconium dimethyl;
9-silafluorendiyl(2-ethyl,4-[3',5'-di-iso-propylphenyl]indenyl)₂zirconium dimethyl;
9-silafluorendiyl(2-n-propyl,4-[3',5'-di-iso-propylphenyl]indenyl)₂zirconium dimethyl;
9-silafluorendiyl(2-iso-propyl,4-[3',5'-di-iso-propylphenyl]indenyl)₂zirconium dimethyl;
9-silafluorendiyl(2-n-butyl,4-[3',5'-di-iso-propylphenyl]indenyl)₂zirconium dimethyl;
9-silafluorendiyl(2-iso-butyl,4-[3',5'-di-iso-propylphenyl]indenyl)₂zirconium dimethyl;
9-silafluorendiyl(2-sec-butyl,4-[3',5'-di-iso-propylphenyl]indenyl)₂zirconium dimethyl;
9-silafluorendiyl(2-tert-butyl,4-[3',5'-di-iso-propylphenyl]indenyl)₂zirconium dimethyl;
9-silafluorendiyl(2-ethyl,4-[3',5'-di-iso-propylphenyl]indenyl)₂hafnium dimethyl;
9-silafluorendiyl(2-n-propyl,4-[3',5'-di-iso-propylphenyl]indenyl)₂hafnium dimethyl;
9-silafluorendiyl(2-iso-propyl,4-[3',5'-di-iso-propylphenyl]indenyl)₂hafnium dimethyl;
9-silafluorendiyl(2-n-butyl,4-[3',5'-di-iso-propylphenyl]indenyl)₂hafnium dimethyl;
9-silafluorendiyl(2-iso-butyl,4-[3',5'-di-iso-propylphenyl]indenyl)₂hafnium dimethyl;
9-silafluorendiyl(2-sec-butyl,4-[3',5'-di-iso-propylphenyl]indenyl)₂hafnium dimethyl;
9-silafluorendiyl(2-tert-butyl,4-[3',5'-di-iso-propylphenyl]indenyl)₂hafnium dimethyl;
dimethylsiladiyl(2-methyl,4-[3',5'-di-phenylphenyl]indenyl)₂zirconium dichloride;
dimethylsiladiyl(2-ethyl,4-[3',5'-di-phenylphenyl]indenyl)₂zirconium dichloride;
dimethylsiladiyl(2-n-propyl,4-[3',5'-di-phenylphenyl]indenyl)₂zirconium dichloride;
dimethylsiladiyl(2-iso-propyl,4-[3',5'-di-phenylphenyl]indenyl)₂zirconium dichloride;
dimethylsiladiyl(2-n-butyl,4-[3',5'-di-phenylphenyl]indenyl)₂zirconium dichloride;
dimethylsiladiyl(2-iso-butyl,4-[3',5'-di-phenylphenyl]indenyl)₂zirconium dichloride;
dimethylsiladiyl(2-sec-butyl,4-[3',5'-di-phenylphenyl]indenyl)₂zirconium dichloride;
dimethylsiladiyl(2-tert-butyl,4-[3',5'-di-phenylphenyl]indenyl)₂zirconium dichloride;
dimethylsiladiyl(2-methyl,4-[3',5'-di-phenylphenyl]indenyl)₂hafnium dichloride;
dimethylsiladiyl(2-ethyl,4-[3',5'-di-phenylphenyl]indenyl)₂hafnium dichloride;
dimethylsiladiyl(2-n-propyl,4-[3',5'-di-phenylphenyl]indenyl)₂hafnium dichloride;
dimethylsiladiyl(2-iso-propyl,4-[3',5'-di-phenylphenyl]indenyl)₂hafnium dichloride;
dimethylsiladiyl(2-n-butyl,4-[3',5'-di-phenylphenyl]indenyl)₂hafnium dichloride;
dimethylsiladiyl(2-iso-butyl,4-[3',5'-di-phenylphenyl]indenyl)₂hafnium dichloride;
dimethylsiladiyl(2-sec-butyl,4-[3',5'-di-phenylphenyl]indenyl)₂hafnium dichloride;
dimethylsiladiyl(2-tert-butyl,4-[3',5'-di-phenylphenyl]indenyl)₂hafnium dichloride;
9-silafluorendiyl(2-methyl,4-[3',5'-di-phenylphenyl]indenyl)₂zirconium dichloride;
9-silafluorendiyl(2-ethyl,4-[3',5'-di-phenylphenyl]indenyl)₂zirconium dichloride;
9-silafluorendiyl(2-n-propyl,4-[3',5'-di-phenylphenyl]indenyl)₂zirconium dichloride;
9-silafluorendiyl(2-iso-propyl,4-[3',5'-di-phenylphenyl]indenyl)₂zirconium dichloride;
9-silafluorendiyl(2-n-butyl,4-[3',5'-di-phenylphenyl]indenyl)₂zirconium dichloride;
9-silafluorendiyl(2-iso-butyl,4-[3',5'-di-phenylphenyl]indenyl)₂zirconium dichloride;
9-silafluorendiyl(2-sec-butyl,4-[3',5'-di-phenylphenyl]indenyl)₂zirconium dichloride;
9-silafluorendiyl(2-tert-butyl,4-[3',5'-di-phenylphenyl]indenyl)₂zirconium dichloride;
9-silafluorendiyl(2-methyl,4-[3',5'-di-phenylphenyl]indenyl)₂hafnium dichloride;
9-silafluorendiyl(2-ethyl,4-[3',5'-di-phenylphenyl]indenyl)₂hafnium dichloride;
9-silafluorendiyl(2-n-propyl,4-[3',5'-di-phenylphenyl]indenyl)₂hafnium dichloride;
9-silafluorendiyl(2-iso-propyl,4-[3',5'-di-phenylphenyl]indenyl)₂hafnium dichloride;
9-silafluorendiyl(2-n-butyl,4-[3',5'-di-phenylphenyl]indenyl)₂hafnium dichloride;
9-silafluorendiyl(2-iso-butyl,4-[3',5'-di-phenylphenyl]indenyl)₂hafnium dichloride;
9-silafluorendiyl(2-sec-butyl,4-[3',5'-di-phenylphenyl]indenyl)₂hafnium dichloride;
9-silafluorendiyl(2-tert-butyl,4-[3',5'-di-phenylphenyl]indenyl)₂hafnium dichloride;
dimethylsiladiyl(2-methyl,4-[3',5'-di-phenylphenyl]indenyl)₂zirconium dimethyl;
dimethylsiladiyl(2-ethyl,4-[3',5'-di-phenylphenyl]indenyl)₂zirconium dimethyl;
dimethylsiladiyl(2-n-propyl,4-[3',5'-di-phenylphenyl]indenyl)₂zirconium dimethyl;
dimethylsiladiyl(2-iso-propyl,4-[3',5'-di-phenylphenyl]indenyl)₂zirconium dimethyl;
dimethylsiladiyl(2-n-butyl,4-[3',5'-di-phenylphenyl]indenyl)₂zirconium dimethyl;
dimethylsiladiyl(2-iso-butyl,4-[3',5'-di-phenylphenyl]indenyl)₂zirconium dimethyl;

dimethylsiladiyl(2-sec-butyl,4-[3',5'-di-phenylphenyl]indenyl)₂zirconium dimethyl;
dimethylsiladiyl(2-tert-butyl,4-[3',5'-di-phenylphenyl]indenyl)₂zirconium dimethyl;
dimethylsiladiyl(2-methyl,4-[3',5'-di-phenylphenyl]indenyl)₂hafnium dimethyl;
dimethylsiladiyl(2-ethyl,4-[3',5'-di-phenylphenyl]indenyl)₂hafnium dimethyl;
dimethylsiladiyl(2-n-propyl,4-[3',5'-di-phenylphenyl]indenyl)₂hafnium dimethyl;
dimethylsiladiyl(2-iso-propyl,4-[3',5'-di-phenylphenyl]indenyl)₂hafnium dimethyl;
dimethylsiladiyl(2-n-butyl,4-[3',5'-di-phenylphenyl]indenyl)₂hafnium dimethyl;
dimethylsiladiyl(2-iso-butyl,4-[3',5'-di-phenylphenyl]indenyl)₂hafnium dimethyl;
dimethylsiladiyl(2-sec-butyl,4-[3',5'-di-phenylphenyl]indenyl)₂hafnium dimethyl;
dimethylsiladiyl(2-tert-butyl,4-[3',5'-di-phenylphenyl]indenyl)₂hafnium dimethyl;
9-silafluorendiyl(2-methyl,4-[3',5'-di-phenylphenyl]indenyl)₂zirconium dimethyl;
9-silafluorendiyl(2-ethyl,4-[3',5'-di-phenylphenyl]indenyl)₂zirconium dimethyl;
9-silafluorendiyl(2-n-propyl,4-[3',5'-di-phenylphenyl]indenyl)₂zirconium dimethyl;
9-silafluorendiyl(2-iso-propyl,4-[3',5'-di-phenylphenyl]indenyl)₂zirconium dimethyl;
9-silafluorendiyl(2-n-butyl,4-[3',5'-di-phenylphenyl]indenyl)₂zirconium dimethyl;
9-silafluorendiyl(2-iso-butyl,4-[3',5'-di-phenylphenyl]indenyl)₂zirconium dimethyl;
9-silafluorendiyl(2-sec-butyl,4-[3',5'-di-phenylphenyl]indenyl)₂zirconium dimethyl;
9-silafluorendiyl(2-tert-butyl,4-[3',5'-di-phenylphenyl]indenyl)₂zirconium dimethyl;
9-silafluorendiyl(2-methyl,4-[3',5'-di-phenylphenyl]indenyl)₂hafnium dimethyl;
9-silafluorendiyl(2-ethyl,4-[3',5'-di-phenylphenyl]indenyl)₂hafnium dichloride;
9-silafluorendiyl(2-n-propyl,4-[3',5'-di-phenylphenyl]indenyl)₂hafnium dimethyl;
9-silafluorendiyl(2-iso-propyl,4-[3',5'-di-phenylphenyl]indenyl)₂hafnium dimethyl;
9-silafluorendiyl(2-n-butyl,4-[3',5'-di-phenylphenyl]indenyl)₂hafnium dimethyl;
9-silafluorendiyl(2-iso-butyl,4-[3',5'-di-phenylphenyl]indenyl)₂hafnium dimethyl;
9-silafluorendiyl(2-sec-butyl,4-[3',5'-di-phenylphenyl]indenyl)₂hafnium dimethyl;
9-silafluorendiyl(2-tert-butyl,4-[3',5'-di-phenylphenyl]indenyl)₂hafnium dimethyl;
dimethylamidoborane(2-methyl,4-[3',5'-di-t-butylphenyl]indenyl)₂zirconium dichloride;
dimethylamidoborane(2-ethyl,4-[3',5'-di-t-butylphenyl]indenyl)₂zirconium dichloride;
dimethylamidoborane(2-n-propyl,4-[3',5'-di-t-butylphenyl]indenyl)₂zirconium dichloride;
dimethylamidoborane(2-iso-propyl,4-[3',5'-di-t-butylphenyl]indenyl)₂zirconium dichloride;
dimethylamidoborane(2-n-butyl,4-[3',5'-di-t-butylphenyl]indenyl)₂zirconium dichloride;
dimethylamidoborane(2-iso-butyl,4-[3',5'-di-t-butylphenyl]indenyl)₂zirconium dichloride;
dimethylamidoborane(2-sec-butyl,4-[3',5'-di-t-butylphenyl]indenyl)₂zirconium dichloride;
dimethylamidoborane(2-tert-butyl,4-[3',5'-di-t-butylphenyl]indenyl)₂zirconium dichloride;
dimethylamidoborane(2-ethyl,4-[3',5'-bis-trifluoromethylphenyl]indenyl)₂zirconium dichloride;
dimethylamidoborane(2-n-propyl,4-[3',5'-bis-trifluoromethylphenyl]indenyl)₂zirconium dichloride;
dimethylamidoborane(2-iso-propyl,4-[3',5'-bis-trifluoromethylphenyl]indenyl)₂zirconium dichloride;
dimethylamidoborane(2-n-butyl,4-[3',5'-bis-trifluoromethylphenyl]indenyl)₂zirconium dichloride;
dimethylamidoborane(2-iso-butyl,4-[3',5'-bis-trifluoromethylphenyl]indenyl)₂zirconium dichloride;
dimethylamidoborane(2-sec-butyl,4-[3',5'-bis-trifluoromethylphenyl]indenyl)₂zirconium dichloride;
dimethylamidoborane(2-tert-butyl,4-[3',5'-bis-trifluoromethylphenyl]indenyl)₂zirconium dichloride;
dimethylamidoborane(2-ethyl,4-[3',5'-di-iso-propylphenyl]indenyl)₂zirconium dichloride;
dimethylamidoborane(2-n-propyl,4-[3',5'-di-iso-propylphenyl]indenyl)₂zirconium dichloride;
dimethylamidoborane(2-iso-propyl,4-[3',5'-di-iso-propylphenyl]indenyl)₂zirconium dichloride;
dimethylamidoborane(2-n-butyl,4-[3',5'-di-iso-propylphenyl]indenyl)₂zirconium dichloride;
dimethylamidoborane(2-iso-butyl,4-[3',5'-di-iso-propylphenyl]indenyl)₂zirconium dichloride;
dimethylamidoborane(2-sec-butyl,4-[3',5'-di-iso-propylphenyl]indenyl)₂zirconium dichloride;
dimethylamidoborane(2-tert-butyl,4-[3',5'-di-iso-propylphenyl]indenyl)₂zirconium dichloride;
dimethylamidoborane(2-methyl,4-[3',5'-di-phenylphenyl]indenyl)₂zirconium dichloride;
dimethylamidoborane(2-ethyl,4-[3',5'-di-phenylphenyl]indenyl)₂zirconium dichloride;
dimethylamidoborane(2-n-propyl,4-[3',5'-di-phenylphenyl]indenyl)₂zirconium dichloride;
dimethylamidoborane(2-iso-propyl,4-[3',5'-di-phenylphenyl]indenyl)₂zirconium dichloride;
dimethylamidoborane(2-n-butyl,4-[3',5'-di-phenylphenyl]indenyl)₂zirconium dichloride;
dimethylamidoborane(2-iso-butyl,4-[3',5'-di-phenylphenyl]indenyl)₂zirconium dichloride;
dimethylamidoborane(2-sec-butyl,4-[3',5'-di-phenylphenyl]indenyl)₂zirconium dichloride;
dimethylamidoborane(2-tert-butyl,4-[3',5'-di-phenylphenyl]indenyl)₂zirconium dichloride;
dimethylamidoborane(2-methyl,4-[3',5'-di-t-butylphenyl]indenyl)₂ zirconium dimethyl;
dimethylamidoborane(2-ethyl,4-[3',5'-di-t-butylphenyl]indenyl)₂zirconium dimethyl;
dimethylamidoborane(2-n-propyl,4-[3',5'-di-t-butylphenyl]indenyl)₂zirconium dimethyl;
dimethylamidoborane(2-iso-propyl,4-[3',5'-di-t-butylphenyl]indenyl)₂zirconium dimethyl;
dimethylamidoborane(2-n-butyl,4-[3',5'-di-t-butylphenyl]indenyl)₂zirconium dimethyl;
dimethylamidoborane(2-iso-butyl,4-[3',5'-di-t-butylphenyl]indenyl)₂zirconium dimethyl;
dimethylamidoborane(2-sec-butyl,4-[3',5'-di-t-butylphenyl]indenyl)₂zirconium dimethyl;
dimethylamidoborane(2-tert-butyl,4-[3',5'-di-t-butylphenyl]indenyl)₂zirconium dimethyl;
dimethylamidoborane(2-ethyl,4-[3',5'-bis-trifluoromethylphenyl]indenyl)₂zirconium dimethyl;
dimethylamidoborane(2-n-propyl,4-[3',5'-bis-trifluoromethylphenyl]indenyl)₂zirconium dimethyl;

dimethylamidoborane(2-iso-propyl,4-[3',5'-bis-trifluoromethylphenyl]indenyl)$_2$zirconium dimethyl;
dimethylamidoborane(2-n-butyl,4-[3',5'-bis-trifluoromethylphenyl]indenyl)$_2$zirconium dimethyl;
dimethylamidoborane(2-iso-butyl,4-[3',5'-bis-trifluoromethylphenyl]indenyl)$_2$zirconium dimethyl;
dimethylamidoborane(2-sec-butyl,4-[3',5'-bis-trifluoromethylphenyl]indenyl)$_2$zirconium dimethyl;
dimethylamidoborane(2-tert-butyl,4-[3',5'-bis-trifluoromethylphenyl]indenyl)$_2$zirconium dimethyl;
dimethylamidoborane(2-ethyl,4-[3',5'-di-iso-propylphenyl]indenyl)$_2$zirconium dimethyl;
dimethylamidoborane(2-n-propyl,4-[3',5'-di-iso-propylphenyl]indenyl)$_2$zirconium dimethyl
dimethylamidoborane(2-iso-propyl,4-[3',5'-di-iso-propylphenyl]indenyl)$_2$zirconium dimethyl;
dimethylamidoborane(2-n-butyl,4-[3',5'-di-iso-propylphenyl]indenyl)$_2$zirconium dimethyl;
dimethylamidoborane(2-iso-butyl,4-[3',5'-di-iso-propylphenyl]indenyl)$_2$zirconium dimethyl;
dimethylamidoborane(2-sec-butyl,4-[3',5'-di-iso-propylphenyl]indenyl)$_2$zirconium dimethyl;
dimethylamidoborane(2-tert-butyl,4-[3',5'-di-iso-propylphenyl]indenyl)$_2$zirconium dimethyl;
dimethylamidoborane(2-methyl,4-[3',5'-di-phenylphenyl]indenyl)$_2$zirconium dimethyl;
dimethylamidoborane(2-ethyl,4-[3',5'-di-phenylphenyl]indenyl)$_2$zirconium dimethyl;
dimethylamidoborane(2-n-propyl,4-[3',5'-di-phenylphenyl]indenyl)$_2$zirconium dimethyl;
dimethylamidoborane(2-iso-propyl,4-[3',5'-di-phenylphenyl]indenyl)$_2$zirconium dimethyl;
dimethylamidoborane(2-n-butyl,4-[3',5'-di-phenylphenyl]indenyl)$_2$zirconium dimethyl;
dimethylamidoborane(2-iso-butyl,4-[3',5'-di-phenylphenyl]indenyl)$_2$zirconium dimethyl;
dimethylamidoborane(2-sec-butyl,4-[3',5'-di-phenylphenyl]indenyl)$_2$zirconium dimethyl;
dimethylamidoborane(2-tert-butyl,4-[3',5'-di-phenylphenyl]indenyl)$_2$zirconium dimethyl;
diisopropylamidoborane(2-methyl,4-[3',5'-di-]indenyl)$_2$zirconium dichloride;
diisopropylamidoborane(2-ethyl,4-[3',5'-di-t-butylphenyl]indenyl)$_2$zirconium dichloride;
diisopropylamidoborane(2-n-propyl,4-[3',5'-di-t-butylphenyl]indenyl)$_2$zirconium dichloride;
diisopropylamidoborane(2-iso-propyl,4-[3',5'-di-t-butylphenyl]indenyl)$_2$zirconium dichloride;
diisopropylamidoborane(2-n-butyl,4-[3',5'-di-t-butylphenyl]indenyl)$_2$zirconium dichloride;
diisopropylamidoborane(2-iso-butyl,4-[3',5'-di-t-butylphenyl]indenyl)$_2$zirconium dichloride;
diisopropylamidoborane(2-sec-butyl,4-[3',5'-di-t-butylphenyl]indenyl)$_2$zirconium dichloride;
diisopropylamidoborane(2-tert-butyl,4-[3',5'-di-t-butylphenyl]indenyl)$_2$zirconium dichloride;
diisopropylamidoborane(2-ethyl,4-[3',5'-bis-trifluoromethylphenyl]indenyl)$_2$zirconium dichloride;
diisopropylamidoborane(2-n-propyl,4-[3',5'-bis-trifluoromethylphenyl]indenyl)$_2$zirconium dichloride;
diisopropylamidoborane(2-iso-propyl,4-[3',5'-bis-trifluoromethylphenyl]indenyl)$_2$zirconium dichloride;
diisopropylamidoborane(2-n-butyl,4-[3',5'-bis-trifluoromethylphenyl]indenyl)$_2$zirconium dichloride;
diisopropylamidoborane(2-iso-butyl,4-[3',5'-bis-trifluoromethylphenyl]indenyl)$_2$zirconium dichloride;
diisopropylamidoborane(2-sec-butyl,4-[3',5'-bis-trifluoromethylphenyl]indenyl)$_2$zirconium dichloride;
diisopropylamidoborane(2-tert-butyl,4-[3',5'-bis-trifluoromethylphenyl]indenyl)$_2$zirconium dichloride;
diisopropylamidoborane(2-ethyl,4-[3',5'-di-iso-propylphenyl]indenyl)$_2$zirconium dichloride;
diisopropylamidoborane(2-n-propyl,4-[3',5'-di-iso-propylphenyl]indenyl)$_2$zirconium dichloride;
diisopropylamidoborane(2-iso-propyl,4-[3',5'-di-iso-propylphenyl]indenyl)$_2$zirconium dichloride;
diisopropylamidoborane(2-n-butyl,4-[3',5'-di-iso-propylphenyl]indenyl)$_2$zirconium dichloride;
diisopropylamidoborane(2-iso-butyl,4-[3',5'-di-iso-propylphenyl]indenyl)$_2$zirconium dichloride;
diisopropylamidoborane(2-sec-butyl,4-[3',5'-di-iso-propylphenyl]indenyl)$_2$zirconium dichloride;
diisopropylamidoborane(2-tert-butyl,4-[3',5'-di-iso-propylphenyl]indenyl)$_2$zirconium dichloride;
diisopropylamidoborane(2-methyl,4-[3',5'-di-phenylphenyl]indenyl)$_2$zirconium dichloride;
diisopropylamidoborane(2-ethyl,4-[3',5'-di-phenylphenyl]indenyl)$_2$zirconium dichloride;
diisopropylamidoborane(2-n-propyl,4-[3',5'-di-phenylphenyl]indenyl)$_2$zirconium dichloride;
diisopropylamidoborane(2-iso-propyl,4-[3',5'-di-phenylphenyl]indenyl)$_2$zirconium dichloride;
diisopropylamidoborane(2-n-butyl,4-[3',5'-di-phenylphenyl]indenyl)$_2$zirconium dichloride;
diisopropylamidoborane(2-iso-butyl,4-[3',5'-di-phenylphenyl]indenyl)$_2$zirconium dichloride;
diisopropylamidoborane(2-sec-butyl,4-[3',5'-di-phenylphenyl]indenyl)$_2$zirconium dichloride;
diisopropylamidoborane(2-tert-butyl,4-[3',5'-di-phenylphenyl]indenyl)$_2$zirconium dichloride;
diisopropylamidoborane(2-methyl,4-[3',5'-di-t-butylphenyl]indenyl)$_2$zirconium dimethyl;
diisopropylamidoborane(2-ethyl,4-[3',5'-di-t-butylphenyl]indenyl)$_2$zirconium dimethyl;
diisopropylamidoborane(2-n-propyl,4-[3',5'-di-t-butylphenyl]indenyl)$_2$zirconium dimethyl;
diisopropylamidoborane(2-iso-propyl,4-[3',5'-di-t-butylphenyl]indenyl)$_2$zirconium dimethyl;
diisopropylamidoborane(2-n-butyl,4-[3',5'-di-t-butylphenyl]indenyl)$_2$zirconium dimethyl;
diisopropylamidoborane(2-iso-butyl,4-[3',5'-di-t-butylphenyl]indenyl)$_2$zirconium dimethyl;
diisopropylamidoborane(2-sec-butyl,4-[3',5'-di-t-butylphenyl]indenyl)$_2$zirconium dimethyl;
diisopropylamidoborane(2-tert-butyl,4-[3',5'-di-t-butylphenyl]indenyl)$_2$zirconium dimethyl;
diisopropylamidoborane(2-ethyl,4-[3',5'-bis-trifluoromethylphenyl]indenyl)$_2$zirconium dimethyl;
diisopropylamidoborane(2-n-propyl,4-[3',5'-bis-trifluoromethylphenyl]indenyl)$_2$zirconium dimethyl;
diisopropylamidoborane(2-iso-propyl,4-[3',5'-bis-trifluoromethylphenyl]indenyl)$_2$zirconium dimethyl;
diisopropylamidoborane(2-n-butyl,4-[3',5'-bis-trifluoromethylphenyl]indenyl)$_2$zirconium dimethyl;
diisopropylamidoborane(2-iso-butyl,4-[3',5'-bis-trifluoromethylphenyl]indenyl)$_2$zirconium dimethyl;
diisopropylamidoborane(2-sec-butyl,4-[3',5'-bis-trifluoromethylphenyl]indenyl)$_2$zirconium dimethyl;
diisopropylamidoborane(2-tert-butyl,4-[3',5'-bis-trifluoromethylphenyl]indenyl)$_2$zirconium dimethyl;
diisopropylamidoborane(2-ethyl,4-[3',5'-di-iso-propylphenyl]indenyl)$_2$zirconium dimethyl;

diisopropylamidoborane(2-n-propyl,4-[3',5'-di-iso-propylphenyl]indenyl)$_2$zirconium dimethyl
diisopropylamidoborane(2-iso-propyl,4-[3',5'-di-iso-propylphenyl]indenyl)$_2$zirconium dimethyl;
diisopropylamidoborane(2-n-butyl,4-[3',5'-di-iso-propylphenyl]indenyl)$_2$zirconium dimethyl;
diisopropylamidoborane(2-iso-butyl,4-[3',5'-di-iso-propylphenyl]indenyl)$_2$zirconium dimethyl;
diisopropylamidoborane(2-sec-butyl,4-[3',5'-di-iso-propylphenyl]indenyl)$_2$zirconium dimethyl;
diisopropylamidoborane(2-tert-butyl,4-[3',5'-di-iso-propylphenyl]indenyl)$_2$zirconium dimethyl;
diisopropylamidoborane(2-methyl,4-[3',5'-di-phenylphenyl]indenyl)$_2$zirconium dimethyl;
diisopropylamidoborane(2-ethyl,4-[3',5'-di-phenylphenyl]indenyl)$_2$zirconium dimethyl;
diisopropylamidoborane(2-n-propyl,4-[3',5'-di-phenylphenyl]indenyl)$_2$zirconium dimethyl;
diisopropylamidoborane(2-iso-propyl,4-[3',5'-di-phenylphenyl]indenyl)$_2$zirconium dimethyl;
diisopropylamidoborane(2-n-butyl,4-[3',5'-di-phenylphenyl]indenyl)$_2$zirconium dimethyl;
diisopropylamidoborane(2-iso-butyl,4-[3',5'-di-phenylphenyl]indenyl)$_2$zirconium dimethyl;
diisopropylamidoborane(2-sec-butyl,4-[3',5'-di-phenylphenyl]indenyl)$_2$zirconium dimethyl;
diisopropylamidoborane(2-tert-butyl,4-[3',5'-di-phenylphenyl]indenyl)$_2$zirconium dimethyl;
bis(trimethylsilyl)amidoborane(2-methyl,4-[3',5'-di-t-butylphenyl]indenyl)$_2$zirconium dichloride;
bis(trimethylsilyl)amidoborane(2-ethyl,4-[3',5'-di-t-butylphenyl]indenyl)$_2$zirconium dichloride;
bis(trimethylsilyl)amidoborane(2-n-propyl,4-[3',5'-di-t-butylphenyl]indenyl)$_2$zirconium dichloride;
bis(trimethylsilyl)amidoborane(2-iso-propyl,4-[3',5'-di-t-butylphenyl]indenyl)$_2$zirconium dichloride;
bis(trimethylsilyl)amidoborane(2-n-butyl,4-[3',5'-di-t-butylphenyl]indenyl)$_2$zirconium dichloride;
bis(trimethylsilyl)amidoborane(2-iso-butyl,4-[3',5'-di-t-butylphenyl]indenyl)2zirconium dichloride;
bis(trimethylsilyl)amidoborane(2-sec-butyl,4-[3',5'-di-t-butylphenyl]indenyl)$_2$zirconium dichloride;
bis(trimethylsilyl)amidoborane(2-tert-butyl,4-[3',5'-di-t-butylphenyl]indenyl)$_2$zirconium dichloride;
bis(trimethylsilyl)amidoborane(2-ethyl,4-[3',5'-bis-trifluoromethylphenyl]indenyl)$_2$zirconium dichloride;
bis(trimethylsilyl)amidoborane(2-n-propyl,4-[3',5'-bis-trifluoromethylphenyl]indenyl)$_2$zirconium dichloride;
bis(trimethylsilyl)amidoborane(2-iso-propyl,4-[3',5'-bis-trifluoromethylphenyl]indenyl)$_2$zirconium dichloride;
bis(trimethylsilyl)amidoborane(2-n-butyl,4-[3',5'-bis-trifluoromethylphenyl]indenyl)$_2$zirconium dichloride;
bis(trimethylsilyl)amidoborane(2-iso-butyl,4-[3',5'-bis-trifluoromethylphenyl]indenyl)$_2$zirconium dichloride;
bis(trimethylsilyl)amidoborane(2-sec-butyl,4-[3',5'-bis-trifluoromethylphenyl]indenyl)$_2$zirconium dichloride;
bis(trimethylsilyl)amidoborane(2-tert-butyl,4-[3',5'-bis-trifluoromethylphenyl]indenyl)$_2$zirconium dichloride;
bis(trimethylsilyl)amidoborane(2-ethyl,4-[3',5'-di-iso-propylphenyl]indenyl)$_2$zirconium dichloride;
bis(trimethylsilyl)amidoborane(2-n-propyl,4-[3',5'-di-iso-propylphenyl]indenyl)$_2$zirconium dichloride
bis(trimethylsilyl)amidoborane(2-iso-propyl,4-[3',5'-di-iso-propylphenyl]indenyl)$_2$zirconium dichloride;
bis(trimethylsilyl)amidoborane(2-n-butyl,4-[3',5'-di-iso-propylphenyl]indenyl)$_2$zirconium dichloride;
bis(trimethylsilyl)amidoborane(2-iso-butyl,4-[3',5'-di-iso-propylphenyl]indenyl)$_2$zirconium dichloride;
bis(trimethylsilyl)amidoborane(2-sec-butyl,4-[3',5'-di-iso-propylphenyl]indenyl)$_2$zirconium dichloride;
bis(trimethylsilyl)amidoborane(2-tert-butyl,4-[3',5'-di-iso-propylphenyl]indenyl)$_2$zirconium dichloride;
bis(trimethylsilyl)amidoborane(2-methyl,4-[3',5'-di-phenylphenyl]indenyl)$_2$zirconium dichloride;
bis(trimethylsilyl)amidoborane(2-ethyl,4-[3',5'-di-phenylphenyl]indenyl)$_2$zirconium dichloride;
bis(trimethylsilyl)amidoborane(2-n-propyl,4-[3',5'-di-phenylphenyl]indenyl)$_2$zirconium dichloride;
bis(trimethylsilyl)amidoborane(2-iso-propyl,4-[3',5'-di-phenylphenyl]indenyl)$_2$zirconium dichloride;
bis(trimethylsilyl)amidoborane(2-n-butyl,4-[3',5'-di-phenylphenyl]indenyl)$_2$zirconium dichloride;
bis(trimethylsilyl)amidoborane(2-iso-butyl,4-[3',5'-di-phenylphenyl]indenyl)$_2$zirconium dichloride;
bis(trimethylsilyl)amidoborane(2-sec-butyl,4-[3',5'-di-phenylphenyl]indenyl)$_2$zirconium dichloride;
bis(trimethylsilyl)amidoborane(2-tert-butyl,4-[3',5'-di-phenylphenyl]indenyl)$_2$zirconium dichloride;
bis(trimethylsilyl)amidoborane(2-methyl,4-[3',5'-di-t-butylphenyl]indenyl)$_2$zirconium dimethyl;
bis(trimethylsilyl)amidoborane(2-ethyl,4-[3',5'-di-t-butylphenyl]indenyl)$_2$zirconium dimethyl;
bis(trimethylsilyl)amidoborane(2-n-propyl,4-[3',5'-di-t-butylphenyl]indenyl)$_2$zirconium dimethyl;
bis(trimethylsilyl)amidoborane(2-iso-propyl,4-[3',5'-di-t-butylphenyl]indenyl)$_2$zirconium dimethyl;
bis(trimethylsilyl)amidoborane(2-n-butyl,4-[3',5'-di-t-butylphenyl]indenyl)$_2$zirconium dimethyl;
bis(trimethylsilyl)amidoborane(2-iso-butyl,4-[3',5'-di-t-butylphenyl]indenyl)$_2$zirconium dimethyl;
bis(trimethylsilyl)amidoborane(2-sec-butyl,4-[3',5'-di-t-butylphenyl]indenyl)$_2$zirconium dimethyl;
bis(trimethylsilyl)amidoborane(2-tert-butyl,4-[3',5'-di-t-butylphenyl]indenyl)$_2$zirconium dimethyl;
bis(trimethylsilyl)amidoborane(2-ethyl,4-[3',5'-bis-trifluoromethylphenyl]indenyl)$_2$zirconium dimethyl;
bis(trimethylsilyl)amidoborane(2-n-propyl,4-[3',5'-bis-trifluoromethylphenyl]indenyl)$_2$zirconium dimethyl;
bis(trimethylsilyl)amidoborane(2-iso-propyl,4-[3',5'-bis-trifluoromethylphenyl]indenyl)$_2$zirconium dimethyl;
bis(trimethylsilyl)amidoborane(2-n-butyl,4-[3',5'-bis-trifluoromethylphenyl]indenyl)$_2$zirconium dimethyl;
bis(trimethylsilyl)amidoborane(2-iso-butyl,4-[3',5'-bis-trifluoromethylphenyl]indenyl)$_2$zirconium dimethyl;
bis(trimethylsilyl)amidoborane(2-sec-butyl,4-[3',5'-bis-trifluoromethylphenyl]indenyl)$_2$zirconium dimethyl;
bis(trimethylsilyl)amidoborane(2-tert-butyl,4-[3',5'-bis-trifluoromethylphenyl]indenyl)$_2$zirconium dimethyl;
bis(trimethylsilyl)amidoborane(2-ethyl,4-[3',5'-di-iso-propylphenyl]indenyl)$_2$zirconium dimethyl;
bis(trimethylsilyl)amidoborane(2-n-propyl,4-[3',5'-di-iso-propylphenyl]indenyl)$_2$zirconium dimethyl
bis(trimethylsilyl)amidoborane(2-iso-propyl,4-[3',5'-di-iso-propylphenyl]indenyl)$_2$zirconium dimethyl;
bis(trimethylsilyl)amidoborane(2-n-butyl,4-[3',5'-di-iso-propylphenyl]indenyl)$_2$zirconium dimethyl;
bis(trimethylsilyl)amidoborane(2-iso-butyl,4-[3',5'-di-iso-propylphenyl]indenyl)$_2$zirconium dimethyl;
bis(trimethylsilyl)amidoborane(2-sec-butyl,4-[3',5'-di-iso-propylphenyl]indenyl)$_2$zirconium dimethyl;
bis(trimethylsilyl)amidoborane(2-tert-butyl,4-[3',5'-di-iso-propylphenyl]indenyl)$_2$zirconium dimethyl;

bis(trimethylsilyl)amidoborane(2-methyl,4-[3',5'-di-phenylphenyl]indenyl)$_2$zirconium dimethyl;

bis(trimethylsilyl)amidoborane(2-ethyl,4-[3',5'-di-phenylphenyl]indenyl)$_2$zirconium dimethyl;

bis(trimethylsilyl)amidoborane(2-n-propyl,4-[3',5'-di-phenylphenyl]indenyl)$_2$zirconium dimethyl;

bis(trimethylsilyl)amidoborane(2-iso-propyl,4-[3',5'-di-phenylphenyl]indenyl)$_2$zirconium dimethyl;

bis(trimethylsilyl)amidoborane(2-n-butyl,4-[3',5'-di-phenylphenyl]indenyl)$_2$zirconium dimethyl;

bis(trimethylsilyl)amidoborane(2-iso-butyl,4-[3',5'-di-phenylphenyl]indenyl)$_2$zirconium dimethyl;

bis(trimethylsilyl)amidoborane(2-sec-butyl,4-[3',5'-di-phenylphenyl]indenyl)$_2$zirconium dimethyl; or bis(trimethylsilyl)amidoborane(2-tert-butyl,4-[3',5'-di-phenylphenyl]indenyl)$_2$zirconium dimethyl.

34. The process of claim 1 wherein the mixture comprises at least 9 or more linear alpha-olefins.

35. The process of claim 1 wherein the mixture comprises at least 10 or more linear alpha-olefins.

36. The process of claim 1 wherein the mixture comprises at least 11 or more linear alpha-olefins.

37. The process of claim 1 wherein the mixture comprises at least 12 or more linear alpha-olefins.

38. The process of claim 1 wherein the mixture comprises at least 13 or more linear alpha-olefins.

39. The process of claim 1 wherein the mixture comprises at least 14 or more linear alpha-olefins.

40. The process of claim 1 wherein the mixture comprises at least 15 or more linear alpha-olefins.

41. The process of claim 1 wherein the mixture comprises at least 16 or more linear alpha-olefins.

42. The process of claim 1 wherein the mixture comprises at least 17 or more linear alpha-olefins.

43. The process of claim 1 wherein the mixture comprises between 8 and 17 alpha-olefins.

44. The process of claim 1 wherein the mixture comprises between 10 and 17 alpha-olefins.

45. A process to polymerize olefins comprising:

obtaining a mixed olefin stream comprising hexene, octene, and decene wherein the mixed olefin stream is obtained by a coupling reaction of butene and ethylene; and contacting:

(i) propylene and (ii) the mixed olefin stream with (iii) a metallocene catalyst system.

46. The process of claim 45 wherein the metallocene catalyst system comprises one or more group 4 transition metal metallocene compounds.

47. The process of claim 45, wherein the metallocene catalyst system comprises a metallocene having two cyclopentadienyl groups.

48. The process of claim 45, wherein the metallocene catalyst system comprises alumoxane.

49. The process of claim 45, wherein the metal locate catalyst system comprises methylalumoxane.

50. The process of claim 45, wherein the metallocene catalyst system comprises a non-coordinating anion.

51. A process to polymerize olefins comprising:

obtaining a mixed olefin stream comprising five or more different alpha olefins each having 6 to 20 carbon atoms wherein the mixed olefin stream is obtained by a coupling reaction of butene and ethylene; and contacting:

(i) propylene and (ii) the mixed olefin stream with (iii) a metallocene catalyst system.

52. The process of claim 51 wherein the mixed olefin stream consists essentially of alpha-olefins having even numbers of carbon atoms.

53. A process to polymerize olefins comprising:

obtaining a mixed olefin stream comprising twelve or more different alpha olefins each having 4 to 20 carbon atoms wherein the mixed olefin stream will have at least 25 weight % of olefins having odd numbers of carbons; and contacting:

(i) propylene and (ii) the mixed olefin stream with (iii) a metallocene catalyst system.

* * * * *